(12) United States Patent
Aoyama et al.

(10) Patent No.: US 8,661,957 B2
(45) Date of Patent: Mar. 4, 2014

(54) CUTTING DEVICES

(71) Applicant: Makita Corporation, Anjo (JP)

(72) Inventors: Syuji Aoyama, Anjo (JP); Toshiyuki Kani, Anjo (JP); Shinya Kojima, Anjo (JP); Goh Yamamura, Anjo (JP); Katsuhiko Sasaki, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 13/687,632

(22) Filed: Nov. 28, 2012

(65) Prior Publication Data

US 2013/0087034 A1    Apr. 11, 2013

Related U.S. Application Data

(62) Division of application No. 12/318,414, filed on Dec. 29, 2008, now Pat. No. 8,359,959.

(30) Foreign Application Priority Data

| Jan. 8, 2008 | (JP) | 2008-001179 |
| Jan. 10, 2008 | (JP) | 2008-003262 |
| Aug. 21, 2008 | (JP) | 2008-212790 |
| Nov. 26, 2008 | (JP) | 2008-300889 |

(51) Int. Cl.
*B27B 27/06* (2006.01)

(52) U.S. Cl.
USPC .......................... 83/471.3; 83/581

(58) Field of Classification Search
USPC .......... 83/471.3, 471, 477, 471.1, 471.2, 485, 83/490, 581, 699.51, 811; 16/65
See application file for complete search history.

(56) References Cited

U.S. PATENT DOCUMENTS

| 723,544 | A | * | 3/1903 | Petre ............................. 403/117 |
| 1,808,453 | A | * | 6/1931 | De Koning .................. 83/471.3 |
| 5,392,678 | A | | 2/1995 | Sasaki et al. |
| 5,437,214 | A | | 8/1995 | Sasaki et al. |
| 5,582,089 | A | * | 12/1996 | Sasaki et al. ................. 83/471.3 |
| 5,660,094 | A | | 8/1997 | Sasaki et al. |
| 5,823,085 | A | | 10/1998 | Kondo et al. |
| 5,870,938 | A | * | 2/1999 | Brunson et al. ............. 83/471.3 |

(Continued)

FOREIGN PATENT DOCUMENTS

| EP | 1 716 986 A1 | 11/2006 |
| JP | A-05-318402 | 12/1993 |

(Continued)

OTHER PUBLICATIONS

Jul. 17, 2009 European Search Report issued in EP 09 00 0108.

(Continued)

*Primary Examiner* — Sean Michalski
(74) *Attorney, Agent, or Firm* — Oliff PLC

(57) ABSTRACT

A cutting device includes a table for placing thereon a workpiece. A tool unit supports a cutting tool and is laterally tiltably supported on the table, so that the rotational axis of the cutting tool can be inclined relative to a horizontal direction. A positioning device includes a first positioning member and a second positioning member that can interact with each other to position the tool unit at a plurality of laterally tilted positions. At least one of the first and second positioning members can be moved to change the laterally tilted position positionable by the positioning device.

19 Claims, 42 Drawing Sheets

(56) References Cited

U.S. PATENT DOCUMENTS

| | | | |
|---|---|---|---|
| 5,907,987 A * | 6/1999 | Stumpf et al. | 83/471.3 |
| 6,035,754 A * | 3/2000 | Stumpf et al. | 83/471.3 |
| 6,067,885 A * | 5/2000 | Brunson et al. | 83/471.3 |
| 6,101,914 A | 8/2000 | Brunson et al. | |
| 6,532,853 B1 * | 3/2003 | Kakimoto et al. | 83/698.11 |
| RE38,122 E * | 5/2003 | Kondo et al. | 83/471.3 |
| 6,606,931 B1 * | 8/2003 | Brunson et al. | 83/471.3 |
| 6,615,701 B2 * | 9/2003 | Hollinger et al. | 83/473 |
| 6,631,661 B2 * | 10/2003 | Brunson et al. | 83/471.3 |
| 6,758,123 B2 * | 7/2004 | Svetlik et al. | 83/471.3 |
| 6,823,765 B2 * | 11/2004 | Stumpf et al. | 83/471.3 |
| 6,918,330 B2 * | 7/2005 | Ng et al. | 83/471.3 |
| 6,990,883 B2 * | 1/2006 | Stumpf et al. | 83/471.3 |
| 7,013,781 B2 * | 3/2006 | Brunson et al. | 83/471.3 |
| 7,127,977 B2 * | 10/2006 | Carroll et al. | 83/471.3 |
| 7,549,360 B2 | 6/2009 | Aoyama | |
| 8,359,959 B2 * | 1/2013 | Aoyama et al. | 83/471.3 |
| 8,490,528 B2 * | 7/2013 | Aoyama | 83/473 |
| 2001/0001375 A1 * | 5/2001 | Meredith et al. | 83/471.3 |
| 2002/0088327 A1 * | 7/2002 | Young | 83/477.1 |
| 2004/0089125 A1 | 5/2004 | Schoene et al. | |
| 2005/0045013 A1 | 3/2005 | Stumpf et al. | |
| 2006/0060048 A1 | 3/2006 | Stumpf et al. | |
| 2006/0243113 A1 | 11/2006 | Kaye et al. | |

FOREIGN PATENT DOCUMENTS

| | | |
|---|---|---|
| JP | B2-2563866 | 9/1996 |
| JP | A-8-252801 | 10/1996 |
| JP | A-08-252803 | 10/1996 |
| JP | A-8-258001 | 10/1996 |
| JP | A-2003-245901 | 9/2003 |
| JP | A-2006-188073 | 7/2006 |
| JP | A-2006-306103 | 11/2006 |
| JP | A-2007-7883 | 1/2007 |

OTHER PUBLICATIONS

Aug. 8, 2011 European Search Report issued in EP 11 16 5872.0.
Oct. 21, 2011 Office Action issued in U.S. Appl. No. 12/318,414.
Feb. 7, 2012 Office Action issued in U.S. Appl. No. 12/318,414.
Oct. 11, 2012 Notice of Allowance Office Action issued in U.S. Appl. No. 12/318,414.
Nov. 20, 2012 Office Action issued in Japanese Patent Application No. 2008-212790 (with English-language translation).
Mar. 5, 2013 Office Action issued in Japanese Patent Application No. 2008-300889 (with translation).

* cited by examiner

CUTTING DEVICES

This application is a Divisional application of pending U.S. patent application Ser. No. 12/318,414 filed on Dec. 29, 2008, which in turn claims priority to Japanese Patent Application No. 2008-1179 filed on Jan. 8, 2008, Japanese Patent Application No. 2008-3262 filed on Jan. 10, 2008, Japanese Patent Application No. 2008-212790 filed on Aug. 21, 2008 and Japanese Patent Application No. 2008-300889 filed on Nov. 26, 2008, the contents of which are incorporated herein by reference.

BACKGROUND OF THE INVENTION

Field of the Invention

The present invention relates to cutting that have a positioning device for positioning a tool unit that can be tilted vertically and laterally relative to a table for performing a cutting operation of a workpiece. In particular, present invention relates to cutting devices that have a positioning device for positioning a tool unit at desired laterally tilted positions. In this specification, the terms "cutting operation" and "cutting tool" are used to include operations and tools for dividing a workpiece into a plural number of parts, forming a groove into a workpiece without dividing the workpiece, and planing or abrading a workpiece.

Cutting devices are known that include a table for placing thereon a workpiece, and a vertically tiltable tool unit supported on the table and having a rotary cutting tool, so that the workpiece placed on the table can be cut by the cutting tool as the tool unit tilts vertically downward.

Among the cutting devices of this type, those used mainly for woodworking are known to have a turntable rotatable within a horizontal plane, so that the tool unit can rotate with the table. A fence is disposed above the turntable for positioning a workpiece with respect to a horizontal direction. A positioning fence has a positioning surface that extends within a plane perpendicular to the surface of the turntable and includes the rotational center of the turntable. The workpiece can be positioned with respect to the horizontal direction by bringing the workpiece into contact with the positioning surface. Therefore, it is possible to perform a cutting operation with the rotary cutting tool inclined relative to a reference plane of the workpiece by rotating the turntable. This cutting operation will be hereinafter called "oblique cutting operation."

Further, in addition to or in place of the oblique cutting operation, some of woodworking cutting devices are configured to be able to perform a cutting operation with the tool unit inclined laterally relative to a table (or a turntable). This cutting operation will be hereinafter called "inclined cutting operation." Thus, during the inclined cutting operation, the tool unit is inclined leftward or rightward from a vertical plane that is perpendicular to the surface of the turntable, so that the cutting tool cuts the workpiece in a direction inclined relative to the surface of the workpiece. Therefore, the rotational axis of the cutting tool is inclined relative to the horizontal direction. In contrast, during the oblique cutting operation, the rotational axis of the cutting tool is held to be parallel to the horizontal direction.

For facilitating the inclined cutting operation, there has been proposed a positioning device that can position the tool unit at a vertical position (where the tool unit extends in the vertical direction) and an inclined position (where the tool unit is inclined relative to the vertical direction).

Such a positioning device is disclosed, for example, in U.S. Pat. No. 6,101,914 and Japanese Laid-Open Patent Publication No. 2003-245901. The positioning devices disclosed in these documents include a base portion fixedly mounted to the table and a support portion pivotally connected to the base portion via a horizontal pivot shaft and supporting a tool unit. A stopper bolt(s) is mounted to the base portion, and a stopper projection(s) is disposed on the support portion for contacting with the stopper bolt. Therefore, the tool unit can be positioned, for example, at a vertical position and a 45° tilted position. With the tool unit held in these positions, the tool unit can be fixed in these positions by the tightening operation of a separate fixing lever. This kind of mechanism using the stopper bolt and the stopper projection is called "positive stop mechanism."

Thus, according the known positioning device, the tool unit can be positioned at a vertical position, and a rightward 45° tilted position and a leftward 45° tilted position by the contact of the stopper bolt with the stopper projection. With this positioning device, the operator can position the tool unit at any of these positions by simply tilting the tool unit without need of check using an angular scale.

However, if it is desired to position the tool unit at a position other than the positions that can be positioned by the positive stop mechanism, it is still necessary for the operator to tilt the tool unit while the operator visually check the indication of an angular scale. After the tool unit has tilted to the desired position, it is necessary for the operator to hold the tool unit in that position and tightens a fixing lever in order to fix the tool unit in position. Therefore, the known positioning device cannot be effectively used when it is desired to position the tool unit at a position other than the positions that can be positioned by the positive stop mechanism.

Therefore, there has been a need for a positioning device that can be effectively used for positioning a tool unit.

SUMMARY OF THE INVENTION

One aspect according to the present invention includes a cutting device that includes a table having a table surface for placing thereon a workpiece. A tool unit supports a cutting tool and is laterally tiltably supported on the table, so that the rotational axis of the cutting tool can be inclined relative to the table surface. A positioning device includes a first positioning member and a second positioning member that can interact with each other to position the tool unit at a plurality of laterally tilted positions. At least one of the first and second positioning members can be moved to change the laterally tilted position positionable by the positioning device. For example, first positioning member may interact with the second positioning member by contacting or engaging with each other.

DETAILED DESCRIPTION OF THE INVENTION

Figure 1:
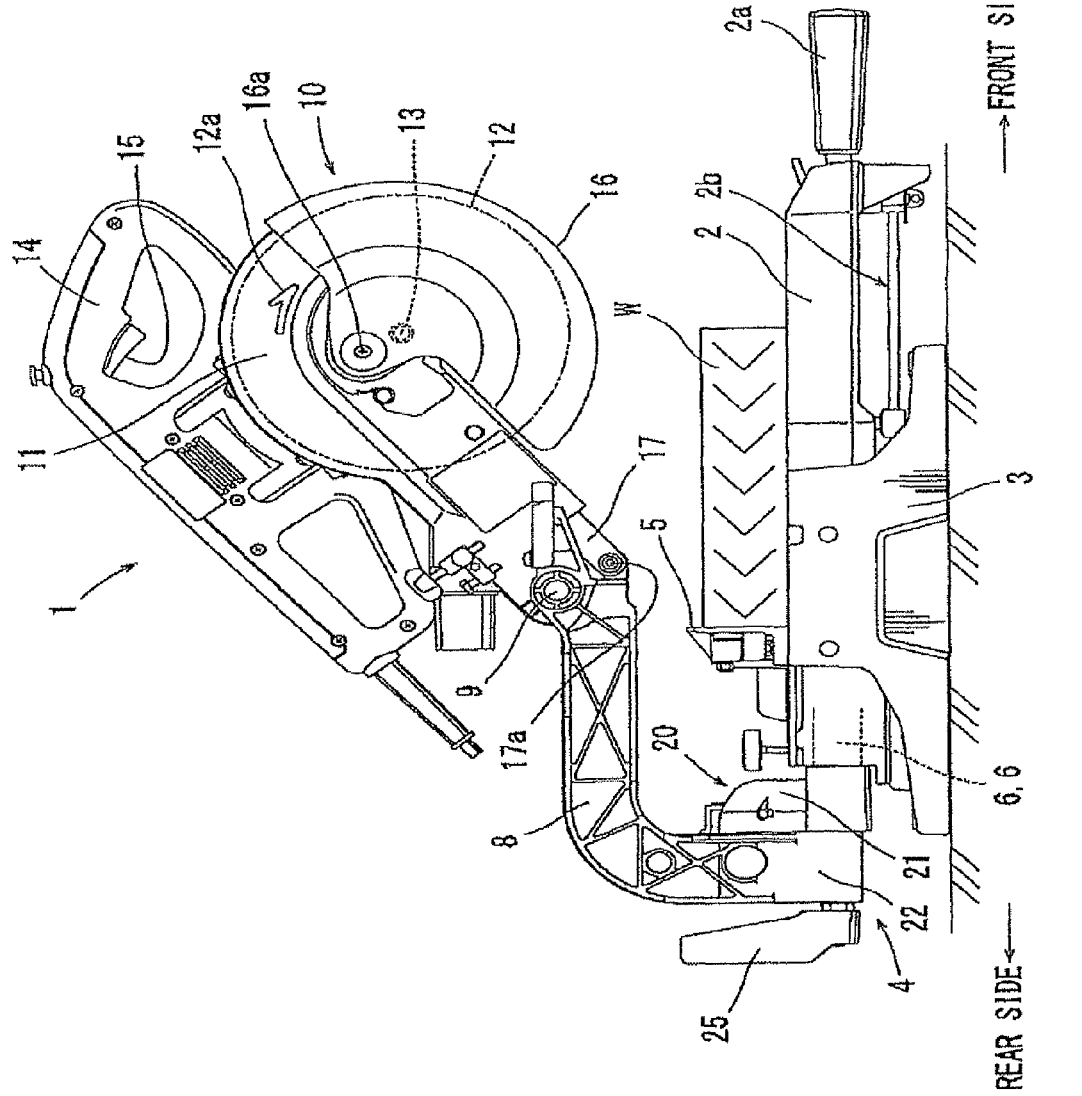
FIG. 1 is a side view of a table cutting device according to a first embodiment of the present invention.

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cutting device includes a table having a table surface for placing thereon a workpiece, a tool unit, a cutting tool mounted to the tool unit and having a rotational axis, and a pivotal support device mounted on the table and supporting the tool unit, so that the tool unit can be laterally tilted to incline the rotational axis of the cutting tool relative to the table surface. The pivotal support device includes a base member mounted to the table and a support member for supporting the tool unit. The support member is coupled to the base member, so that the support member can rotate relative to the base member about a rotational axis. The cutting device further includes a positioning device that can position the tool unit at a plurality of laterally tilted positions. The positioning device includes a plurality of positioning portions provided at one of the base member and the support member. A positioning member is mounted to the other of the base member and the support member and is movable between a lock position for engaging any one the positioning portions and an unlock position disengaged from the positioning portions. Therefore, it is possible to reliably accurately position the tool unit at a plurality of laterally tilted positions.

The laterally tilted positions that can be positioned by the positioning device may include a 45° tilt position, where the tool unit is tilted by an angle of 45° relative to a vertical direction, where the rotational axis of the cutting tool extends substantially parallel to the table surface. The cutting device may further include a fixing device operable to fix the support member in position relative to the base member with respect to a rotational direction about the rotational axis. The cutting device may further include an operation member coupled to the positioning member and operable by an operator for moving the positioning member between the lock position and the unlock position. A biasing member may bias the positioning member toward the lock position, so that the positioning member can automatically move to the lock position. This may improve the operability of the cutting device.

Preferably, the unlock position of the positioning member is nearer to the operator than the lock position when the operator is positioned for operating the cutting device. With this arrangement, the operator can easily operate the positioning member while he or she is positioned for operating the cutting device. The positioning portions may be a plurality of holes, and the positioning member may be a pin. Therefore, the positioning device may have a compact construction.

The operation member may include a dial rotatable by the operator, and a motion converting device that can convert the rotation of the dial into the movement of the positioning member between the lock position and the unlock position. The operation member may be a lever pivotable by the operator.

The positioning device may further include a leaf spring resiliently holding the positioning member in position, and a cam rotating by the pivotal movement of the lever and acting on the leaf spring, so that the positioning member moves as the leaf spring is resiliently deformed by the action of the cam. With this arrangement, the leaf spring may give a restraint feeling during the movement of the lever. Therefore, it is possible to improve the operability of the operation member. In addition, the leaf spring may prevent the positioning member form stopping at the intermediate position between the lock position and the unlock position. Therefore, the positioning device can reliably operate.

In another embodiment, the positioning device includes a first member, a second member and a third member. The first member is mounted to the base member and is rotatable about the rotational axis of the support member. The second member is mounted to the support member and is movable in a radial direction with respect to the rotational axis of the support member. The third member is mounted to the support member and is positioned to be opposed to the first member in a circumferential direction about the rotational axis. The first member includes a plurality of recesses arranged in series in the radial direction. Each of the recesses is open toward the radially outer side and has a circumferential end for contacting with the first member. The circumferential ends of the recesses are positioned at different angular positions about the rotational axis. As the support member rotates relative to the base member, the second member can contact the circumferential end of one of the recesses depending on the position of the second member in the radial direction and can move the first member toward the third member, so that the first member can be held between the second member and the third member. Therefore, the laterally pivoted position that can be positioned by the positioning device can change as the second member moves in the radial direction. Therefore, it is possible to rapidly accurately position the tool unit at the laterally pivoted positions.

The third member may be a pair of stopper members positioned on opposite sides of the first member in the circumferential direction. Each of the recesses has opposite circumferential ends for contacting with the second member and may have a configuration symmetrical with respect to a central line extending in the radial direction. The recesses have different circumferential lengths and depths.

The positioning device may further include a holding device resiliently holding the first member in a position where the second member opposes to one of the recesses positioned nearest to the rotational axis. Therefore, when the second member is withdrawn from the first member, the first member can automatically move its initial position. Hence, it is possible to improve the operability of the positioning device.

The positioning device may further include an operation lever operable by an operator for moving the second member in the radial direction. The second member may be a pin having an axis extending in the radial direction.

In another embodiment, the cutting device includes first and second positioning devices each configured to be able to position the tool unit at any one of a plurality of laterally tilted positions. Each of the first and second positioning devices includes a first member and at least one second member. The first member is movably mounted to one of the base member and the support member. The at least one second member is mounted to the other of the base member and the support member, so that the first member can contact the at least one second member to position the tool unit at different laterally tilted positions depending on the position of the first member. With this arrangement, it is possible to rapidly accurately position the tool unit at a plurality of laterally tilted positions.

The first positioning device and the second positioning device may be operable independently of each other. The cutting device may further include a third positioning device that can position the tool unit at a vertical position. The at least one second members may be a plurality of bolts threadably engaged with the other of the base member and the support member.

The laterally tilted positions that can be positioned by the first positioning device may include a 45° tilted position and a 48° tilted position. The laterally tilted positions that can be positioned by the second positioning device may include a 22.5° tilted position and a 33.9° tilted position.

The first member of the first positioning device may be rotatably supported by one of the base member and the support member and may have a plurality of positioning surfaces spaced from a rotational axis of the first member by different distances from each other, so that any one of the positioning surfaces of the first member can contact the at least one second members depending on the position of the first member.

Alternatively, the first member may be axially movably supported by the one of the base member and the support member, and a plurality of the second members may be positioned at different positions with respect to a moving direction of the first member, so that the first member can contact any one of the second members depending on the position of the first member.

In another embodiment, the cutting device includes a first positioning device and a second positioning device. The first positioning device can position the tool unit at a vertical position and at least a first laterally tilted position. The second positioning device can position the tool unit at least a second laterally tilted position. The first positioning device includes a first member and at least two second members. The first member is mounted to one of the base member and the support member, so that the first member can move between an operative position and an inoperative position. The second members are mounted to the other of the base member and the support member. The first member can contact with any one of the second members to position the tool unit at the vertical position or at least the first tilted position when the first member is positioned at the operative position. The second positioning device can position the tool unit at at least the second laterally tilted position when the first member of the first positioning device is positioned at the inoperative position. Therefore, the tool unit can be positioned at at least three different tilted positions by the operation of the first member of the first positioning device. Hence, it is possible to rapidly accurately position the tool unit at the laterally tilted positions.

The second positioning device may position the tool unit at the second laterally tilted position and a third laterally tilted position. The positioning device may further include a third member and two fourth members. The third member is mounted to the one of the base member and the support member. The fourth members are mounted to the other of the base member and the support member. The third member can contact with any one of the fourth members to position the tool unit at the second laterally tilted position or the third laterally tilted position.

The second members and/or the fourth members may be bolts that threadably engage with the one of the base member and the support member.

(First Embodiment)

A cutting device 1 according to a first embodiment of the present invention will now be described with reference to FIGS. 1 to 5. The cutting device 1 of this embodiment generally includes a table 2 for placing thereon a workpiece W. A base 3 supports the table 2 such that the table 2 can rotate within a predetermined angular range within a horizontal plane. A support 4 is disposed at a rear portion (left end portion as viewed in FIG. 1) of the table 2. A tool unit 10 is supported on the support 4. An operator for operating the cutting device 1 may be positioned on the right side as viewed in FIG. 1. Therefore, the description will be made assuming the side of the operator (right side in FIG. 1) as a front side, and assuming the side opposite to the operator (left side in FIG. 1) as a rear side. Also, the description will be made assuming the right side and the left side of the operator as a right side and a left side, respectively. A grip 2a operable by the operator and a lock mechanism 2b for releasably locking the rotational position of the table 2 are disposed on the front side of the table 2.

A fence 5 for positioning the workpiece W with respect to a direction parallel to the surface of the table 2 (i.e., the horizontal direction) is disposed above the table 2. The fence 5 is attached to the base 3 and extends over the table 2. The fence 5 is spaced from the upper surface of the table 2 by a small clearance, so that the table 2 can rotate without being interfered by the fence 5. A clamp device not shown can fix the workpiece W in position after positioning of the workpiece W by the fence 5.

The support 4 includes a pair of right and left slide bars 6 for supporting the tool unit 10 such that the tool unit 10 can slide in a horizontal direction relative to the table 2, a pivotal support device 20 for enabling the tool unit 10 to tilt in right and left directions as viewed from the side of the operator (i.e., a direction perpendicular to the sheet surface of FIG. 2), and a support arm 8 for enabling the tool unit 10 to tilt in a vertical direction. When cutting the workpiece W by the sliding movement of the tool unit 10 in the horizontal direction via the right and left slide bars 6, the tool unit 10 is moved from the right side to the left side as vied in FIG. 1.

The support arm 8 has an inverted L-shaped configuration. A body case 11 of the tool unit 10 is vertically pivotally connected to the front end of the support arm 8 via a pivot shaft 9. The body case 11 covers a substantially upper half of a circular cutting tool 12 that has a spindle 13 rotatably supported on the body case 11. The spindle 13 is coupled to an electric motor (not shown) via a reduction gear mechanism. The motor is mounted to a backside portion of the body case 11. Therefore, as the motor is driven, the cutting tool 12 rotates in a clockwise direction in FIG. 1 as indicated by an outline arrow 12a. In this embodiment, the rotational axis of the spindle 13 coincides with the rotational axis of the cutting tool 12.

A handle 14 adapted to be grasped by the operator is disposed at the backside portion of the body case 11 and has a switch lever or a trigger 15 mounted thereto. Therefore, when the operator grasps the handle 14 and pulls the trigger 15 with his or her fingers, the motor is started to rotate the cutting tool 12. As the operator tilts the tool unit 10 downward while he or she grasps the handle 14, the rotating cutting tool 12 can cut the workpiece W. The movable cover 16 can open and close the lower half of the cutting tool 12 in response to the vertically tilting movement of the tool unit 10. More specifically, a link arm 17 is interposed between the movable cover 16 and the front portion of the support arm 8. The rear end (left end as viewed in FIG. 1) of the link arm 17 is vertically pivotally connected to the front portion of the support arm 8 via a support shaft 17a. The support shaft 17a is offset from the pivot shaft 9 by a predetermined distance. As the tool unit 10 tilts vertically, the link arm 17 pivots about the support shaft 17a relative to the support arm 8. Therefore, as the tool unit 10 tilts vertically downward, the movable cover 16 rotates in a counterclockwise direction as viewed in FIG. 1 so as to be opened. As a result, the lower half of the cutting tool 12 is gradually uncovered. On the other hand, as the tool unit 10 tilts upward, the movable cover 16 rotates in a clockwise direction as viewed in FIG. 1, so that the lower half of the cutting tool 12 is gradually closed.

The pivotal support device 20 will now be described. The pivotal support device 20 includes a base member 21 and a support member 22. The base member 21 is fixedly mounted to the rear ends of the slide bars 6, so that the base portion 21 is supported on the rear portion of the table 2 via the slide bars 6.

Figure 2:
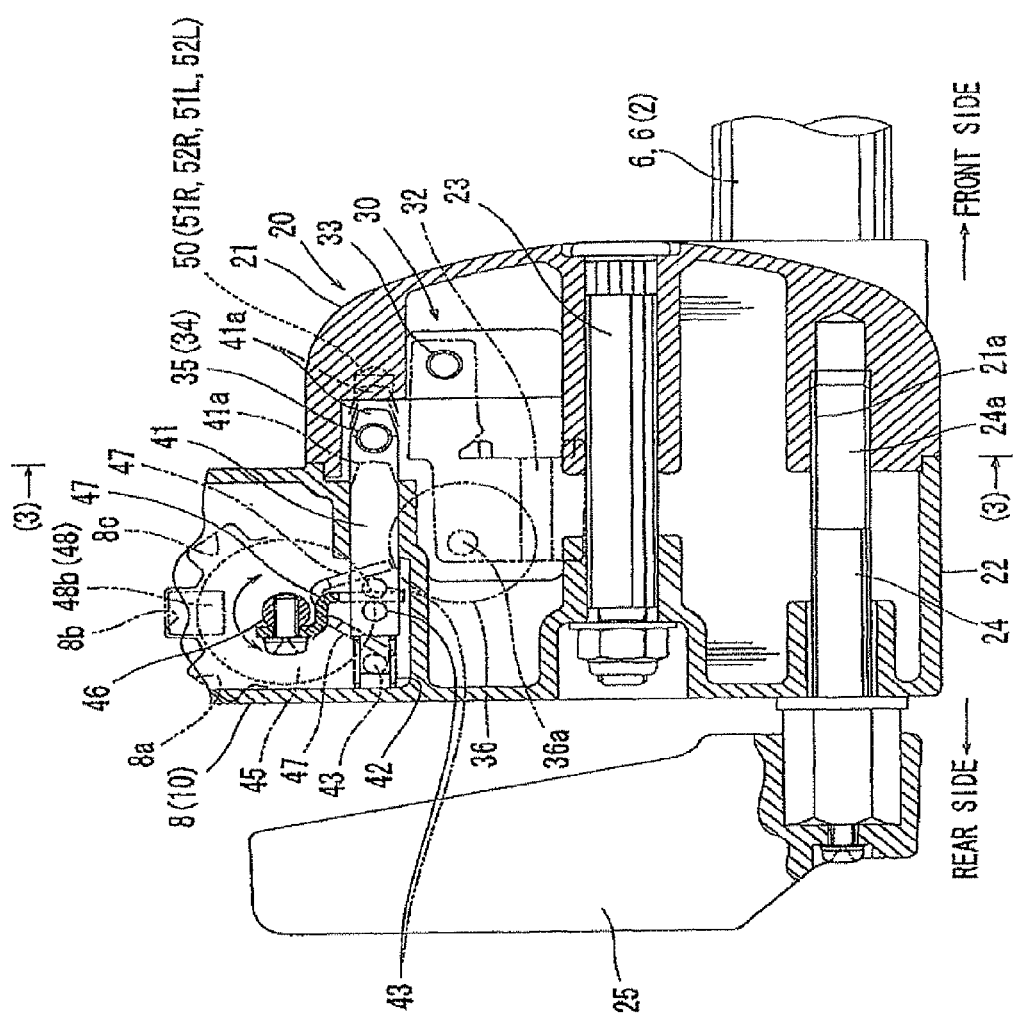
FIG. 2 is a vertical sectional view of a pivotal support device of the table cutting device.

As shown in FIG. 2, the support member 22 is rotatably connected to the base member 21 via a support shaft 23. The support shaft 23 extends parallel to the upper surface of the table 2 and perpendicular to the axis of rotation of the cutting tool 12. In addition, the axis of the support shaft 23 extends through the center of rotation of the table 2 in a plan view. The support arm 8 is formed integrally with the support member 22. Therefore, the cutting unit 10 can be tilted in right and left directions by rotating the support member 22 about the support shaft 23.

The rotational position of the support member 22 relative to the base member 21 can be fixed by a fixing member 24. In this embodiment, the fixing member 24 is a fixing screw and has a threaded shaft 24a that engages a threaded hole 21a formed in the base member 21. Therefore, rotating the fixing member 24 in one direction to tighten the threaded shaft 24a can fix the support member 22 in position, and rotating the fixing member 24 in an opposite direction to loosen the threaded shaft 24a can permit the support member 22 to rotate relative to the base member 21.

The rotational position of the support member 22 relative to the base member 21, and eventually the rightward or leftward tilted position (i.e., the laterally tilted position) of the tool unit 10 can be set to various angular positions. In this embodiment, the settable angular positions include a 0° position (i.e., a vertical position), right tilted positions including a right 22.5° position, a right 33.9° position and a right 45° position, and left tilted positions including a left 22.5° position, a left 33.9° position and a left 45° position. At the 0° position, the cutting tool 12 is positioned within a reference plane S shown in FIG. 3, which is perpendicular to the upper surface of the table 2. At the right and left 22.5° positions, the right and left 33.9° positions and the right and left 45° positions, the cutting tool 12 is inclined at angles of 22.5°, 33.9° and 45°, respectively, relative to the reference plane S.

The 0° position or the vertical position is used when the workpiece W is cut with the rotational axis (i.e., the axis of the spindle 13) of the cutting tool 12 positioned parallel to the upper surface of the table 2. Thus, in this position, the cutting tool 12 is positioned perpendicular to the upper surface of the table 2. The 0° position or the vertical position is most frequently used for cutting workpieces and can be set by a first positioning device 30.

The first positioning device 30 includes a positioning lever 31 that is pivotally supported within the support member 22 via a support shaft 32. The support shaft 32 extends parallel to the support shaft 23. A torsion spring (not shown) normally biases the positioning lever 31 to pivot about the support shaft 32 such that the positioning lever 31 is held at a restricting position, where the positioning lever 31 is pressed against the inner wall of the support member 22. An operative position of the positioning lever 31 is indicated by solid lines in FIG. 3. An inoperative position of the positioning lever 31 is indicated by chain lines in FIG. 3.

First, second and third stopper bolts 33, 34 and 35 are threadably engaged with the base member 21. More specifically, the first to third stopper bolts 33, 34 and 35 are threadably engaged with a substantially upper half part of the base member 21 from the outer side of the base member 21, such that end portions of shanks of the first to third stopper bolts 33, 34 and 35 protrude into the base member 21. Therefore, the protruding lengths of the first to third stopper bolts 33, 34 and 35 into the base member 21 can be adjusted from the outer side of the base member 21 by rotating the first to third stopper bolts 33, 34 and 35, respectively. The first stopper bolt 33 constitutes a part of the first positioning device 30, while the second and third stopper bolts 34 and 35 constitute a part of a second positioning device 40 as will be explained later.

Figure 3:
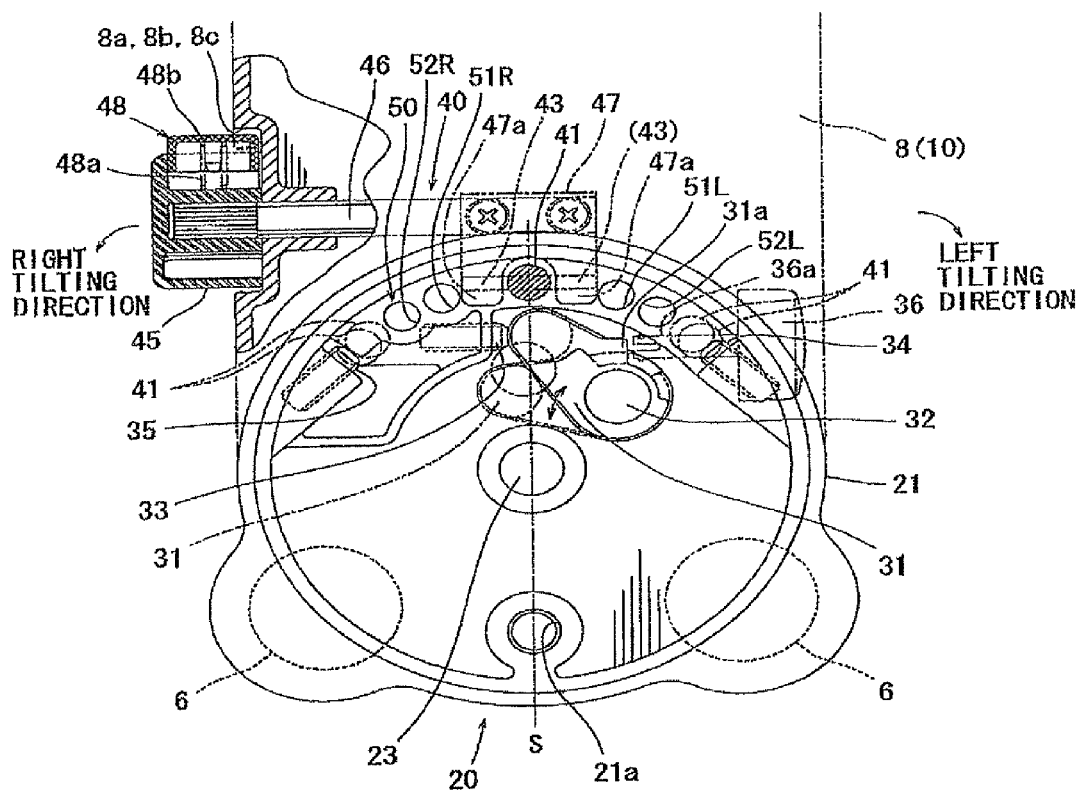
FIG. 3 is a cross sectional view taken along line (3)-(3) in FIG. 2 and showing the internal structure of the pivotal support device as viewed from the rear side when a tool unit is positioned at a vertical position.

The first stopper bolt 33 is positioned between the second and third stopper bolts 34 and 35 in the circumferential direction and is used for positioning the tool unit 10 at the vertical position. The first stopper bolt 33 extends substantially parallel to the upper surface of the table 2. The second stopper bolt 34 positioned on the right side as viewed in FIG. 3 is used for positioning the tool unit 10 at the right 45° position. The third stopper bolt 35 positioned on the left side as viewed in FIG. 3 is used for positioning the tool unit 10 at the left 45° position. Each of the second and third stopper bolts 34 and 35 is oriented to be inclined at an angle of 45° relative to the upper surface of the table 2.

By adjusting the protruding lengths of the first to third stopper bolts 33, 34 and 35, the 0° position, the right 45° position and the left 45° position can be finely adjusted, respectively.

As shown in FIG. 3, the tool unit 10 can be positioned at the 0° position when the tip end portion of the positioning lever 31 contacts the first stopper bolt 33. The tool unit 10 can then be fixed at the 0° position by fixing the base portion 21 in position with respect to the rotational direction by the tightening operation of the fixing member 24.

When the positioning lever 31 is held in the operative position, where the tip end of the positioning lever 31 is in contact with the inner circumferential wall of the support member 22, the tool unit 10 can be tilted leftward but cannot be tilted rightward. In order to enable the tool unit 10 to be tilted rightward, the positioning lever 31 is moved from the operative position to the inoperative position. This movement of the positioning lever 31 is allowed by pushing a push button 36 that is mounted to the lateral side of the support member 22. The button 36 has an operation shaft 36a extending into the support member 22. When the positioning lever 31 is in the operative position, the tip end of the operation shaft 36a is opposed to a projection 31a formed on the positioning lever 31. A spring (not shown) normally holds the operation shaft 36a at a position, where the tip end of the operation shaft 36a is spaced by a small distance from the projection 31a. Therefore, if the operator pushes the button 36 leftward as viewed in FIG. 3 against the biasing force of the spring, the tip end of the operation shaft 36a is pressed against the projection 31a, so that the positioning lever 31 pivots from the operative position to the inoperative position indicated by chain lines in FIG. 3.

When the positioning lever 31 is positioned at the inoperative position, the tip end of the positioning lever 31 may not contact the first stopper bolt 33. Therefore, the support member 22 can rotate relative to the base member 21 in the counterclockwise direction as viewed in FIG. 3, so that the tool unit 10 can be tilted rightward. If the operator releases the push button 36 after the tool unit 10 has passed through the 0° position (i.e., the vertical position), the positioning lever 31 automatically returns to the operative position. Therefore, if the tool unit 10 is tilted in opposite direction after passing through the 0° position, the positioning lever 31 again contacts the first stopper bolt 33, so that the tool unit 10 can be accurately positioned at the 0° position.

The second positioning device 40 will now be described. As shown in FIGS. 2 and 3, the second positioning device 40 includes a positioning pin 41 having a tapered tip end 41a. The positioning pin 41 is positioned proximal to the base portion of the support arm 8 and is disposed at the upper portion of the support member 22. The positioning pin 41 extends parallel to the support shaft 23 and is supported by the upper portion of the support member 22 such that the positioning pin 41 can move in an axial direction within a predetermined range. A compression spring 42 biases the positioning pin 41 in a forward direction (right direction as viewed in FIG. 2), so that the positioning pin 41 is normally held at a lock position for preventing the support member 22 from rotating relative to the base member 21 as will be explained later. When the positioning pin 41 is moved in the axial direction form the lock position to an unlock position against the biasing force of the compression spring 42, the support member 22 can rotate relative to the base member 21. In addition, when the positioning pin 41 is positioned at an intermediate position between the lock position and the unlock position, the lateral side of the positioning pin 41 can contact the second stopper bolt 34 or the third stopper bolt 35 as will be explained later. In this way, the positioning pin 41 of this embodiment can perform different functions at the lock position, the unlock position and the intermediate position.

The positioning pin 41 can be moved between the lock position, the unlock position and the intermediate position by the operation of a switching member 45. The switching member 45 is mounted to the lateral side of the base portion of the support arm 8. In this embodiment, the switching member 45 is a cylindrical knob or a dial. The switching member 45 has a rod 46 that extends into the support arm 8. The rod 46 is supported by the support arm 8 such that the rod 46 can rotate about it axis. A tip end of the rod 46 is positioned within the support arm 8 and has an actuation plate 47 attached thereto. As shown in FIG. 2, the actuation plate 47 has a pair of parallel extensions 47a defining a gap therebetween, through which the positioning pin 41 extends. As shown in FIG. 2, an actuation shaft 43 is attached to a part of the positioning pin 41 and extends therethrough in the radial direction. The actuation shaft 43 has opposite ends that can contact the extensions 47a of the actuation plate 47, respectively, from their rear sides. Because the positioning pin 41 is biased toward the lock position by the compression spring 42, the opposite ends of the actuation shaft 43 are forced to contact with the extensions 47a.

As the operator rotates the switching member 45, the rod 46 rotates about its axis, so that the actuation plate 47 pivots in forward and rearward directions about the axis of the rod 46 as indicated by chain lines in FIG. 2. As the actuation plate 47 pivots rearward (leftward as viewed in FIG. 2), the actuation shaft 43 is forced to move rearward, so that the positioning pin 41 can be moved from the lock position to the intermediate position and further to the unlock position against the biasing force of the compression spring 42. On the other hand, as the actuation plate 47 pivots forward (rightward as viewed in FIG. 2), the actuation shaft 43 moves forward to follow the movement of the actuation plate 47, so that the positioning pin 41 can be moved from the unlock position to the intermediate position and further to the lock position. In FIG. 3, the positions of the positioning pin 41 and the actuation plate 47 taken when the positioning pin 41 is in the lock position and the unlock position are indicated by chain lines. The positions of the positioning pin 41 and the actuation plate 47 taken when the positioning pin 41 is in the intermediate position are indicated by solid lines.

As shown in FIGS. 2 and 3, a positioning recess device 50 is provided within the base member 21 and includes first, second, third and fourth positioning holes 51L, 51R, 52L and 52R. The first to fourth positioning holes 51L, 51R, 52L and 52R are formed in a wall part of the base member 21, which is opposed to the support member 22, and extend substantially perpendicular to the support shaft 23. Each of the first to fourth positioning holes 51L, 51R, 52L and 52R is configured as a circular hole, and the diameter and the depth of the circular hole are determined to permit insertion of the positioning pin 41 until the tapered chip end 41a reaches an intermediate position along the depth. In addition, the first to fourth positioning holes 51L, 51R, 52L and 52R are positioned on a circle about the axis of the support shaft 23 (i.e., the rotational axis of the support member 22), which circle has a radius equal to the distance between the axis of the positioning pin 41 and the axis of the support shaft 23. Therefore, as the support member 22 is rotated relative to the base member 21 about the support shaft 23 for tilting the tool unit 10 in the left and right directions, the positioning pin 41 can move to a position where the positioning pin 41 is positioned on the same axis as either one of the first to fourth positioning holes 51L, 51R, 52L and 52R.

As show in FIG. 3, the first and third positioning holes 51L and 52L are positioned on the left side of the reference plane S, while the second and fourth positioning holes 51R and 52R are positioned on the right side of the reference plane S. In addition, the first and third positioning holes 51L and 52L are positioned to be symmetrical with the second and fourth positioning holes 51R and 52R with respect to the reference plane S. When the tool unit 10 is positioned at the 0° position, the axis of the positioning pin 41 is positioned within the reference plane S. As described previously, the tool unit 10 can be positioned at the 0° position when the positioning lever 31 of the first positioning device 30 contacts the first stopper bolt 33 to restrict the rotation of the support member 22 relative to the base member 21. At this position, the positioning pin 41 is held to simply contact the wall part of the base member 21 opposing to the support member 22.

The first and second positioning holes 51L and 51R that are closer to the reference plane S are angularly offset from the reference plane S in leftward and rightward directions, respectively, by an angle of 22.5°. The third and fourth positioning holes 52L and 52R that are farther from the reference plane S are angularly offset from the reference plane S in leftward and rightward directions, respectively, by an angle of 33.9°. Therefore, when the positioning pin 41 is inserted into the first positioning hole 51L by the rotational operation of the switching member 45, the tool unit 10 can be positioned at the left 22.5° position. Similarly, when the positioning pin 41 is inserted into the second positioning hole 51R, the tool unit 10 can be positioned at the right 22.5° position. When the positioning pin 41 is inserted into the third positioning hole 52L, the tool unit 10 can be positioned at the left 33.9° position. When the positioning pin 41 is inserted into the fourth positioning hole 52R, the tool unit 10 can be positioned at the right 33.9° position. After being positioning at any of these positions, the tool unit 10 can be fixed in position by tightening the fixing member 24 by the operation of the fixing lever 25.

When the positioning pin 41 is positioned at the intermediate position, the positioning pin 41 may not be inserted into any of the first to fourth positioning holes 51L, 51R, 52L and 52R. However, the lateral side of he positioning pin 41 can contact the second stopper bolt 34 and the third stopper bolt 35 as the tool unit 10 is pivoted leftward and rightward, respectively.

Figure 4:
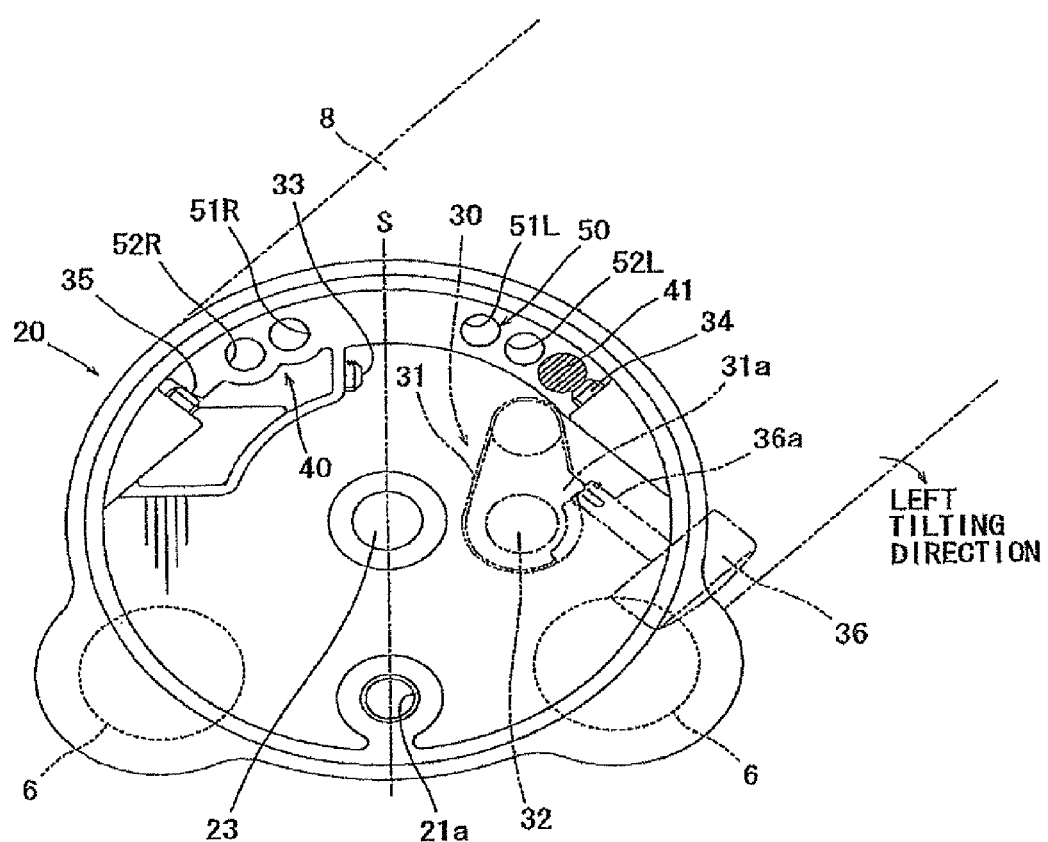
FIG. 4 is a cross sectional view similar to FIG. 3 but showing the operation when the tool unit is positioned at a left 45° tilt position.
Figure 5:
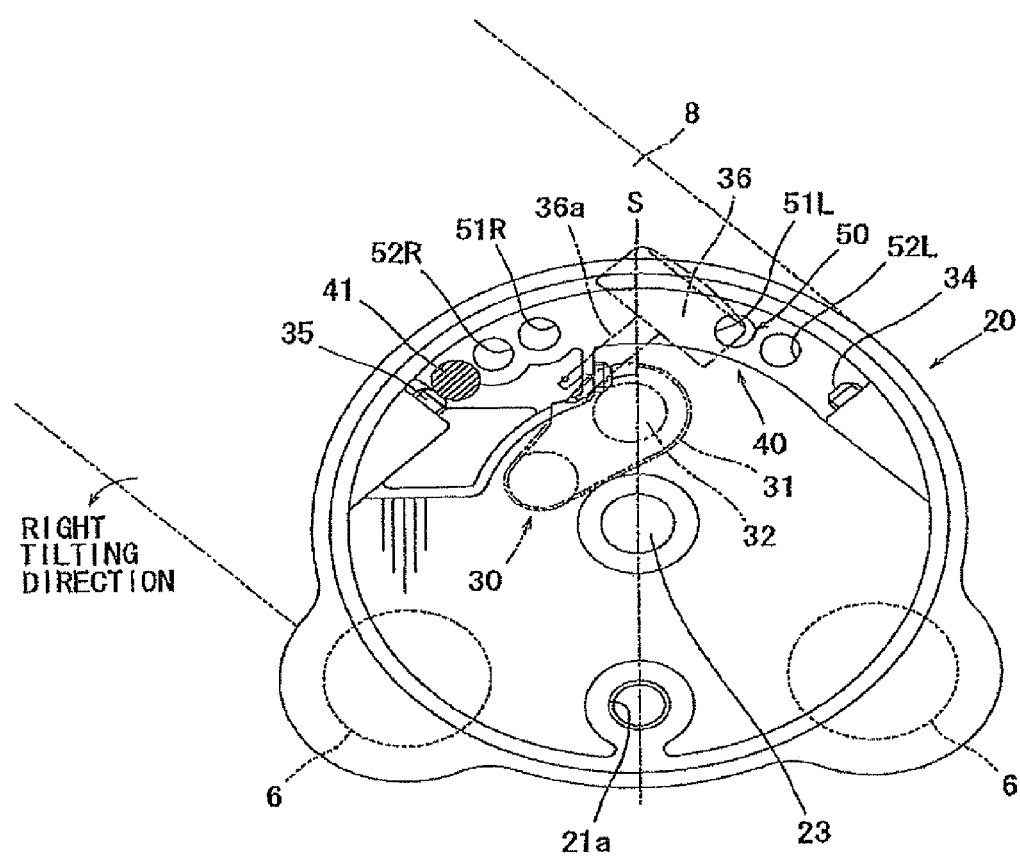
FIG. 5 is a cross sectional view similar to FIG. 3 but showing the operation when the tool unit is positioned at a right 45° tilt position.

FIG. 4 shows the state where the tool unit 10 is tilted leftward by an angle of 45°, while the positioning pin 41 is held at the intermediate position. In this state, the lateral side of the positioning pin 41 is in contact with the second stopper bolt 34. Therefore, the tool unit 10 can be positioned at the left 45° position. FIG. 5 shows the state where the tool unit 10 is tilted rightward by an angle of 45°, while the positioning pin 41 is held at the intermediate position. In this state, the lateral side of the positioning pin 41 is in contact with the third stopper bolt 35. Therefore, the tool unit 10 can be positioned at the right 45° position.

In order to change the position of the tool unit 10 from one of the right and left tilted positions to the other tilted position, the operator may rotate the switch member 45 to shift the positioning pin 41 to the intermediate position or the unlock position against the biasing force of the compression spring 42, so that the positioning pin 41 is removed from the positioning hole 51L, 51R, 52L or 52R into which the positioning pin 41 has been inserted.

As the positioning pin 41 moves to the unlock position by the operation of the switching member 45, the positioning pin 41 retreats to a position, where it may not contact the second and third stopper bolts 34 and 35 (leftmost position in FIG. 2). Therefore, it is possible to tilt the tool unit 10 leftward by an angle larger than 45° (for example, 48°). In addition, by pushing the button 36 to move the positioning lever 31 to the inoperative position, it is possible to tilt the tool unit 10 rightward by an angle larger than 45° (for example, 48°). After that tool unit 10 has been tilted rightward or leftward, for example, by an angle of 48°, the tool unit 10 can be fixed in position by the operation of the fixing lever 25.

As shown in FIG. 3, a detent mechanism 48 is associated with the circumferential surface of the switching member 45. With this detent mechanism 48, it is possible to hold the switching member 45 at three different positions with respect to the rotational direction to correspond to the lock position, the intermediate position and the unlock position.

The detent mechanism 48 includes an engaging member 48b biased by a compression spring 48a in a direction away form the switching member 45, i.e., a direction radially outward from the switching member 45. The detent mechanism 48 further includes a first depression 8a, a second depression 8b and a third depression 8c formed in a circumferential surface of a circular groove that is formed in the side surface of the support arm 8 for receiving the switching member 45. The first depression 8a, the second depression 8b and the third depression are positioned to oppose to the outer circumferential surface of the switching member 45 and within an angular range of about 45° so as to correspond to the lock position, the intermediate position and the unlock position of the positioning pin 41, respectively. As described previously, as the switching member 45 rotates, the rod 46 rotates about its axis to pivot the actuation plate 47 forward and rearward to move the positioning pin 41 between the lock position and the unlock position (see FIG. 2).

When the switching member 45 is rotated to a position corresponding to the lock position of the positioning pin 41, the engaging member 48b engages the first depression 8a, so that the positioning pin 41 can be held at the lock position. When the switching member 45 is rotated to a position corresponding to the intermediate position of the positioning pin 41, the engaging member 48b engages the second depression 8b, so that the positioning pin 41 can be held at the intermediate position indicated by solid lines in FIG. 2. When the switching member 45 is rotated to a position corresponding to the unlock position of the positioning pin 41, the engaging member 48b engages the third depression 8c, so that the positioning pin 41 can be held at the unlock position. By loosening the fixing lever 25 with the positioning pin 41 held at the unlock position, it is possible to tilt the tool unit 10 leftward from the 0° position. It is also possible to tilt the tool unit 10 rightward by pushing the button 36. Pressing the engaging member 48b against the biasing force of the compression spring 48a by fingers of the operator may disengage the engaging member 48b from the first depression 8a (or the second depression 8b or the third depression 8c) to enable the switching member 45 to freely rotate.

As described above, according to the table cutting device 1 of this embodiment, the rotational position of the support member 22 about the support shaft 23 can be fixed as the positioning pin 41 is inserted into the positioning recess device 50 (more specifically, any one of the positioning holes 51L, 51R, 52L and 52R). In other words, the laterally tilted position of the tool unit 10 can be fixed or positively positioned without need of check by using an angular scale. Therefore, the positioning operation of the tool unit 10 can be rapidly accurately performed. Hence, the table cutting device 1 is improved in operability.

In addition, because a plurality of positioning holes for receiving the positioning pin 41 are provided on each of the right side and the left side with respect to the reference plane S (two positioning holes 51L and 52L are provided on the left side and two positioning holes 51R and 52R are provided on the right side in the above embodiment), a plurality of angular positions (22.5° position and 33.9° position in this embodiment) can be set on each of the right side and the left side. Therefore, it is possible to increase the number of tilt angles that can be chosen by the operator, so that the table cutting device 1 can be used in a variety of cutting modes.

The above embodiment can be modified in various ways. For example, although the positioning pin 41 has been used as a positioning member, a block-like member having a wedge-like tip end can also be used. Further, although the positioning recess device 50 has the positioning holes, the positioning holes may be replaced with slots each defined between opposite walls arranged in the tilting direction in order to receive the positioning member from opposite sides in the tilting direction and to prevent movement of the positioning member in the tilting direction.

Furthermore, although the present invention has been described in connection with the table cutting device 1 having the slide mechanism for sliding the tool unit 10 in the horizontal direction, the present invention also can be applied to cutting devices that have no slide mechanism.

Furthermore, the first to third stopper bolts 33 to 35 may be replaced with stopper members that are non-adjustably fixed in position relative to the base portion 21.

(Second Embodiment)

A table cutting device 60 according to a second embodiment will now be described with reference to FIGS. 6 to 15. This embodiment is a modification of the first embodiment. Therefore, like members are given the same reference numerals as the first embodiment and the description of these members will not be repeated.

Figure 6:
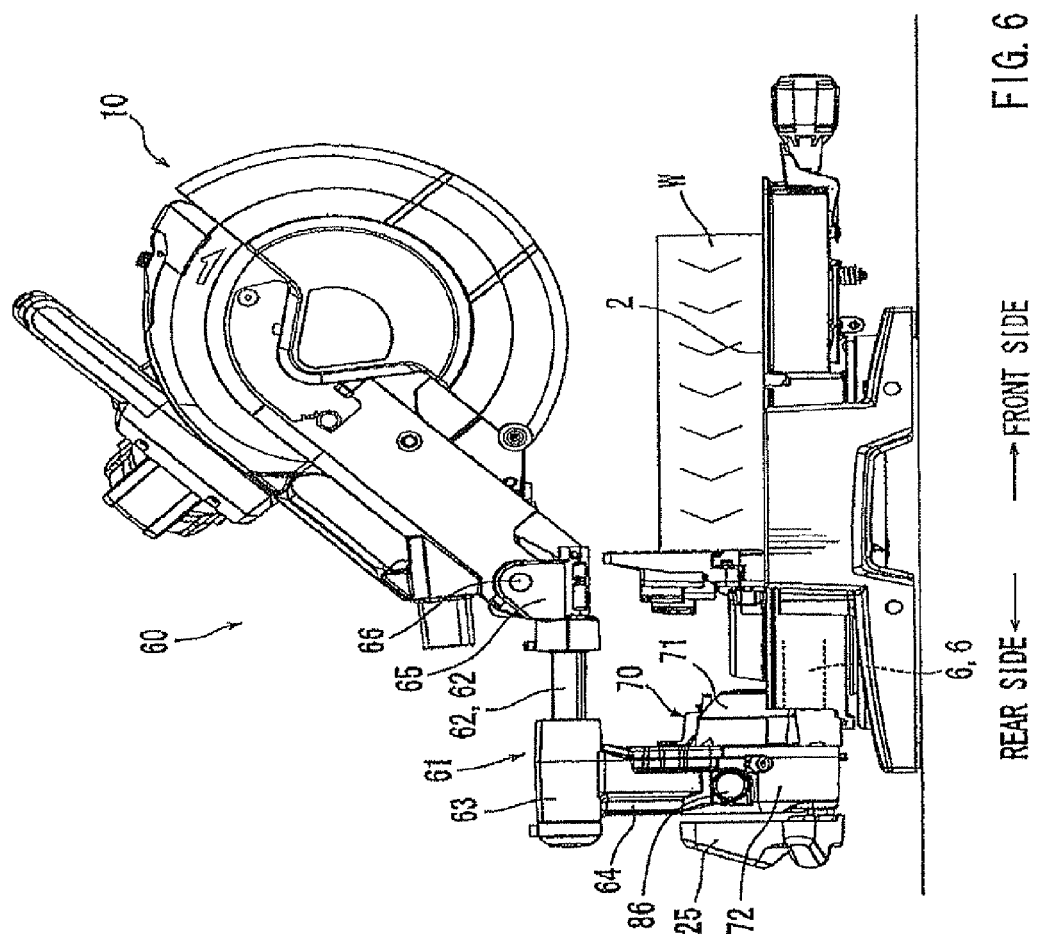
FIG. 6 is a side view of a table cutting device according to a second embodiment of the present invention.
Figure 7:
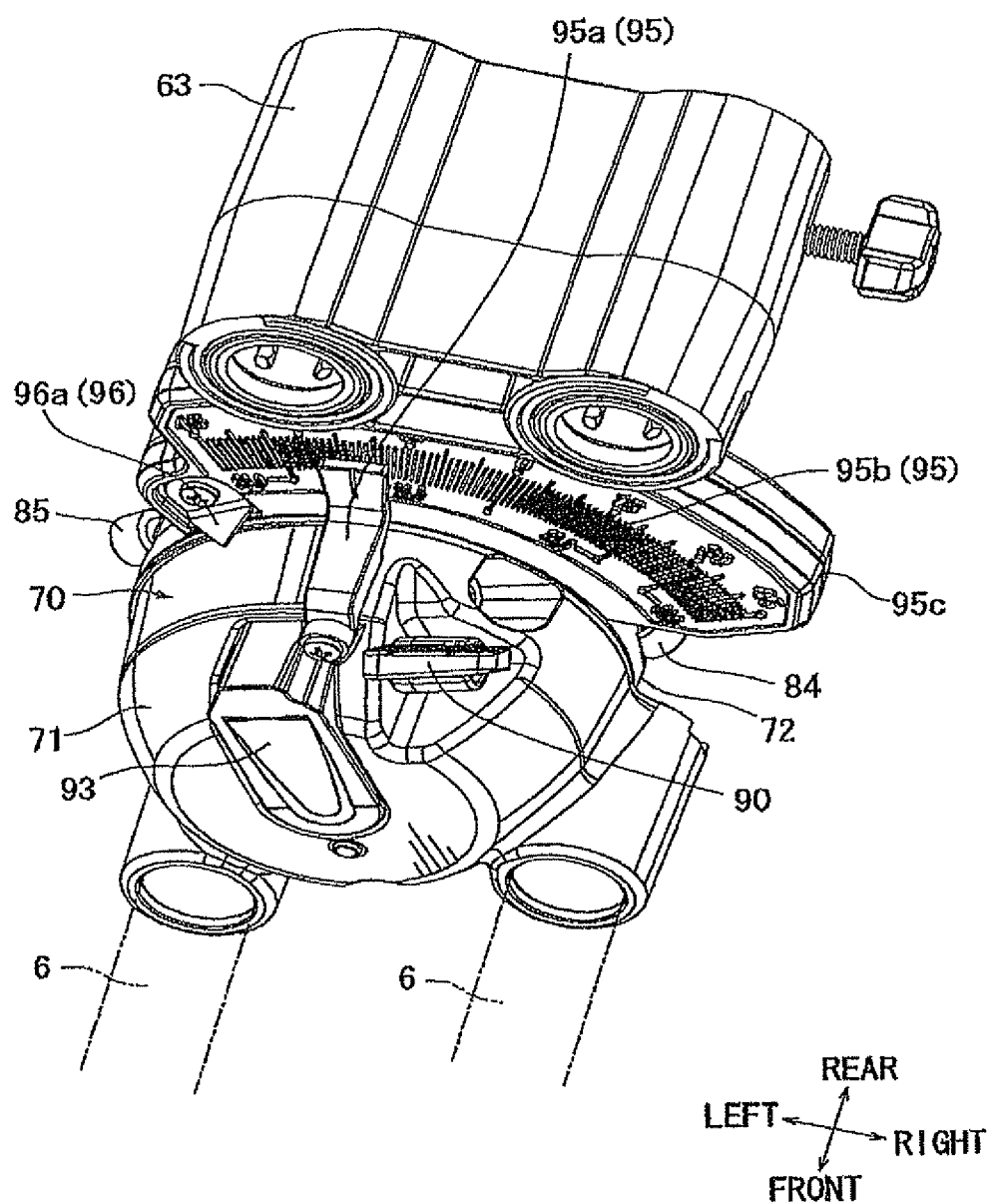
FIG. 7 is a perspective view of the table cutting device and showing a positioning device as viewed from a front and right upper side.

Referring to FIG. 6, the table cutting device 60 has a positioning device 70 for positioning the laterally tilted position of the tool unit 10. In addition, the table cutting device 60 includes upper and lower slide mechanisms. The lower slide mechanism includes a pair of slide bars 6 that are slidable in forward and rearward directions and are positioned below the table 2 as in the first embodiment. The positioning device 70 is mounted to the rear ends of the slide bars 6. The upper slide mechanism is labeled with reference numeral 61 in FIG. 6 and is interleaved between the positioning device 70 and the tool unit 10. The upper slide mechanism 61 includes a pair of right and left slide bars 62 and a slide support member 63 that slidably supports the slide bars 62. The slide support member 63 is mounted to the upper portion of a support arm 64 that is formed integrally with a support member 72 of the positioning device 70. The tool unit 10 is supported on the front ends of the slide bars 62 via a bracket 65. More specifically the tool unit 10 is vertically pivotally mounted to the bracket 65 via a pivot shaft 66. Because the tool unit 10 is supported on the table 2 via the upper and lower slide mechanisms, it is possible to slide the tool unit 10 in the horizontal direction by a large distance than in the case of the table cutting device I of the first embodiment. Therefore, it is possible to cut a workpiece having a large size.

The positioning device 70 is shown in detail in FIGS. 7 to 15 and includes a base member 71 on the side of the table 2 and the support member 72 on the side of the tool unit 10. The base member 71 is mounted to the rear ends of the slide bars 6. As shown in FIGS. 10 and 12 to 15, the support member 72 is rotatably supported by the base member 71 via a support shaft 73. Similar to the support shaft 23 of the first embodiment, the support shaft 73 extends parallel to the upper surface of the table 2 and perpendicular to the axis of rotation of the cutting tool 12. In addition, the axis of the support shaft 73 extends through the center of rotation of the table 2 in a plan view. The tool unit 10 tilts in the right or left direction as the support member 72 rotates relative to the base member 71 about the support shaft 73. The rotational position of the support member 72 relative to the base member 71 can be fixed by the tightening the fixing member 24 by the pivoting operation of the fixing lever 25. Pivoting the fixing lever 25 in the opposite direction to loosen the fixing member 24 allows the support member 72 to rotate relative to the base member 71. In FIGS. 7 to 15, the illustration of the fixing lever 25 and the fixing member 24 is omitted.

The positioning device 70 is also configured to be able to position the tool unit 10 at a plurality of laterally tilted positions in addition to the right and left 45° positions. The table cutting device 60 of the second embodiment also includes a positioning device 80 for determining the 0° position of the tool unit 10. The positioning device 80 is shown in detail in FIGS. 13 and 15. Please note that FIGS. 13 to 15 show views of the internal structure of the support member 72 from the front side and the viewing direction is opposite to the viewing direction of FIGS. 3 to 5.

Figure 13:
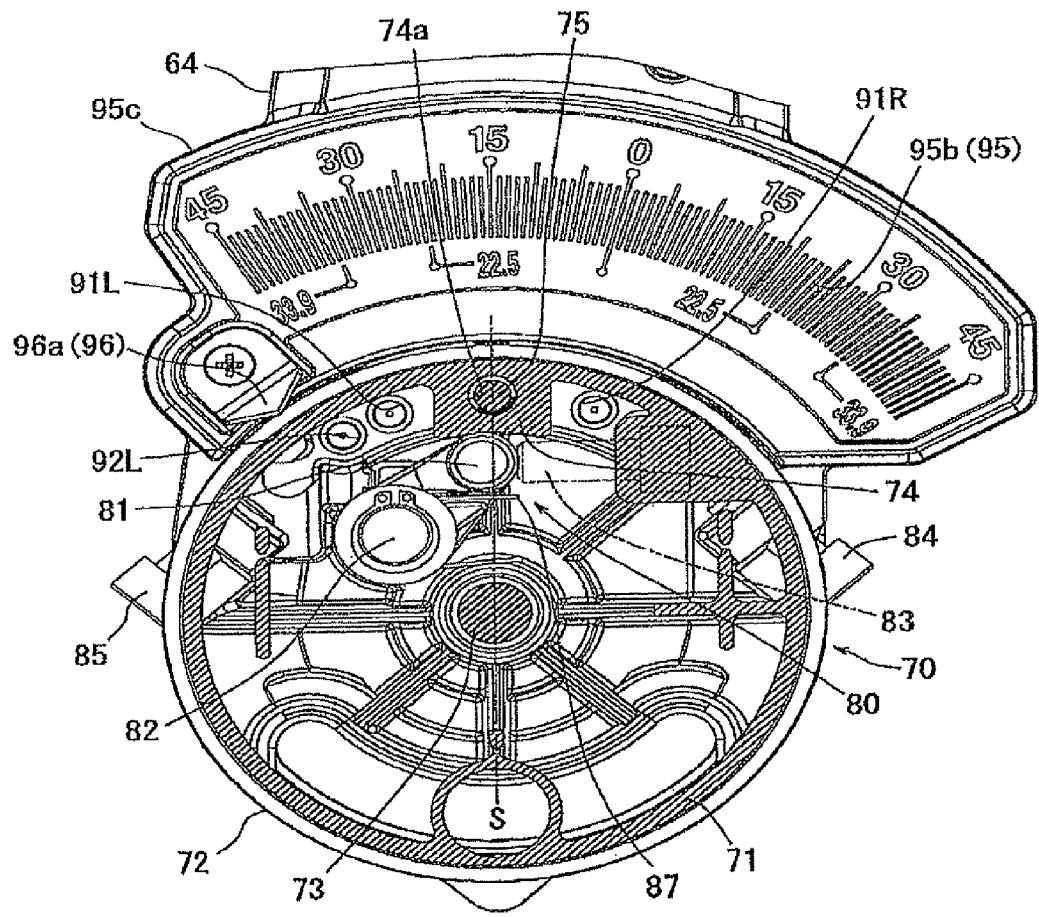
FIG. 13 is a front view showing an internal structure of a pivotal support device and showing the state where the tool unit is positioned at a vertical position.
Figure 14:
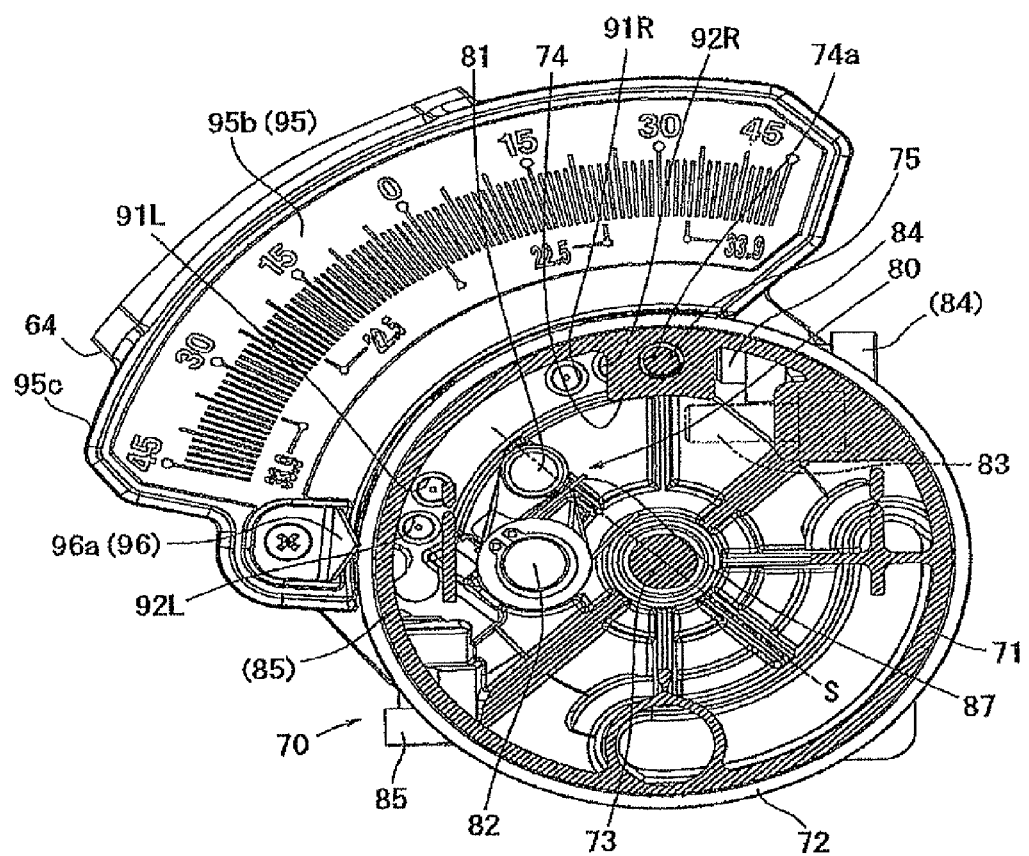
FIG. 14 is a front view similar to FIG. 13 but showing the operation for positioning the tool unit at a left 45° tilt position.
Figure 15:
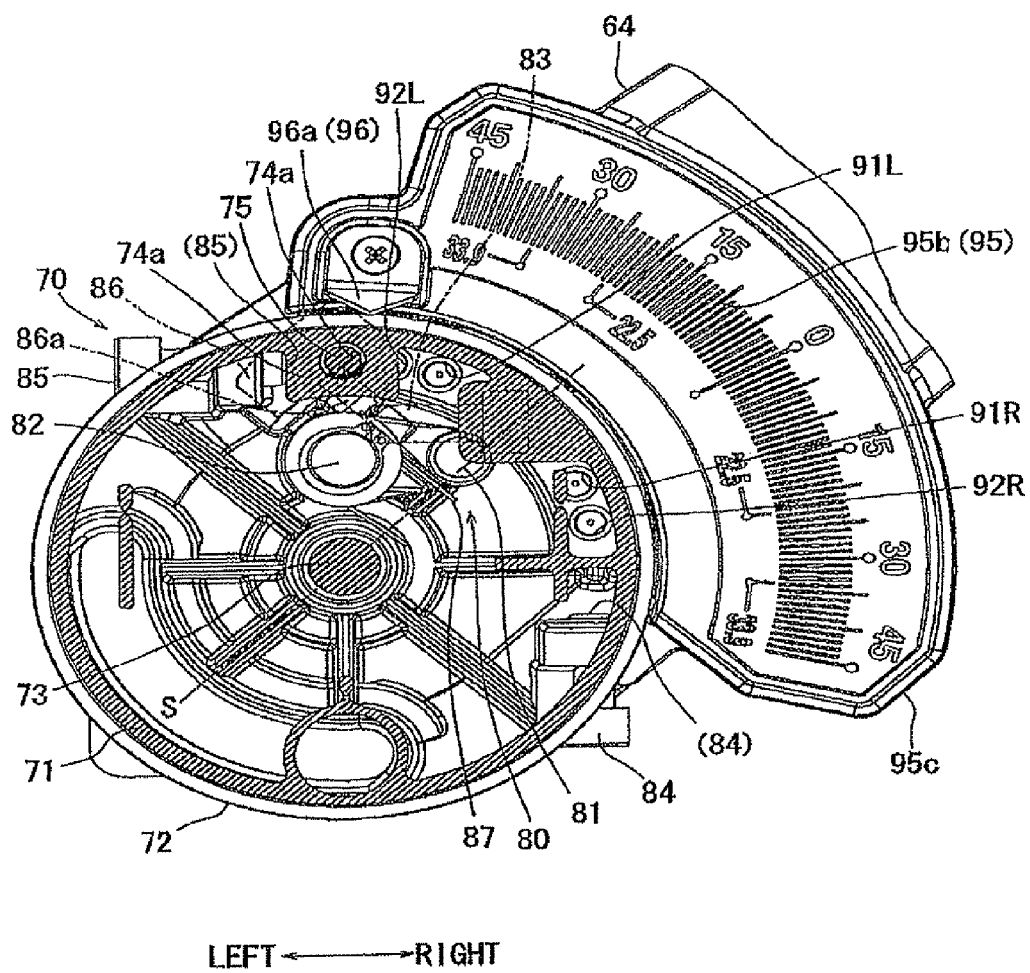
FIG. 15 is a front view similar to FIG. 13 but showing the operation for positioning the tool unit at a right 45° tilt position.
Figure 16:
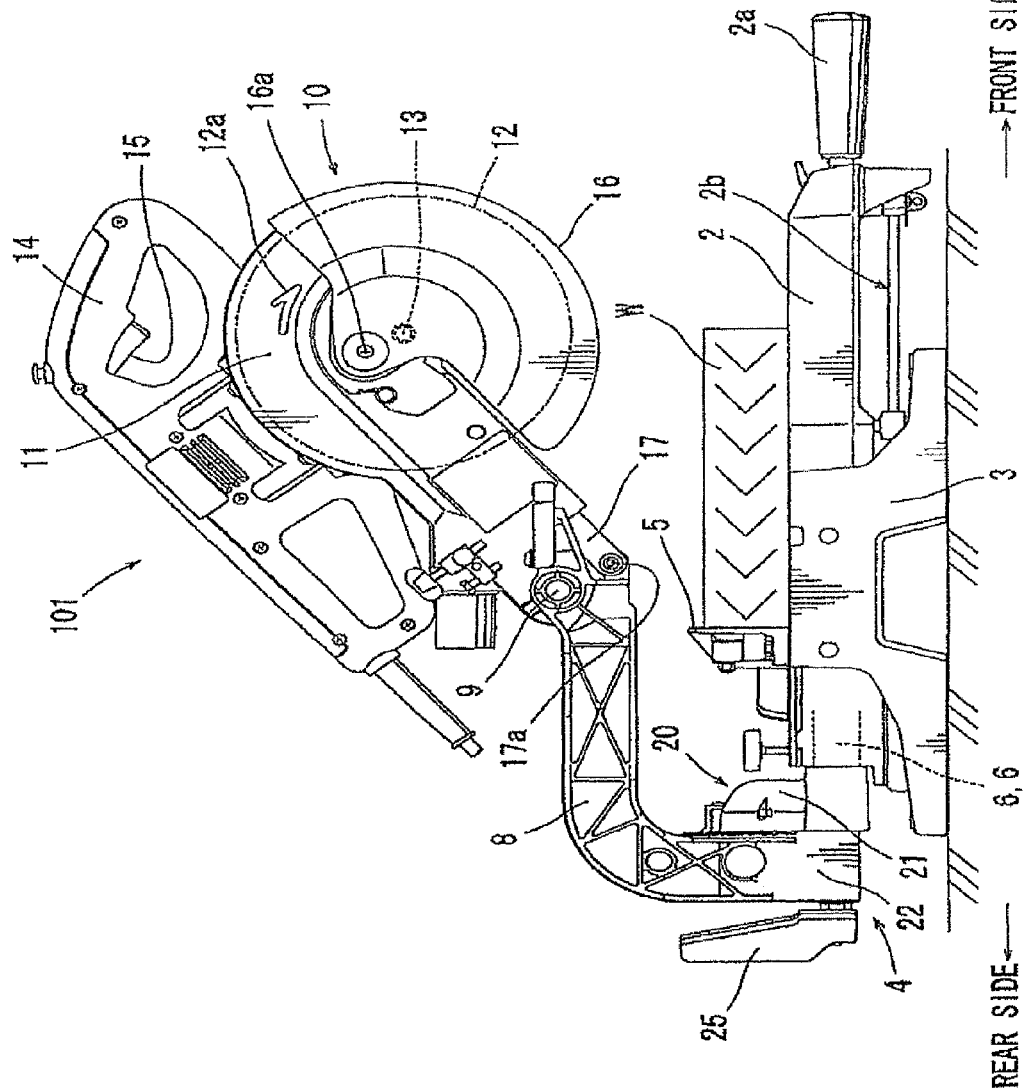
FIG. 16 is a side view of a table cutting device according to a third embodiment of the present invention.

As shown in FIGS. 13 to 15, the positioning device 80 includes a positioning lever 81 pivotally supported within the support member 72 via a support shaft 82 that extends parallel to the support shaft 73. A torsion spring 87 biases the positioning lever 81 toward a lock position, where the tip end of the positioning lever 81 is positioned radially outward (counterclockwise direction as viewed in FIGS. 13 to 15).

A push button 86 is mounted to the left side of the support member 72 (see FIG. 6) and has an actuation shaft 86a extending into the support member 72. The push button 86 is indicated by chain lines in FIG. 15 and the illustration of the push button 86 is omitted in FIGS. 13 and 14. As the push button 86 is pushed into the support member 72, the actuation shaft 86a moves the positioning lever 81 toward an unlock position (clockwise direction as viewed in FIGS. 13 to 15) against the biasing force of the torsion spring 87.

A first stopper bolt 83 is threadably engaged with the right side portion of the base member 71. The tool unit 10 can be positioned at the 0° position by the contact of the positioning lever 81 with the first stopper bolt 83.

A second stopper bolt 84 is threadably engaged with the right side portion of the support member 72 and extends into the support member 72. A third stopper bolt 85 is threadably engaged with the left side portion of the support member 72 and extends into the support member 72. Therefore, as the tool unit 10 is laterally tilted, the second and third stopper bolts 84 and 85 move together with the tool unit 10. On the other hand, the fist stopper bolt 83 does not move together with the tool unit 10. Therefore, the positioning device 70 is different from the first positioning device 30 of the first embodiment. Thus in the first embodiment, the first to third stopper bolts 33 to 35 are all mounted to the base member 21 and the positional relationship between the first to third stopper bolts 33 to 35 does not change with the laterally tilting movement of the tool unit 10.

A stopper block 74 is formed with an upper part of the inner wall of the base member 71. The tool unit 10 can be positioned at the left 45° position by the contact of the second stopper bolt 84 with the right side surface of the stopper block 74 as shown in FIG. 14. The tool unit 10 can be positioned at the right 45° position by the contact of the third stopper bolt 85 with the left side surface of the stopper block 74 as shown in FIG. 14.

The position of the tool unit 10 can be changed from the 0° position shown in FIG. 13 to the left 45° position shown in FIG. 14 by simply tilting the tool unit 10 leftward, because the positioning lever 81 moves away from the first stopper bolt 83. On the other hand, in order to change the position of the tool unit 10 from the 0° position shown in FIG. 13 to the right 45° position shown in FIG. 15, the operator should tilt the tool unit 10 leftward by a small angle and then push the button 86 to move the positioning lever 81 downward from the position opposing to the first stopper bolt 83, so that the positioning lever 81 does not interact with the first stopper bolt 83. Thereafter, the operator tilts the tool unit 10 until the third stopper bolt 85 contacts the left surface of the stopper block 74. Hence, the tool unit 10 can be positioned at the right 45° position. The tool unit 10 can be fixed in any of the 0° position shown in FIG. 13, the left 45° position shown in FIG. 14, and the right 45° position shown in FIG. 15 by the operation of the fixing lever 25.

The positioning device 70 includes a positioning pin 75. The positioning pin 75 corresponds to the positioning pin 41 of the first embodiment but is different from the positioning pin 41 in that the positioning pin 75 is mounted to the base member 71. More specifically, the positioning pin 75 is supported within a support hole 74a formed in the stopper block 74 and extends parallel to the support shaft 73. The positioning pin 75 has front and rear ends that extend forwardly and rearwardly from the stopper block 74, respectively. The rear end of the positioning pin 75 has a tapered tip portion 75a having a conical outer surface. The front end of the tapered tip portion 75a continues with the remaining portion of the positioning pin 75 via a large diameter portion having a diameter larger than the remaining portion of the positioning pin 75. A compression spring 76 is disposed between the front end of the large diameter portion and a stepped portion formed on an inner surface of the support hole 74a, so that the positioning pin 75 is biased toward the lock position (rightward as viewed in FIGS. 10 and 12).

A leaf spring 77 has an upper end portion joined to the front end of the positioning pin 75, which protrudes forwardly from the stopper block 74. A lower end portion of the leaf spring 77 is clamped between a head 73a of the support shaft 73 and the base member 71 so as to be fixed at a position substantially the central portion of the base member 71. An actuation cam 78 is positioned on the rear side of the leaf spring 77 and is mounted to a cam shaft 79 such that the actuation cam 78 can rotate in unison with the cam shaft 79. A switching lever 90 is mounted to the right end of the cam shaft 79, which extends outward from the right side portion of the base member 71. Therefore, the cam shaft 79 rotates as the switching lever 90 pivots in the right or left direction. The actuation cam 78 has an actuation arm 78a.

Figure 9:
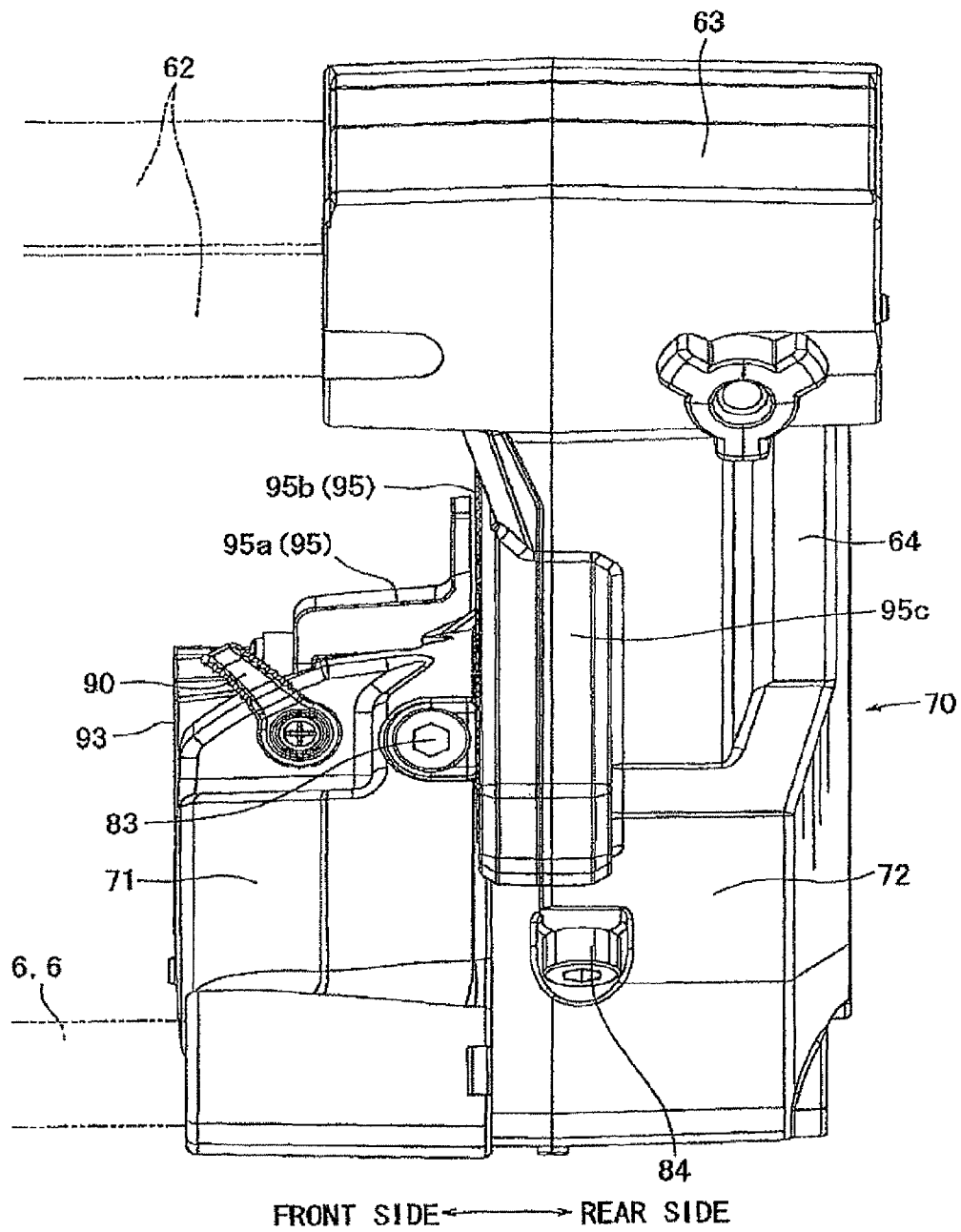
FIG. 9 is a right side view of the positioning device as viewed in a direction of an arrow (9) in FIG. 8 and showing a switching lever positioned at a position corresponding to a lock position of a positioning pin.
Figure 10:
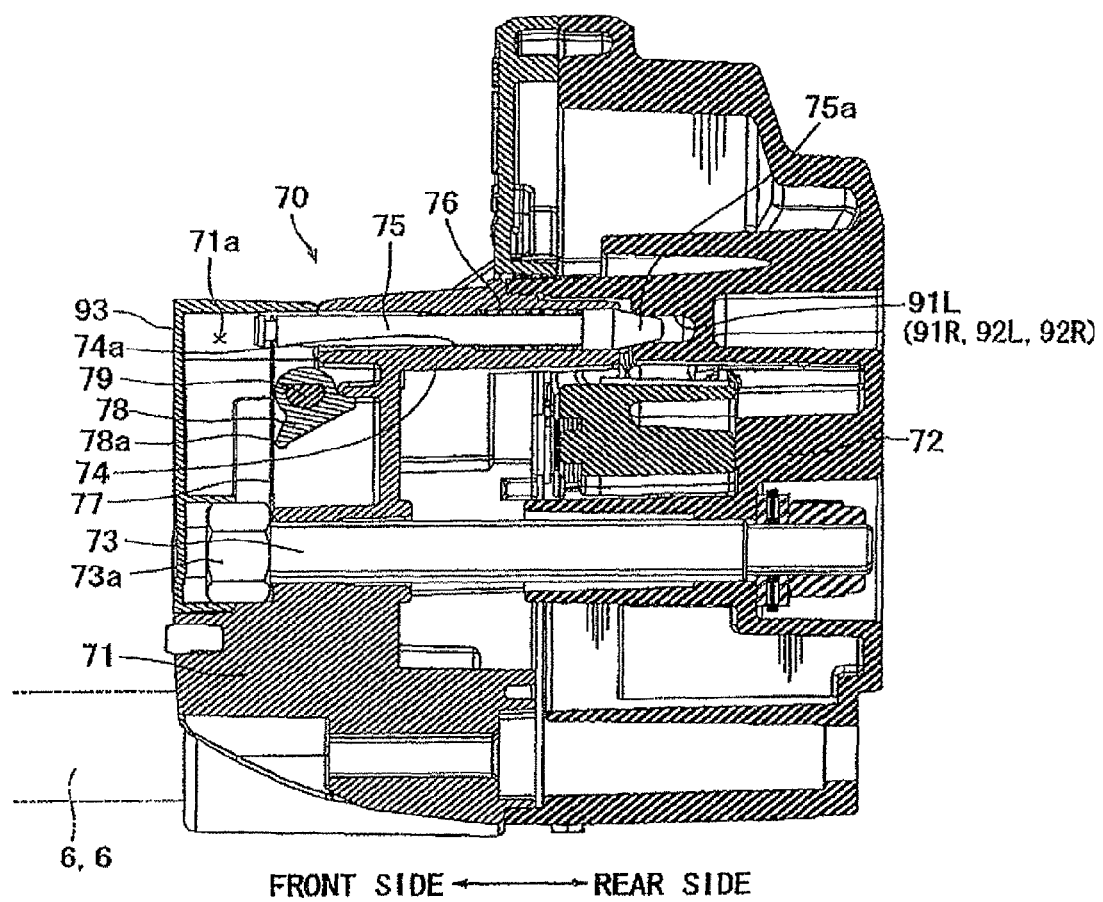
FIG. 10 is a vertical sectional view taken along line (10)-(10) in FIG. 8 and showing the positioning pin positioned at the lock position.
Figure 11:
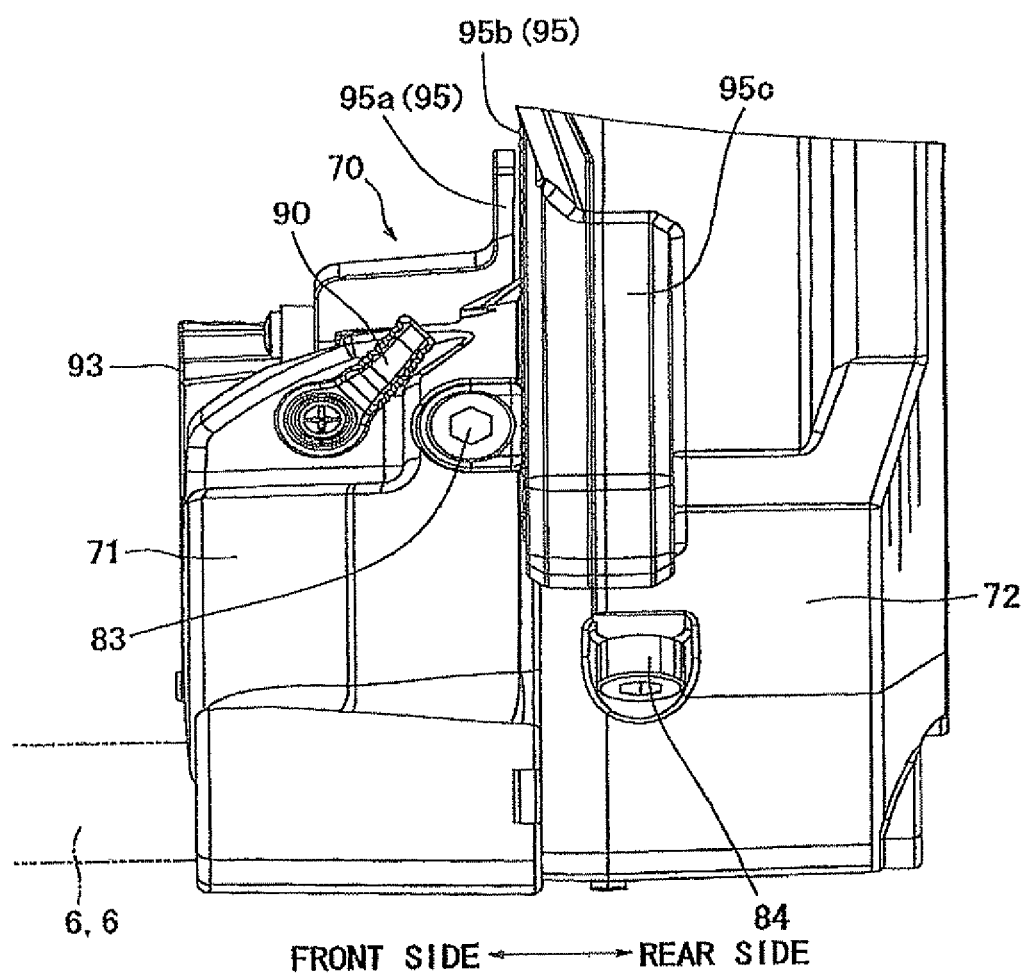
FIG. 11 is a right side view of the positioning device and showing the switching lever positioned at a position corresponding to an unlock position of the positioning pin when the tool unit is positioned the right 22.5° tilt position.
Figure 12:
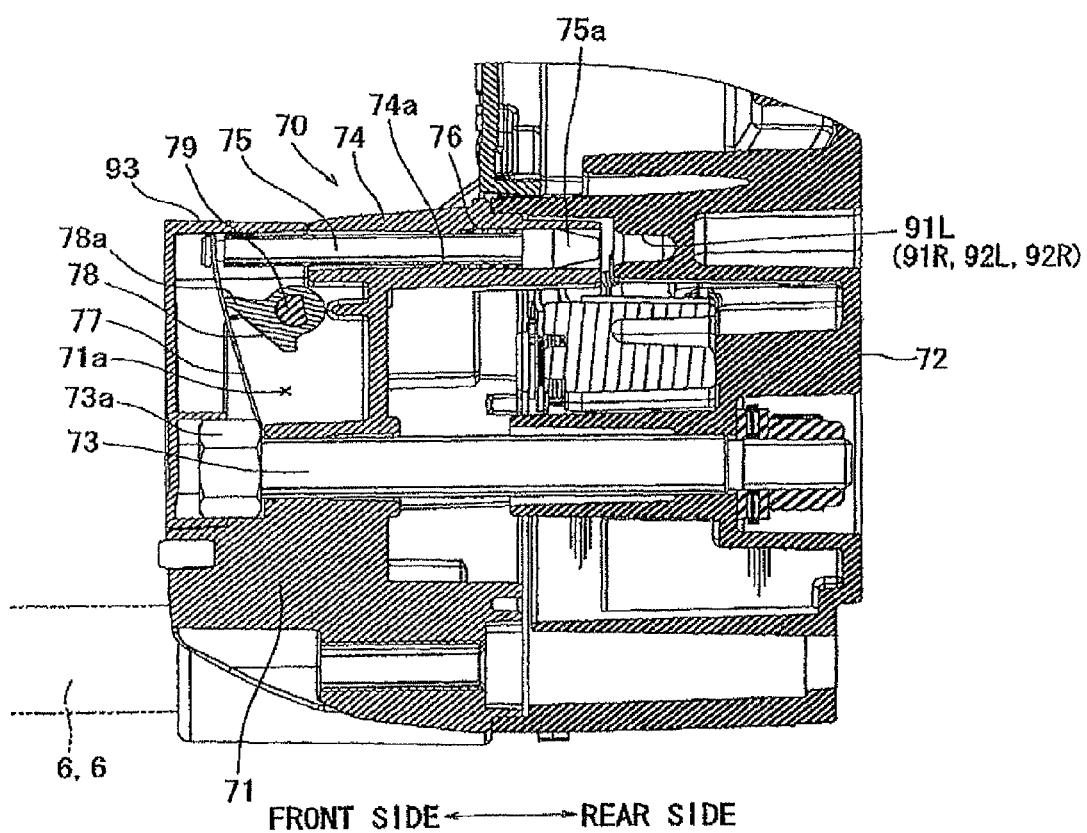
FIG. 12 is a vertical sectional view similar to FIG. 8 but showing the positioning pin positioned at the unlock position.

When the operator pivots the switching lever 90 toward the front side as shown in FIG. 9, the actuation cam 78 rotates in the counterclockwise direction, so that the actuation arm 78a moves downward as shown in FIG. 10. Therefore, the leaf spring 77 is positioned to extend vertically upward from the head 73a of the support shaft 73, so that the positioning pin 75 moves to a lock position with the aid of the biasing force of the compression spring 76. On the other hand, when the operator pivots the switching lever 90 toward the rear side (away from the operator) as shown in FIG. 11, the actuation cam 78 rotates in the clockwise direction, so that the actuation arm 78a moves upward as shown in FIG. 12. Therefore, the leaf spring 77 is forced to move forwardly against its resiliency, so that the upper end of the leaf spring 77 moves forwardly. Hence, the positioning pin 75 moves to an unlock position against the biasing force of the compression spring 76.

In this way, as the switching lever 90 pivots, the actuation arm 78a rotates to cause deformation of the leaf spring 77 in forward and rearward directions and to eventually cause movement of the positioning pin 75 between the lock position and the unlock position. Therefore, a restraint feeling is given by the leaf spring 77 to the pivoting operation of the switching lever 90 for moving the positioning pin 75. Thus, the restraint feeling enables the operator to clearly distinguish between the lock position and the unlock position of the positioning pin 75, so that the table cutting device 60 is improved in operability.

As described above, according to the positioning device 70 of the second embodiment, the positioning pin 75 moves between the lock position and the unlock position by the pivoting operation of the switching lever 90 mounted to the lateral side portion of the base member 71 that does not rotate when the tool unit 10 is tilted. In contrast, according to the positioning device 40 of the first embodiment, the positioning pin 41 moves between the lock position and the unlock position by the rotating operation of the switching member 45 mounted to the support member 22 that rotates when the tool unit 10 is tilted. The second embodiment is different from the first embodiment in this respect.

As shown in FIGS. 13 to 15, the positioning device 70 further includes first to fourth positioning holes 91L, 91R, 92L and 92R formed in a wall part of the support member 72, which opposes to the base member 71 and extends substantially perpendicular to the support shaft 73. Each of the first to fourth positioning holes 91L, 91R, 92L and 92R is configured as a circular hole to permit insertion of the positioning pin 75. In addition, the first to fourth positioning holes 91L, 91R, 92L and 92R are positioned on a circle about the axis of the support shaft 73 (i.e., the rotational axis of the support member 22), which circle has a radius equal to the distance between the axis of the positioning pin 75 and the axis of the support shaft 73. The first and third positioning holes 91L and 92L are positioned on the left side of the reference plane S, while the second and fourth positioning holes 91R and 92R are positioned on the right side of the reference plane S. In this embodiment, the reference plane S includes the axis of the support shaft 73 and a point on the circle about the axis of the support shaft 73, where the positioning pin 75 contacts or opposes to when the tool unit 10 is positioned at the 0° position.

The first and second positioning holes 91L and 91R that are closer to the reference plane S are offset from the reference plane S in leftward and rightward directions, respectively, by an angle of 22.5°. The third and fourth positioning holes 92L and 92R that are farther from the reference plane S are offset from the reference plane S in leftward and rightward directions, respectively, by an angle of 33.9°. Each of the first to fourth positioning holes 91L, 91R, 92L and 92R is configured as a circular hole, the diameter and the depth of which are determined to permit insertion of the positioning pin 75 until the tapered chip end 75a reaches an intermediate position along the depth. In addition, the first and third positioning holes 91L and 92L are positioned to be symmetrical with the second and fourth positioning holes 91R and 92R with respect to the reference plane S.

Figure 8:
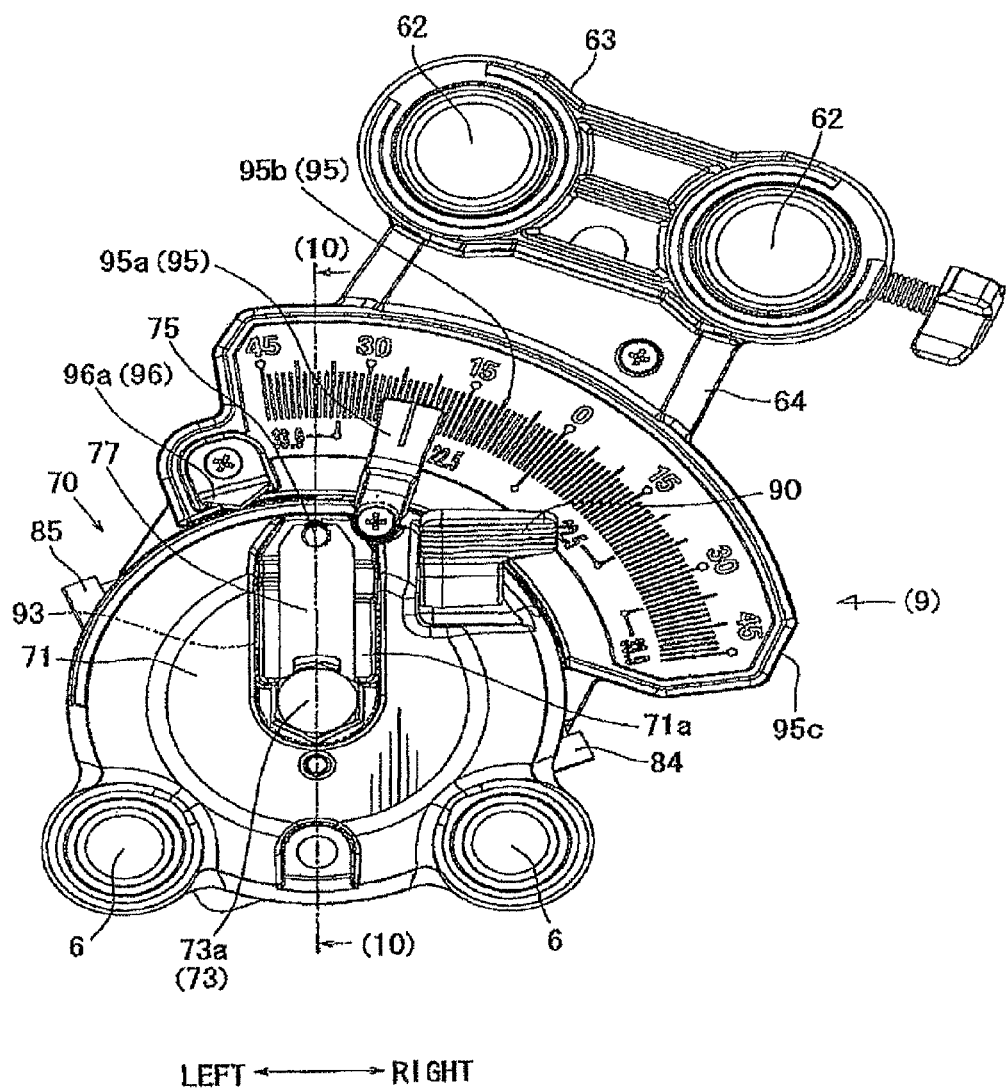
FIG. 8 is a front view of the positioning device and showing the operation for positioning a tool unit at a right 22.5° tilt position.

When the positioning pin 75 is inserted into the first positioning hole 91L as shown in FIG. 10, the tool unit 10 can be positioned at the left 22.5° position as shown in FIG. 8.

Similarly, when the positioning pin 75 is inserted into the second positioning hole 91R, the tool unit 10 can be positioned at the right 22.5° position. When the positioning pin 75 is inserted into the third positioning hole 92L by tilting the tool unit 10 leftward beyond the left 22.5° position, the tool unit 10 can be positioned at the left 33.9° position. When the positioning pin 75 is inserted into the fourth positioning hole 92R by tilting the tool unit 10 rightward beyond the right 22.5° position, the tool unit 10 can be positioned at the right 33.9° position. The tool unit 10 that has been positioned at any of the positions described above can be fixed in position by the operation of the fixing lever 25.

When the switching lever 90 is pivoted toward the lock position in the state where the cutting unit 10 is positioned at the 0° position by the contact of the positioning lever 81 with the fist stopper bolt 83 as shown in FIG. 13, the positioning pin 75 contacts the wall part of the support member 72 at a middle position between the first positioning hole 91L and the second positioning hole 91R. When the switching lever 90 is pivoted toward the lock position in the state where the cutting unit 10 is positioned at the left 45° position by the contact of the second stopper bolt 84 with the right side surface of the stopper block 74 as shown in FIG. 14, the positioning pin 75 contacts the wall part of the support member 72 at a position on the right side of the fourth positioning hole 92R. On the other hand, when the switching lever 90 is pivoted toward the lock position in the state where the cutting unit 10 is positioned at the right 45° position by the contact of the third stopper bolt 85 with the left side surface of the stopper block 74 as shown in FIG. 15, the positioning pin 75 contacts the wall part of the support member 72 at a position on the left side of the third positioning hole 92L.

As shown in FIG. 10, a recess 71a is formed in the front portion of the base member 71 in order to receive the leaf spring 77, the actuation cam 78 and the cam shaft 79. The head 73a of the support shaft 73a is also positioned within the recess 71a. A cover 93 is attached to the front portion of the base member 71 for covering the recess 71a. FIG. 8 shows the state where the cover 93 has been removed.

The positioning device 70 further includes first and second angular scale devices 95 and 96. With the aid of the angular scale devices 95 and 96, the operator can promptly and accurately read the tilt angle of the tool unit 10. The first angular scale device 95 serves as a main scale device and has a pointer 95a and an angular scale display 95b. The pointer 95a is attached to the upper portion of the base member 71. The angular scale display 95b is attached to a front surface of a scale plate 95c that is fixedly attached to the upper portion of the support member 72 and extends substantially vertically upward therefrom. The angular scale display 95b has scale lines spaced from each other by an angle of 1°. The scale lines indicative of angles of 0°, 15°, 22.5°, 30°, 33.9° and 45° are labeled with the corresponding angle values.

The second angular scale device 96 serves as an auxiliary scale device and has a pointer 96a and an angular scale display (not shown). The pointer 96a is attached to the front surface of the upper portion of the support member 72. The angular scale display of the second angular scale device 96 includes scale line marks engraved into the upper surface of the base member 71. The scale line marks of the angular scale display of the second angular scale device 96 are spaced from each other by an angle of 5°.

From the first and second angular scale devices 95 and 96, the operator can easily correctly read the tilt angle of the tool unit 10 in a comfortable position. Thus, because the angular scale display 95b is positioned farther from the pivotal axis (support shaft 73) of the tool unit 10, a large distance can be ensured between two adjacent scale lines, so that it is possible to accurately read the tilt angle of the tool unit 10. On the other hand, because the scale line marks of the second angular scale device 96 are displayed on the upper surface of the base member 71, the operator can read the scale line marks from a position on the front side and obliquely upward of the scale line marks. Therefore, it is possible to read the scale line marks in a comfortable position.

According to the second embodiment, the positioning device 70 includes the positioning pin 75 that is mounted to the base member 71 and can be inserted into any of the positioning holes 91L, 92L, 91R and 92R provided in the support member 72, so that the positioning device 70 is configured as a positive stop mechanism. Therefore, also with the second embodiment, the operator can rapidly correctly set the laterally tilted position of the tool unit 10.

In addition, the switching lever 90 for the operation of the positioning pin 75 is mounted to the lateral side portion of the base member 71, and therefore, the switching lever 90 can be easily viewed by the operator. More specifically, the operator can directly visually recognize the operational position of the switching lever 90 and can operate the switching lever 90 in a comfortable position. Therefore, the positioning device 70 is improved in operability.

Further, in the second embodiment, as the switching lever 90 pivots, the actuation can 78 rotates to cause deformation of the leaf spring 77 and to eventually move the positioning pin 75. Therefore, a restraint feeling is given by the leaf spring 77 to the pivoting operation of the switching lever 90 for moving the positioning pin 75. Thus, the restraint feeling enables the operator to clearly distinguish between the lock position and the unlock position of the positioning pin 75, so that the table cutting device 60 is improved in operability. Further, the biasing force of the leaf spring 77 prevents the switching lever 90 from stopping at an intermediate position between the positions corresponding to the lock position and the unlock position of the positioning pin 75. Therefore, it is possible to reliably prevent improper operations of the positioning device 70.

Furthermore, because the switching lever 90 is pivoted for moving the positioning pin 75, the operator can operate the switching lever 90 by his or her finger(s). Therefore, the operability is improved in comparison with the dial-type switching member 45 of the first embodiment.

The second embodiment may be modified in various ways. For example, although the table cutting device 60 has the upper and lower slide mechanisms, these slide mechanisms may be omitted. In addition, the stopper pin 75 may be replaced with a block having a wedge-shaped tip end. Further, the positioning holes may be replaced with slots each defined between opposite walls arranged in the tilting direction in order to receive the positioning member from opposite sides in the tilting direction for preventing movement of the positioning member in the tilting direction.

(Third Embodiment)

A table cutting device 101 according to a third embodiment will now be described with reference to FIGS. 16 to 27. The third embodiment is a modification of the first embodiment, and therefore, like members are given the same reference numerals as the first embodiment and the description of these members will not be repeated.

Figure 17:
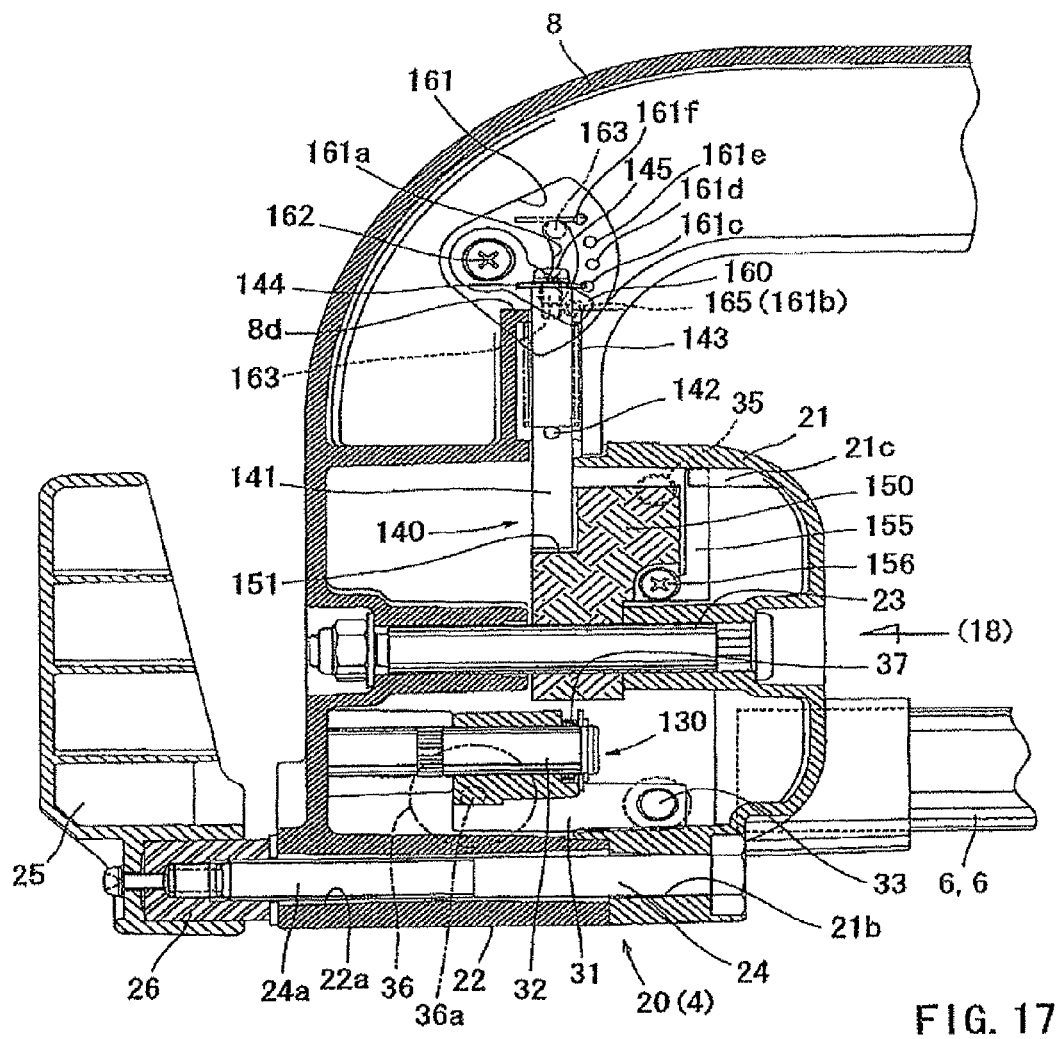
FIG. 17 is a vertical sectional view of a pivotal support device.

As shown in FIG. 17, in this embodiment, the fixing member 24 for fixing the support member 22 in position relative to the base member 21 has a threaded shank 24a. The thread shank 24a is inserted into an insertion hole 21b formed in the lower portion of the base member 21 and further into an insertion slot 22a formed in the support member 22. An end portion of the threaded shank 24a protrudes rearwardly from the support member 22. The insertion slot 22a has an arc-shaped configuration about the axis of the support shaft 23. A fixing nut 26 is in engagement with the end portion of the threaded shank 24a. Therefore, the support member 22 can be fixed in position relative to the base member 21 by tightening the fixing nut 26 against the threaded shank 24a. Hence, the tool unit 10 can be fixed in position, for example, at the 0° position or at a position tilted laterally by a desired angle.

The fixing nut 26 is mounted to the fixing lever 25 such that the fixing nut 26 rotates in unison with the fixing lever 25. Therefore, the fixing nut 26 can be tightened against or loosened from the threaded shank 24 by pivotally moving the fixing lever 25. By loosening the fixing nut 25, the support member 22 can be rotated relative to the base member 21, and therefore, the cutting unit 10 can be tilted laterally.

Referring to FIGS. 18 to 27, a first positioning device 130 corresponds to the first positioning device 30 of the first embodiment. The positioning device 130 serves to position the tool unit 10 at the 0° position or the vertical position and includes a torsion spring 37 that normally biases the positioning lever 31 to pivot about the support shaft 32 in a counterclockwise direction in FIG. 18 such that the positioning lever 31 is held at a restricting position, where the positioning lever 31 is pressed against the inner wall of the base member 21.

The push button 36 is operable by the operator for moving the positioning lever 31 from the operative position to the inoperative position in order to enable the tool unit 10 to be tilted rightward. The button 36 includes the operation shaft 36a and a compression spring 36b that normally holds the operation shaft 36a at a position, where the tip end of the operation shaft 36a is spaced by a small distance from the projection 31a.

When the operator releases the push button 36 after the tool unit 10 has passed through the 0° position (i.e., the vertical position) in order to tilt the tool unit 10 from the leftward tilted position toward the rightward tilted position, the torsion spring 37 serves to automatically return the positioning lever 31 to the operative position.

Figure 18:
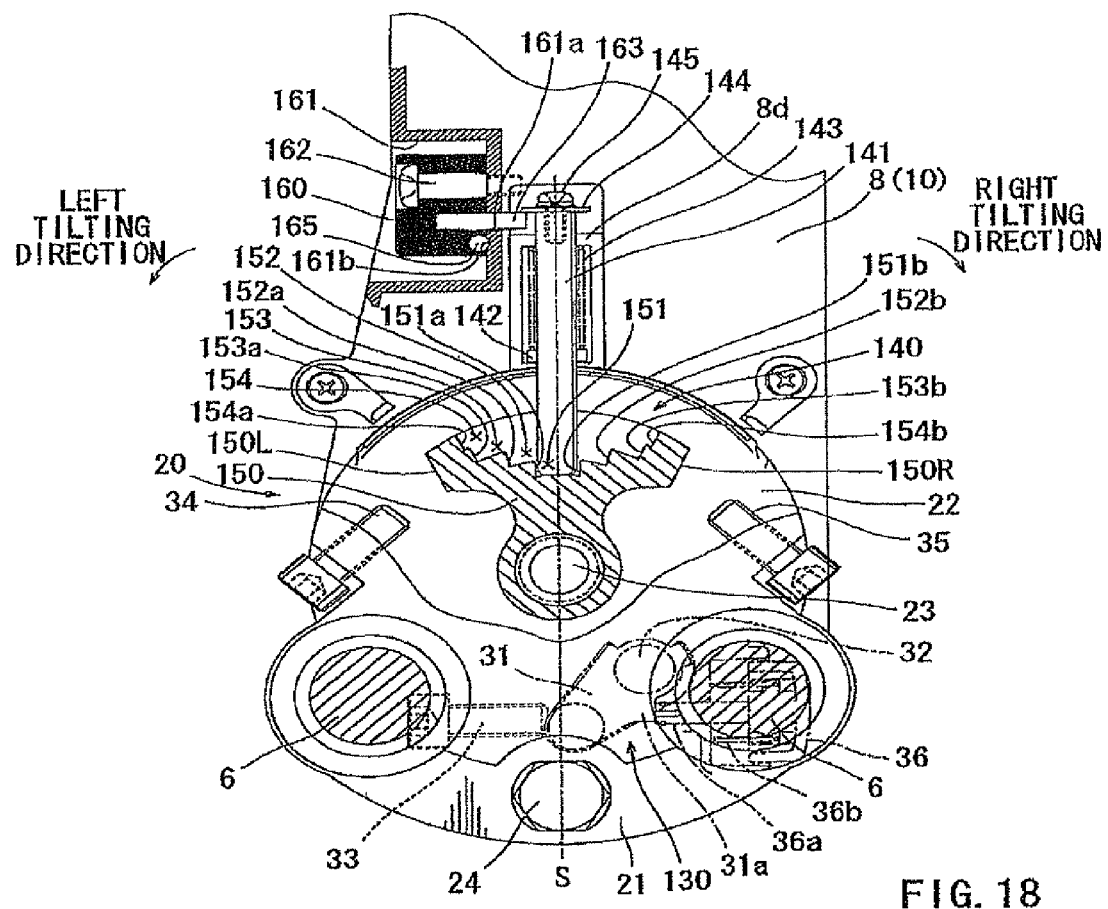
FIG. 18 is a view with a part broken away of the pivotal support device as viewed in a direction of an arrow (18) in FIG. 17 and showing the operation for positioning a tool unit at a vertical position.

Similar to the first embodiment, the first to third stopper bolts 33, 34 and 35 are attached to the base member 21. However, the first to third stopper bolts 33, 34 and 35 of this embodiment are positioned at different positions from those of the first embodiment. Thus, as shown in FIG. 18, the first stopper bolt 33 is threadably engaged with the lower portion of the base member 21, while the second and third stopper bolts 34 and 35 are threadably engaged with the left side portion and the right side portion of the base member 21, respectively. Similar to the first embodiment, the first stopper bolt 33 serves to position the tool unit 10 at the 0° position, the second stopper bolt 34 and the third stopper bolt 35 serve to position the tool unit 10 at the left 45° position and the right 45° position, respectively.

A second positioning device 140 corresponds to the second positioning device 40 of the first embodiment and includes a stopper block 150 mounted to the base member 21 and a stopper member 141 mounted to the support member 22.

The stopper block 150 is pivotally supported by the support shaft 23 and has opposite ends in the circumferential direction (pivoting direction), which are configured as stopper ends 150L and 150S. The stopper end 150L is positioned on the left side as viewed in FIG. 18 and can contact the second stopper bolt 34 when the tool unit 10 is tilted leftward. The stopper end 150R is positioned on the right side as viewed in FIG. 18 and can contact the third stopper bolt 35 when the tool unit 10 is tilted rightward. Therefore, due to the contact of the stopper ends 150L and 150R with the second and third stopper bolts 34 and 35, respectively, the rotation of the support member 22 relative to the base member 21 can be stopped, so that the tool unit 10 can be positioned at left and right tilted positions.

The stopper block 150 has a radially outer surface that is configured to have an arc shape about the rotational axis of the support shaft 23. A plurality of positioning recesses are formed in the radially outer surface of the stopper block 150. In this embodiment, first to fourth positioning recesses 151 to 154 are formed in series in the radial direction. More specifically, the positioning recesses 151 to 154 are arranged in this order in a radially outer direction and have depths decreasing in this order in a radial direction along the reference plane S. Therefore, the depth of the first positioning recess 151 is the largest, while the depth of the fourth positioning recess 154 is the smallest. The third positioning recess 153 is positioned centrally of the fourth positioning recess 154 with respect to the circumferential direction. The second positioning recess 152 is positioned centrally of the third positioning recess 153 with respect to the circumferential direction. The first positioning recess 151 is positioned centrally of the second positioning recess 152 with respect to the circumferential direction. The circumferential lengths of the positioning recesses 151 to 154 gradually increase in this order. The circumferential length of the first positioning recess 151 is set to be enough for receiving the stopper member 141 as will be explained later.

Therefore, opposite side edges 151a and 151b in the circumferential direction of the first positioning recess 151, opposite side edges 152a and 152b in the circumferential direction of the second positioning recess 152, opposite side edges 153a and 153b in the circumferential direction of the third positioning recess 153, and opposite side edges 154a and 154b in the circumferential direction of the fourth positioning recess 154 are symmetrical with respect to the reference plane S, respectively, and are configured as stepped edges.

As shown in FIG. 17, a leaf spring 155 is mounted to the front surface (right side surface as viewed in FIG. 17) of the stopper block 150 by means of screws 156. The leaf spring 155 extends upward along the first positioning recess 151 and has an upper end inserted into a retaining recess 21c formed in the upper portion of the base member 21. The length of the leaf spring 155 is determined such that the upper end of the leaf spring 155 is always positioned with the retaining recess 21c throughout the pivotable range of the stopper block 150. Because the upper end of the leaf spring 155 is held to be inserted into the retaining recess 21c, the stopper block 150 is normally held at a reference position, where the first positioning recess 151 is positioned within the reference plane S. In addition, the leaf spring 155 applies a biasing force to return the stopper block 150 to the reference position when the stopper block 150 has pivoted rightward or leftward from the reference plane S. In other words, the pivotal movement of the stopper block 150 about the support shaft 23 in a left or right direction should be made against the biasing force of the leaf spring 155.

The stopper member 141 is disposed at the upper portion of the support member 22 at a position above the stopper block 150, so that one end (lower end as viewed in FIG. 18) of the stopper member 141 can enter the positioning recesses 151 to 154. The other end (upper end) of the stopper member 141 extends upwardly through the upper portion of the support member 22 and is vertically movably supported by a retaining wall portion 8d disposed at the base portion of the support arm 8.

An engaging pin 142 is attached to the central portion with respect to the lengthwise direction of the stopper member 141 and extends radially outward from the central portion. The engaging pin 142 is positioned within the retaining wall portion 8d. A compression spring 143 is interleaved between the engaging pin 142 and the upper end portion of the retaining wall portion 8d. Therefore, the stopper member 141 is biased in such a direction that the lower end of the stopper member 141 enters the positioning recesses 151 to 154. In this embodiment, the stopper member 141 is biased downward as viewed in FIG. 17.

The upper end of the stopper member 141 extends further upward through the upper end portion of the retaining wall portion 8d. An engaging flange 144 is fixedly mounted to an upper end face of the stopper member 141 by means of a screw 145. The engaging flange 144 has a disk-like configuration and has a diameter larger than the diameter of the stopper member 141, so that the engaging flange 144 extends radially outward from the upper end face of the stopper member 141.

A switching lever 160 is operable by the operator for vertically moving the stopper member 141, so that a protruding distance of the stopper member 141 into the positioning recesses 151 to 154 can be changed. As shown in FIGS. 17 and 18, a sectorial concave portion 161 is formed in a side wall of the support arm 8. The switching lever 160 is positioned within the sectorial concave portion 161 and is pivotally mounted to the bottom of the sectorial concave portion 161 by means of a support shaft 162. An engaging pin 163 is fixedly mounted to the switching lever 160 and extends into the support arm 8 via an insertion slot 161a formed in the bottom wall of the concave portion 161. The insertion slot 161a is configured to have an arc shape about the axis of the support shaft 162. As shown in FIG. 18, an end portion of the engaging pin 163 extends to a position below the engaging flange 144 of the stopper member 141. Therefore, as the switching lever 160 is pivoted upward and downward about the support shaft 162, the engaging pin 163 moves upward and downward along the insertion slot 161a. Then, the vertical component of the movement of the engaging pin 163 causes the stopper pin 141 to move vertically in the axial direction. Thus, as the engaging pin 163 moves upward, the stopper member 141 moves upward against the biasing force of the compression spring 143. On the other hand, as the engaging pin 163 moves downward, the stopper member 141 moves to follow the downward movement of the engaging pin 163 by the biasing force of the compression spring 143.

The switching lever 160 can be held at five different pivotal positions by means of a steel ball 165 and bottomed five retaining recesses 161b to 161f. The steel ball 165 is positioned between the bottom of the concave portion 161 and a surface of the switching lever 160 opposing thereto. The steel ball 165 is biased toward the bottom of the concave portion 161 by a compression spring (not shown). The retaining recesses 161b to 161f are formed in the bottom of the concave portion 161 and are arranged at substantially equal intervals along the outer circumferential side of the insertion slot 161a. Therefore, the switching lever 60 can be held in position as the steel ball 165 resiliently engages either one of the retaining recesses 161b to 161f. In addition, the positions of the retaining recesses 161b to 161f are determined to correspond to the positions of the stopper member 141 relative to the positioning recesses 151 to 154 as will be hereinafter described.

As shown in FIG. 17, when the switching lever 160 is pivoted to the lowermost position, the steel ball 165 engages the retaining recess 161b that is positioned at the lowermost position, so that the switching lever 160 can be held in position. In this state, the engaging pin 163 is positioned at its lower dead center, and the stopper member 141 is held at a first position (a lower stroke end) by the biasing force of the compression spring 143 as shown in FIGS. 17 and 18. Therefore, the lower end of the stopper member 141 enters the first positioning recess 151 having the largest depth. As the operator forcibly pivots the switching lever 160 upward, the steel ball 165 is removed from the retaining recess 161b against the biasing force of the spring and then resiliently engages the retaining recess 161c. As the operator subsequently forcibly pivots the switching lever 160 upward, the steel ball 165 is removed from the retaining recess 161c against the biasing force of the spring and then resiliently engages the retaining recess 161d. As the operator subsequently forcibly pivots the switching lever 160 upward, the steel ball 165 is removed from the retaining recess 161d against the biasing force of the spring and then resiliently engages the retaining recess 161e. As the operator subsequently forcibly pivots the switching lever 160 upward, the steel ball 165 is removed from the retaining recess 161e against the biasing force of the spring and then resiliently engages the retaining recess 161f. As the operator forcibly pivots the switching lever 160 upward in this way, the stopper member 141 in turn moves from the first position to a second position where the lower end of the stopper member 141 is withdrawn from the first positioning recess 151 but enters the second positioning recess 152, a third position where the lower end of the stopper member 141 is withdrawn from the second positioning recess 152 but enters the third positioning recess 153, a fourth position where the lower end of the stopper member 141 is withdrawn from the third positioning recess 153 but enters the fourth positioning recess 154, and a fifth position (an upper stroke end) where the lower end of the stopper member 141 is withdrawn from the fourth positioning recess 154. In this way, the stopper member 141 can be held in the first, second, third, fourth and fifth positions as the steel ball 165 engages the retaining recesses 161b, 161c, 161d, 161e and 161f, respectively.

The tool unit 10 can be positioned at the 0° position or the vertical position by the contact of the tip end of the positioning lever 31 with the first stopper bolt 33. The tool unit 10 can then be fixed in this position by operating the fixing lever 25. With the tool unit 10 fixed in the vertical position, a vertical cutting operation of the workpiece can be made by vertically downwardly pivoting the tool unit 10 about the pivot shaft 9.

When the tool unit 10 is positioned at the vertical position, the leaf spring 155 resiliently holds the stopper block 150 such that the first positioning recess 151 is positioned within the reference plane S as shown in FIGS. 17 and 18. The switching lever 160 as well as the stopper member 141 may take any position when the tool unit 10 is positioned at the vertical position.

The operation for positioning the tool unit 10 from the vertical position to the right tilted positions including the right 22.5° position, the right 33.9° position and the right 45° position, and the left tilted positions including the left 22.5° position, the left 33.9° position and the left 45° position will now be described.

Figure 19:
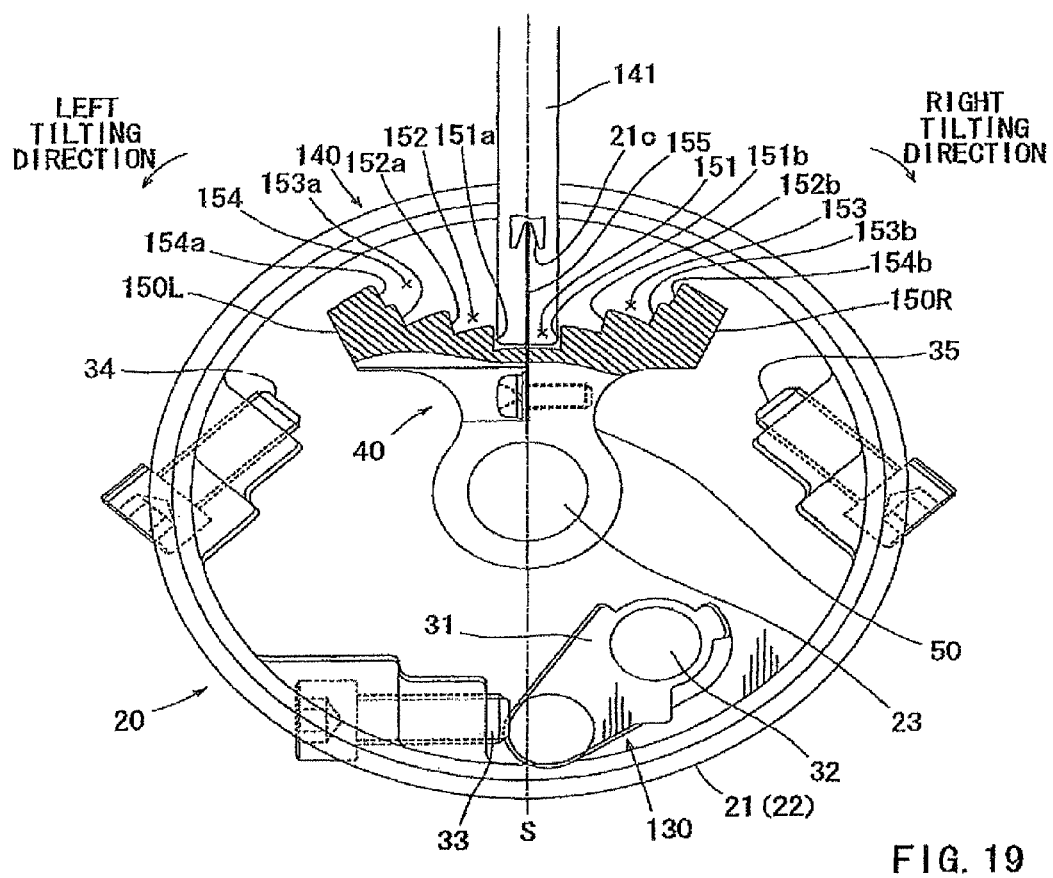
FIG. 19 is a front view of the pivotal support device and showing the operation for positioning the tool unit at the vertical position.

First, the operator pivots the switching lever 160 to the lowermost position, so that the stopper member 141 is positioned at the first position as shown in FIGS. 18 and 19. In this state, the lower end of the stopper member 141 enters the first positioning recess 151 of the stopper block 150. The switching lever 160 can be held at the lowermost position by the resilient engagement of the steel ball 165 with the lowermost retaining recess 161b shown in FIG. 17. Then, the operator pivots the fixing lever 25 to loosen the same to enable laterally tilting movement of the tool unit 10.

Figure 20:
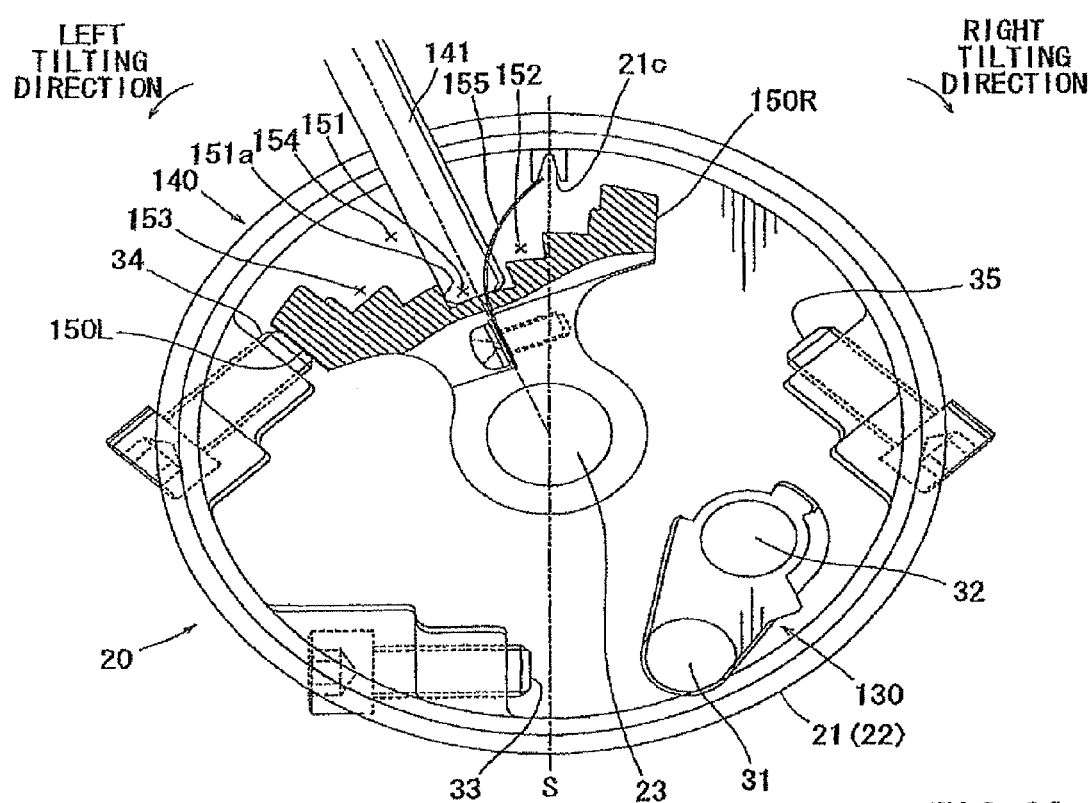
FIG. 20 is a front view similar to FIG. 19 but showing the operation for positioning the tool unit at a left 22.5° tilt position.

In order to position the tool unit 10 at the left 22.5° position, the operator tilts the tool unit 10 leftward from the vertical position, so that the stopper member 141 moves leftward together with the tool unit 10 as shown in FIG. 20. Then, the side edge 151a positioned on the left side of the first positioning recess 151 is pressed by the lower end of the stopper member 141, so that the stopper block 150 is forced to pivot leftward (counterclockwise direction as viewed in FIG. 20) about the support shaft 23 against the biasing force of the leaf spring 155.

When the tool unit 10 has been tilted by an angle of 22.5°, the left side stopper end 150L of the stopper block 150 contacts the second stopper bolt 34, so that the tool unit 10 can be positioned at the left 22.5° position.

Figure 21:
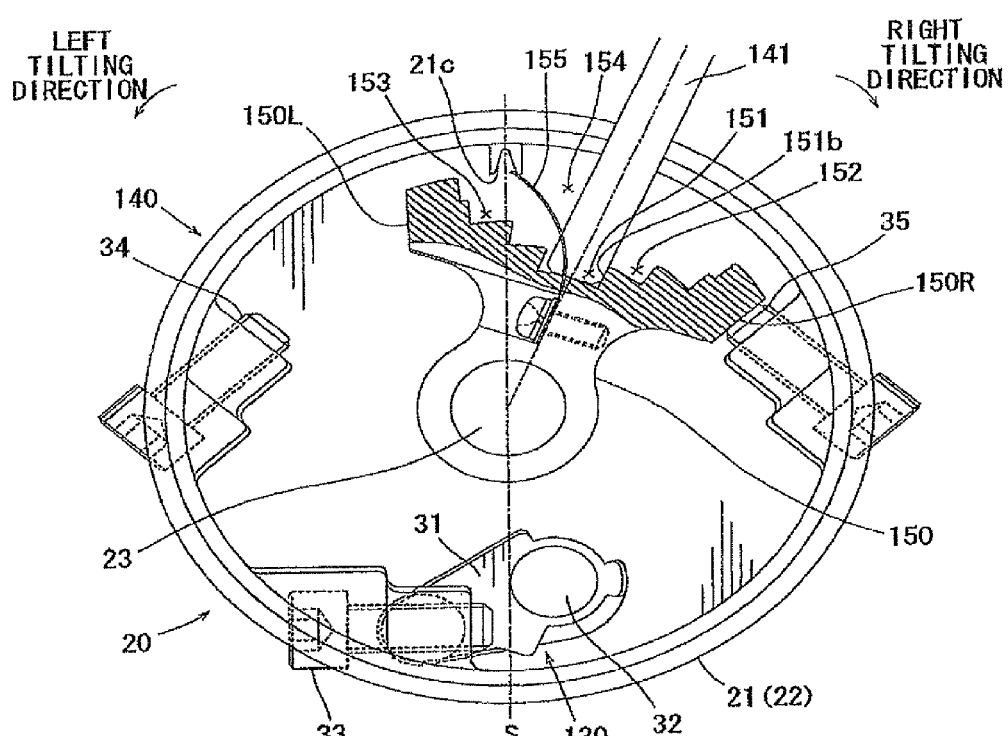
FIG. 21 is a front view similar to FIG. 19 but showing the operation for positioning the tool unit at a right 22.5° tilt position.

On the other hand, in order to position the tool unit 10 at the right 22.5° position, the operator tilts the tool unit 10 rightward from the vertical position, so that the stopper member 141 moves rightward together with the tool unit 10 as shown in FIG. 21. Then, the side edge 151b positioned on the right side of the first positioning recess 151 is pressed by the lower end of the stopper member 141, so that the stopper block 150 is forced to pivot rightward (clockwise direction as viewed in FIG. 21) about the support shaft 23 against the biasing force of the leaf spring 155. However, before the tool unit 10 is tilted rightward, it is necessary to move the positioning lever 31 to the inoperative position by pushing the button 36.

When the tool unit 10 has been tilted by an angle of 22.5°, the right side stopper end 150S of the stopper block 150 contacts the third stopper bolt 35, so that the tool unit 10 can be positioned at the right 22.5° position.

After that tool unit 10 has been positioned at the left or right 22.5° position, the operator pivots the fixing lever 25 to fix the tool unit 10 in position.

In order to change the position the tool unit 10 from the left or right 22.5° position to the left or right 33.9° position, the operator loosens the fixing lever 25 and moves the tool unit 10 to return to the vertical position. Thereafter, the operator pivots the switching lever 160 to move the stopper member 141 from the first position to the second position, where the lower end of the stopper member 141 is positioned at the second positioning recess 152, against the biasing force of the compression spring 143. It may possible that the operator pivots the switching lever 160 to move the stopper member 141 from the first position to the second position while the tool unit 10 is positioned at the left or right 22.5° position. The switching lever 160 can be held in position as the steel ball 165 engages the retaining recess 161c, so that the stopper member 141 is held at the second position.

Figure 22:
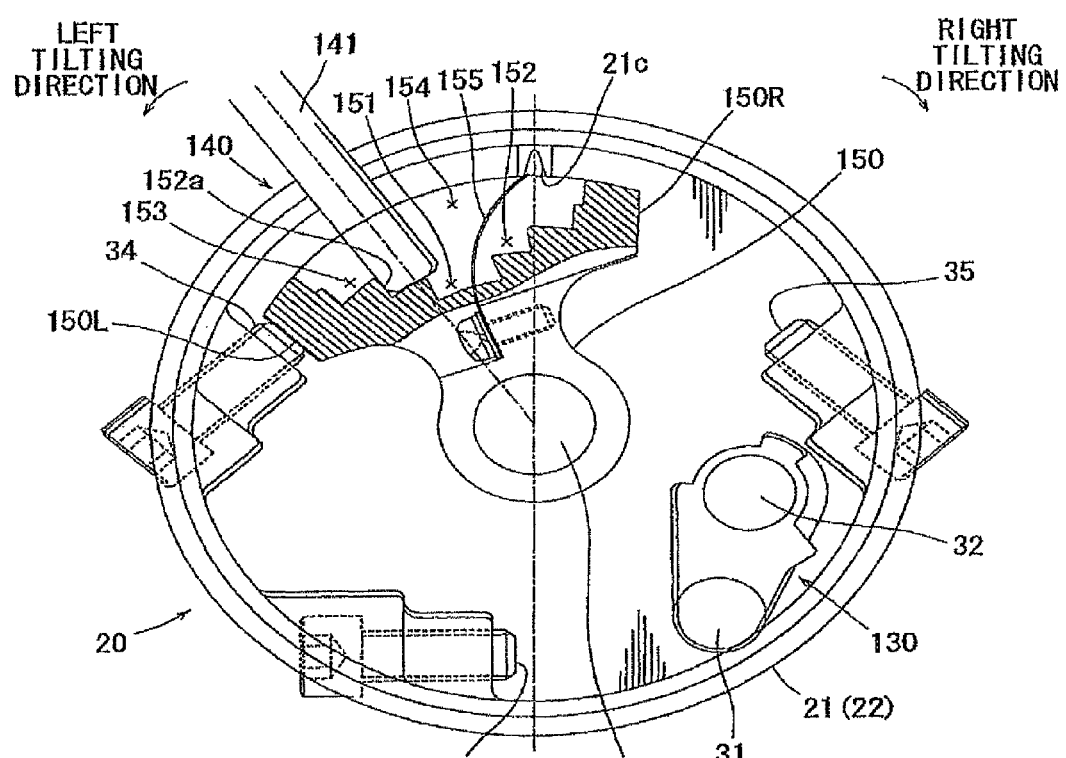
FIG. 22 is a front view similar to FIG. 19 but showing the operation for positioning the tool unit at a left 33.9° tilt position.

If the tool unit 10 is to be positioned at the left 33.9° position, the operator tilts the tool unit 10 leftward with the stopper member 141 held at the second position. During the leftward tilting movement of the tool unit 10, the lower end of the stopper member 141 first contacts the side edge 152a on the left side of the second positioning recess 152. As the tool unit 10 tilts further leftward, the stopper block 150 is forced to pivot leftward together with the tool unit 10 by the stopper member 141. When the tool unit 10 has pivoted to the left 33.9° position, the left stopper end 150L of the stopper block 150 contacts the second stopper bolt 34 as shown in FIG. 22, so that the tool unit 10 can be positioned at the left 33.9° position. The tool unit 10 can be fixed in this position by the operation of the fixing lever 25.

Figure 23:
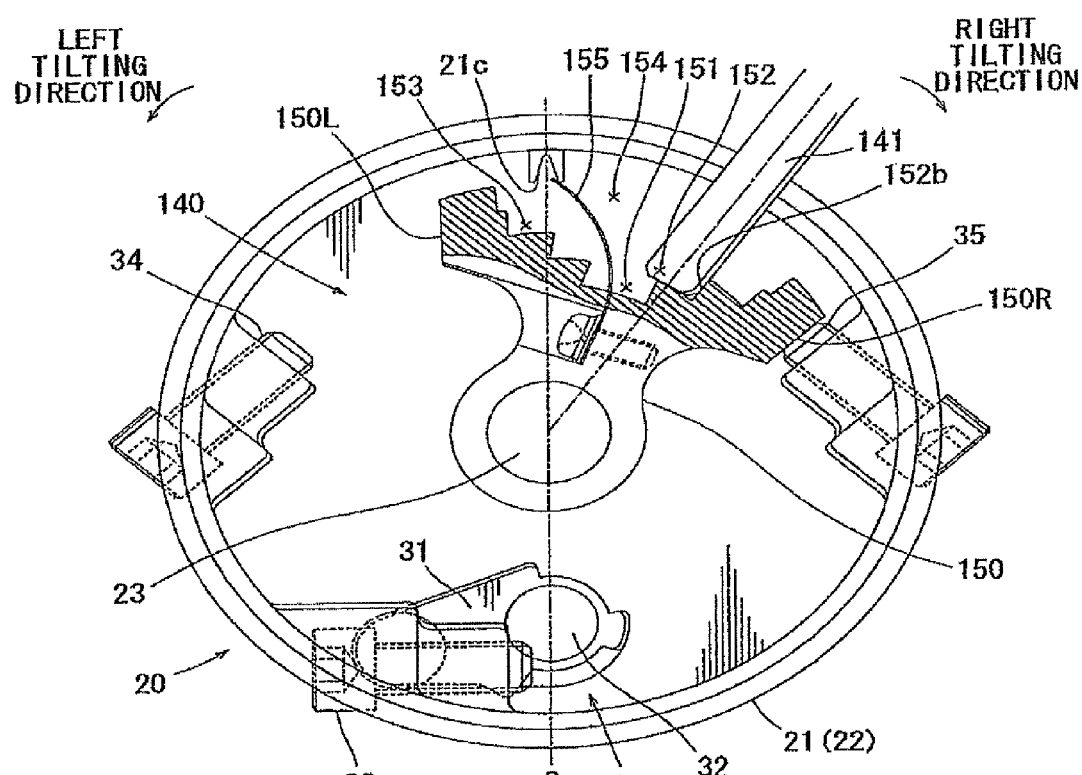
FIG. 23 is a front view similar to FIG. 19 but showing the operation for positioning the tool unit at a right 33.9° tilt position.

If the tool unit 10 is to be positioned at the right 33.9° position, the operator pushes the button 36 to allow the tool unit 10 to be tilted rightward, and thereafter the operator tilts the tool unit 10 rightward, for example, from vertical position or the left 33.9° position. During the rightward tilting movement of the tool unit 10, the lower end of the stopper member 141 first contacts the side edge 152b on the right side of the second positioning recess 152. As the tool unit 10 tilts further rightward, the stopper block 150 is forced to pivot rightward together with the tool unit 10 by the stopper member 141. When the tool unit 10 has pivoted to the right 33.9° position, the right stopper end 150R of the stopper block 150 contacts the third stopper bolt 35 as shown in FIG. 23, so that the tool unit 10 can be positioned at the right 33.9° position. The tool unit 10 can be fixed in this position by the operation of the fixing lever 25.

In order to change the position the tool unit 10 from the left or right 33.9° position to the left or right 45° position, the operator loosens the fixing lever 25 and moves the tool unit 10 to return to the vertical position. Thereafter, the operator pivots the switching lever 160 to move the stopper member 141 from the second position to the third position, where the lower end of the stopper member 141 is positioned at the third positioning recess 153, against the biasing force of the compression spring 143. It may possible that the operator pivots the switching lever 160 to move the stopper member 141 from the second position to the third position while the tool unit 10 is positioned at the left or right 33.9° position. The switching lever 160 can be held in position as the steel ball 165 engages the retaining recess 161d, so that the stopper member 141 is held at the third position.

Figure 24:
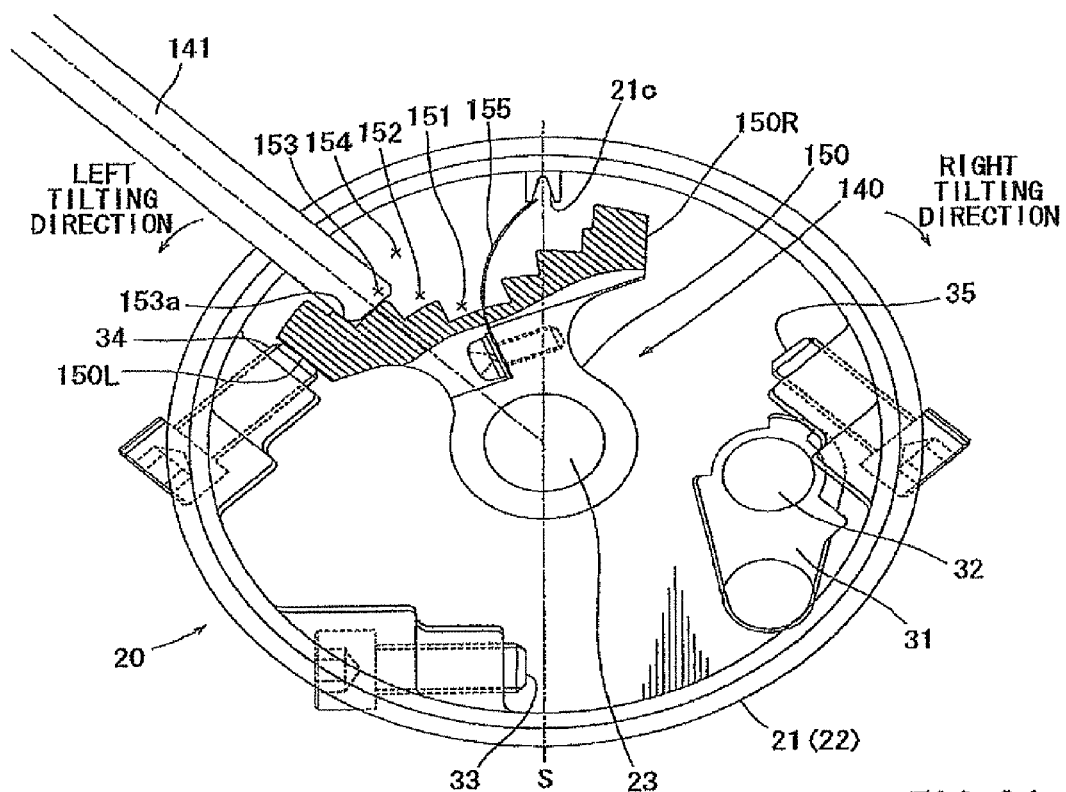
FIG. 24 is a front view similar to FIG. 19 but showing the operation for positioning the tool unit at a left 45° tilt position.

If the tool unit 10 is to be positioned at the left 45° position, the operator tilts the tool unit 10 leftward with the stopper member 141 held at the third position. During the leftward tilting movement of the tool unit 10, the lower end of the stopper member 141 first contacts the side edge 153a on the left side of the third positioning recess 153. As the tool unit 10 tilts further leftward, the stopper block 150 is forced to pivot leftward together with the tool unit 10 by the stopper member 141. When the tool unit 10 has pivoted to the left 45° position, the left stopper end 150L, of the stopper block 150 contacts the second stopper bolt 34 as shown in FIG. 24, so that the tool unit 10 can be positioned at the left 45° position. The tool unit 10 can be fixed in this position by the operation of the fixing lever 25.

Figure 25:
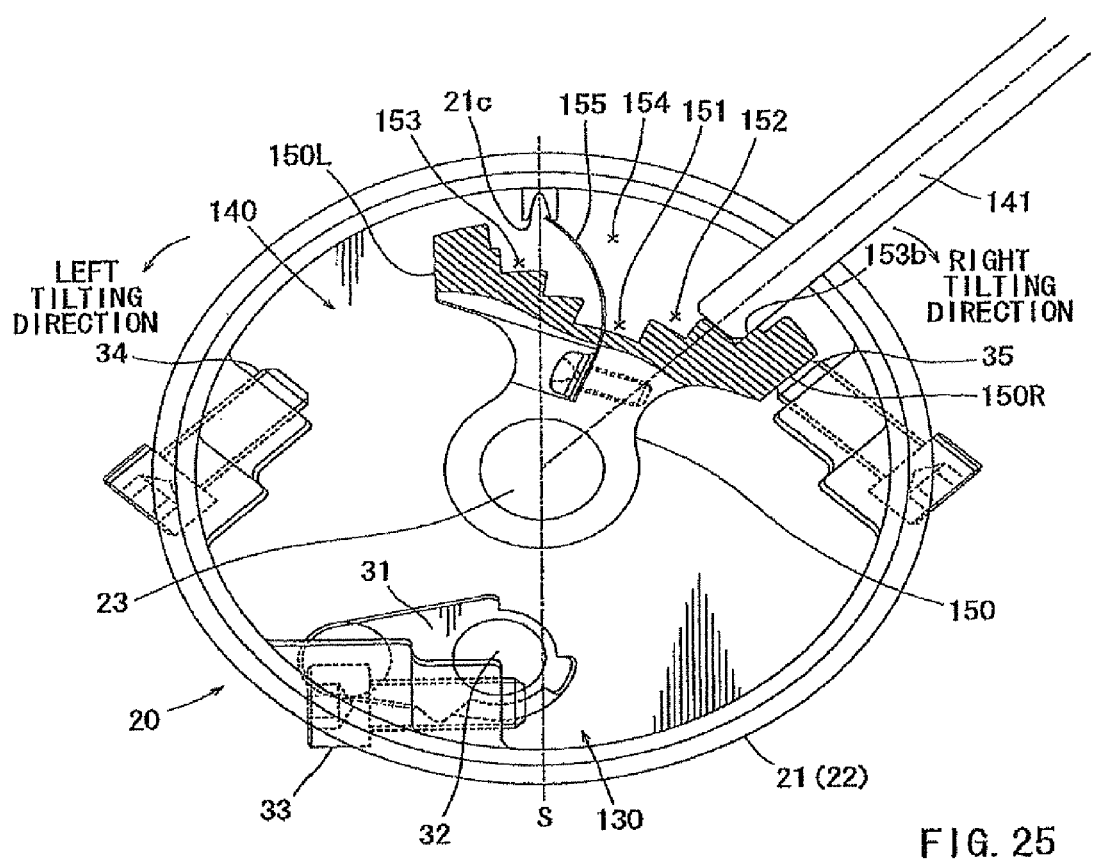
FIG. 25 is a front view similar to FIG. 19 but showing the operation for positioning the tool unit at a right 45° tilt position.

If the tool unit 10 is to be positioned at the right 45° position, the operator pushes the button 36 to allow the tool unit 10 to be tilted rightward, and thereafter the operator tilts the tool unit 10 rightward, for example, from vertical position or the left 45° position. During the rightward tilting movement of the tool unit 10, the lower end of the stopper member 141 first contacts the side edge 153b on the right side of the third positioning recess 153. As the tool unit 10 tilts further rightward, the stopper block 150 is forced to pivot rightward together with the tool unit 10 by the stopper member 141. When the tool unit 10 has pivoted to the 45° position, the right stopper end 150R of the stopper block 150 contacts the third stopper bolt 35 as shown in FIG. 25, so that the tool unit 10 can be positioned at the right 45° position. The tool unit 10 can be fixed in this position by the operation of the fixing lever 25.

The positioning device 140 of this embodiment is designed to be able to position the tool unit 10 at a left or right 47° position, where the tool unit 10 has been tilted leftward or rightward by an angle of 47° over the angle of 45°.

In order to change the position the tool unit 10 from the left or right 45° position to the left or right 47° position, the operator loosens the fixing lever 25 and moves the tool unit 10 to return to the vertical position. Thereafter, the operator pivots the switching lever 160 to move the stopper member 141 from the third position to the fourth position, where the lower end of the stopper member 141 is positioned at the fourth positioning recess 154, against the biasing force of the compression spring 143. It may possible that the operator pivots the switching lever 160 to move the stopper member 141 from the third position to the fourth position while the tool unit 10 is positioned at the left or right 45° position. The switch lever 160 can be held in position as the steel ball 165 engages the retaining recess 161e, so that the stopper member 141 is held at the fourth position.

Figure 26:
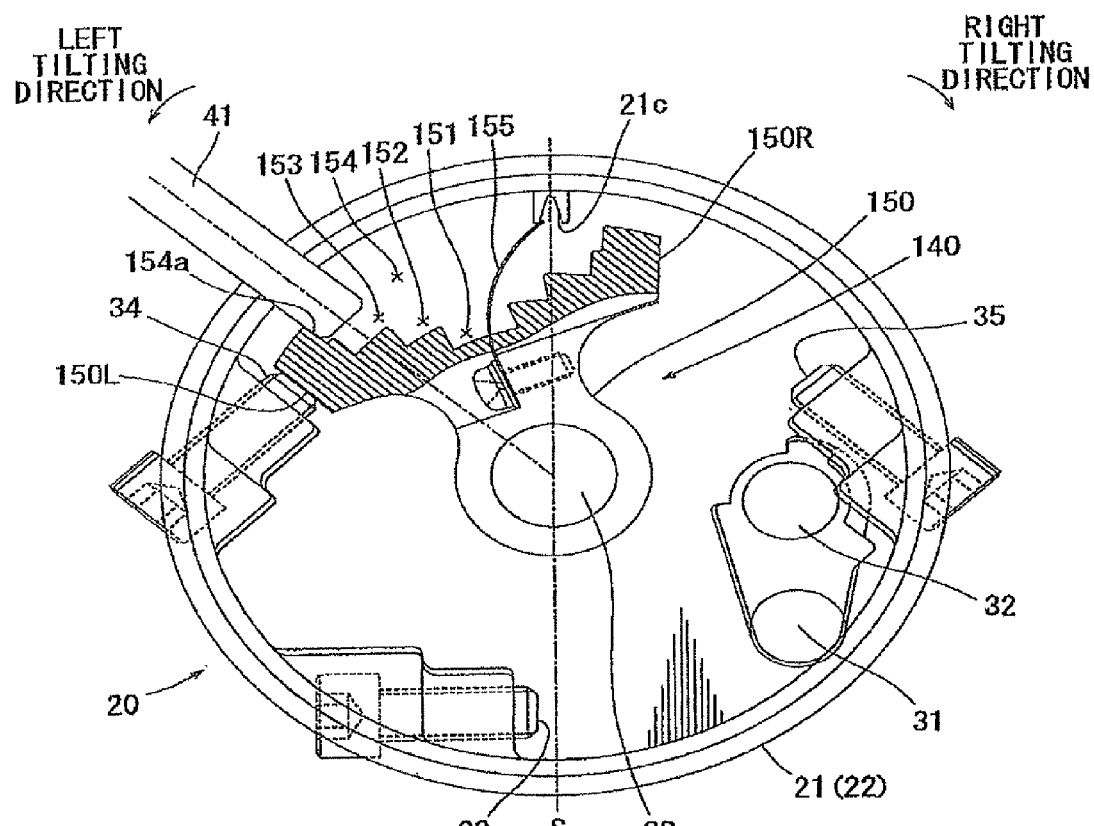
FIG. 26 is a front view similar to FIG. 19 but showing the operation for positioning the tool unit at a left 47° tilt position.

If the tool unit 10 is to be positioned at the left 47° position, the operator tilts the tool unit 10 leftward with the stopper member 141 held at the fourth position. During the leftward tilting movement of the tool unit 10, the lower end of the stopper member 141 first contacts the side edge 154a on the left side of the fourth positioning recess 154. As the tool unit 10 tilts further leftward, the stopper block 150 is forced to pivot leftward together with the tool unit 10 by the stopper member 141. When the tool unit 10 has pivoted to the left 47° position, the left stopper end 150L of the stopper block 150 contacts the second stopper bolt 34 as shown in FIG. 26, so that the tool unit 10 can be positioned at the left 47° position. The tool unit 10 can be fixed in this position by the operation of the fixing lever 25.

Figure 27:
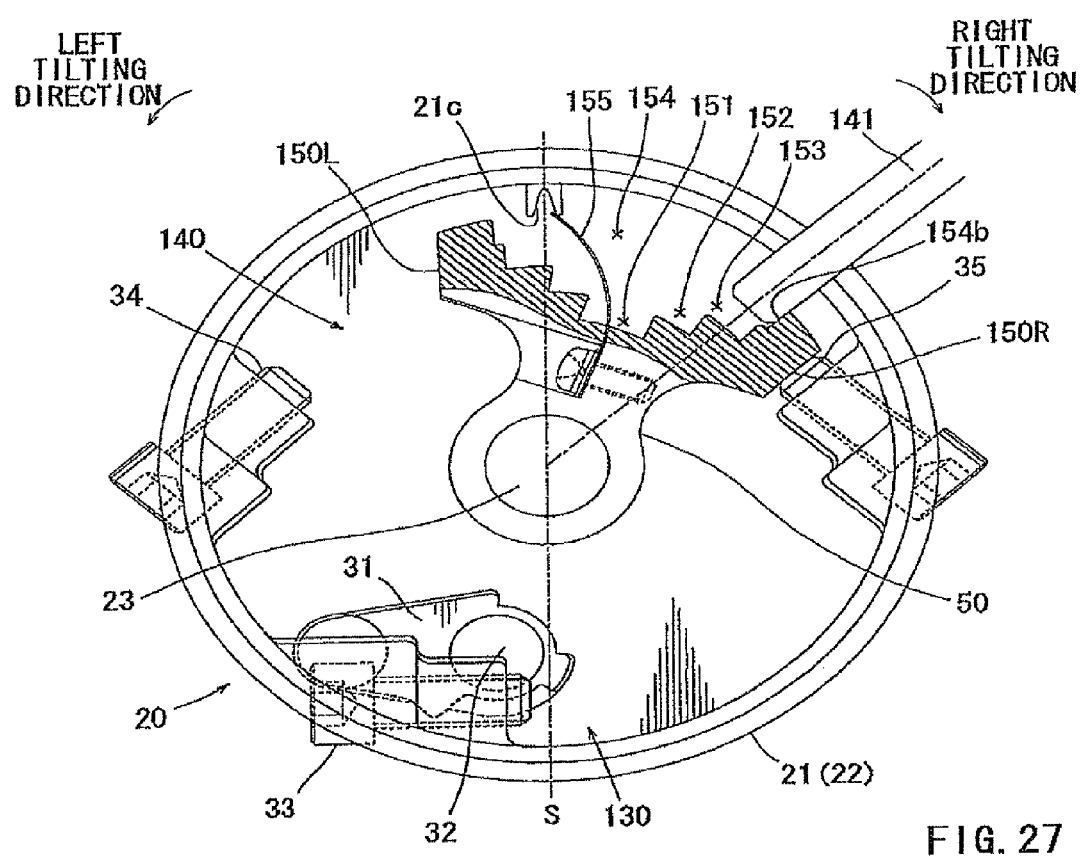
FIG. 27 is a front view similar to FIG. 19 but showing the operation for positioning the tool unit at a right 47° tilt position.
Figure 28:
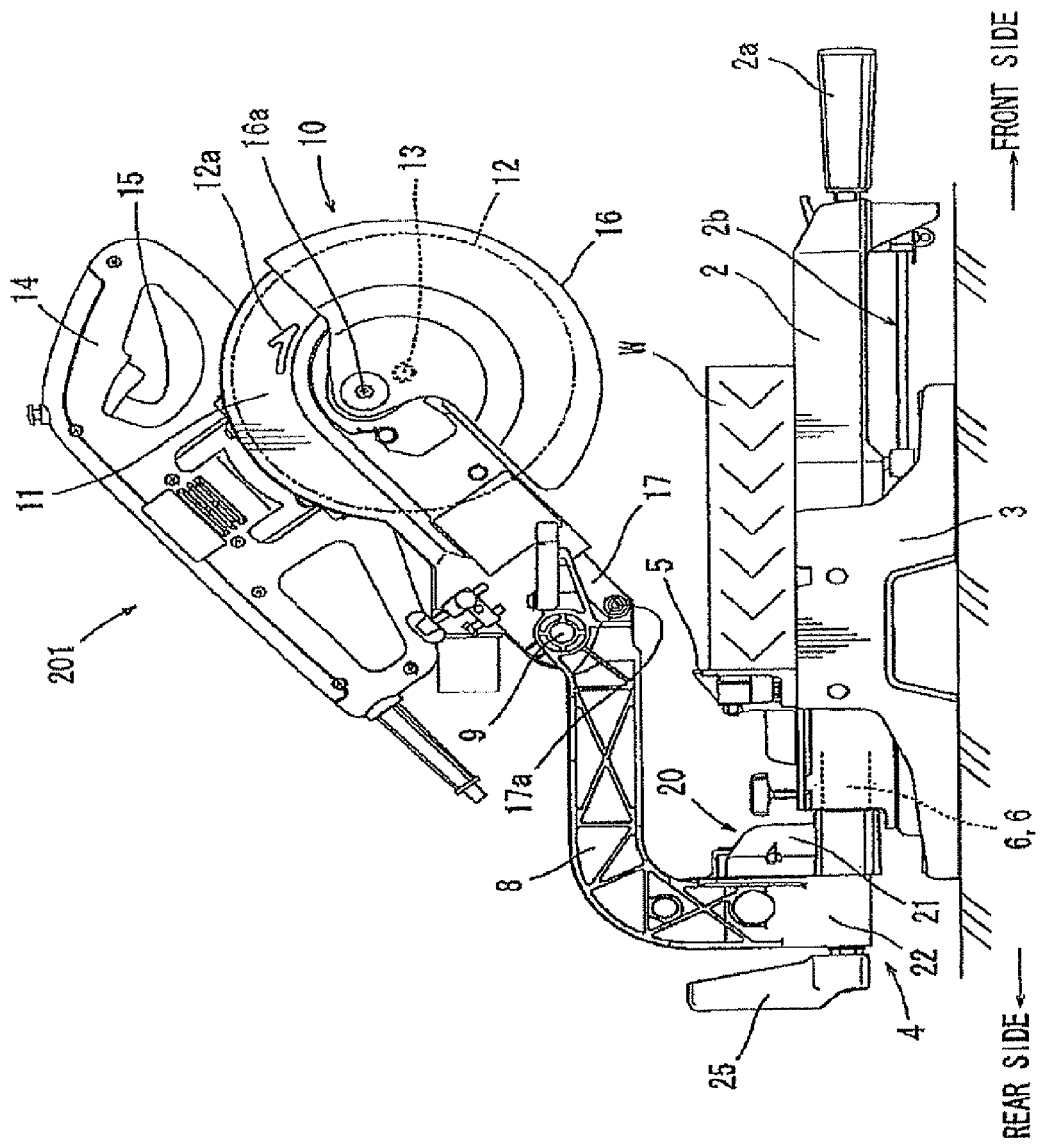
FIG. 28 is a side view of a table cutting device according to a fourth embodiment of the present invention.

If the tool unit 10 is to be positioned at the right 47° position, the operator pushes the button 36 to allow the tool unit 10 to be tilted rightward, and thereafter the operator tilts the tool unit 10 rightward, for example, from vertical position or the left 47° position. During the rightward tilting movement of the tool unit 10, the lower end of the stopper member 141 first contacts the side edge 154b on the right side of the third positioning recess 154. As the tool unit 10 tilts further rightward, the stopper block 150 is forced to pivot rightward together with the tool unit 10 by the stopper member 141. When the tool unit 10 has pivoted to the 47° position, the right stopper end 150R of the stopper block 150 contacts the third stopper bolt 35 as shown in FIG. 27, so that the tool unit can be positioned at the right 47° position. The tool unit 10 can be fixed in this position by the operation of the fixing lever 25.

As described above, according to the table cutting device 101 of this embodiment, the tool unit 10 can be positioned at the 0° position or the vertical position by the first positioning device 130. In addition, the tool unit 10 can be positioned at any of the right and left 22.5° positions, the right and left 33.9° positions, the right and left 45° positions and the right and left 47° positions. The tool unit 10 can be positioned at the vertical position through contact of the positioning lever 31 with the first stopper bolt 33, while the tool unit 10 can be positioned at the right and left 22.5° positions, the right and left 33.9° positions, the right and left 45° positions and the right and left 47° positions through contact of the corresponding one of the stopper ends 150L and 150R of the of the stopper block 150 with the one of the second and third stopper bolts 34 and 35.

Because the second positioning device 140 serves as a positive stop device for positioning the tool unit 10 at any of eight positions including the right and left 22.5° positions, the right and left 33.9° positions, the right and left 45° positions and the right and left 47° positions, it is possible to rapidly position the tool unit 10 at a desired tilt position without need of check by reading the angular scale.

In particular, according to the second positioning device 140, the tilt position of the tool unit 10 can be determined through contact of one of the stopper ends 150l, and 150R of the of the stopper block 150 with one of the second and third stopper bolts 34 and 35. Therefore, the tool unit 10 can be rapidly accurately positioned at a plurality of tilt positions other than 45° positions.

If the operator wishes to position the tool unit 10 at a position other than the right and left 22.5° positions, the right and left 33.9° positions, the right and left 45° positions and the right and left 47° positions, the operator pivots the switching lever 160 to move the stopper member 141 to the fifth position, where the lower end of the stopper member 141 is withdrawn from the fourth positioning recess 154, against the biasing force of the compression spring 143. The switch lever 160 can be held in position as the steel ball 165 engages the retaining recess 161f, so that the stopper member 141 is held at the fifth position. When the stopper member 141 is in the fifth position, the stopper member 141 can move leftward or rightward as the tool unit 10 tilts leftward or rightward. However, the lower end of the stopper member 141 does not engage any of the positioning recesses 151 to 154. Therefore, the stopper block 150 is held in its initial position. Hence, it is possible to tilt the tool unit 10 by an angle larger than 47°. After the tool unit 10 has been tilted to a desired angular position, the operator can fix the tool unit 10 in position by the operation of the fixing lever 25.

Furthermore, when the stopper member 141 is positioned at the second, third or fourth position, the stopper member 141 can move relative to the second positioning recess 152, the third positioning recess 153 or the fourth positioning recess 154 within a range of the circumferential length of the corresponding recess 152, 153 or 154. Therefore, it is possible to set the tilt angle of the tool unit 10 to an angle other than the angles of 0°, 22.5°, 33.9°, 45° and 47° by tilting the tool unit 10 leftward or rightward to a position within such a movable range of the stopper member 141 relative to the corresponding recess 152, 153 or 154, holding the tool unit 10 in this position, and fixing the tool unit 10 in position by the operation of the fixing lever 25.

The third embodiment may be modified in various ways. For example, although the stopper block 150 has the first to fourth positioning recesses 151 to 154 for positioning at angles of 22.5°, 33.9°, 45° and 47° in both of right and left directions, these angles may be changed to the other angles. In addition, increasing the number of the positioning recesses can increase the number of positionable angles.

Further, although the leaf spring 155 has been used for resiliently holding the stopper block 150 at the initial position, the leaf spring 155 may be replaced with a tension coil spring, a compression coil spring, a torsion spring, or any other suitable spring.

(Fourth Embodiment)

A table cutting device 201 according to a fourth embodiment of the present invention will now be described with reference to FIGS. 28 to 38. Also, the third embodiment is a modification of the first embodiment, and therefore, like members are given the same reference numerals as the first embodiment and the description of these members will not be repeated.

The table cutting device 201 of the fourth embodiment includes a first positioning device 230 and a second positioning device 240 corresponding to the first positioning device 30 and the second positioning device 40, respectively.

According to the fourth embodiment, the positioning member 31 of the first positioning device 230 is biased by a torsion spring 237 to pivot about the support shaft 32 such that the positioning lever 31 is held at a restricting position, where the positioning lever 31 is pressed against a restricting portion 221a formed on the inner wall of the support member 22. The other construction of the first positioning device 230 is basically the same as the first positioning device 30.

In addition, the table cutting device 201 includes first to third stopper bolts B1, B2 and B3 that are attached to the base member 21 and correspond to the first to third stopper bolts 33, 34 and 35 of the first embodiment, respectively. Similar to the first embodiment, the first stopper bolt B1 constitutes a part of the first positioning device 230. By rotating the stopper bolt B1, the protruding distance of the first stopper bolt B1 into the base member 21 can be changed to adjust the 0° position or the vertical position. The second and third stopper bolts B2 and B3 constitute a part of the second positioning device 240.

Figure 30:
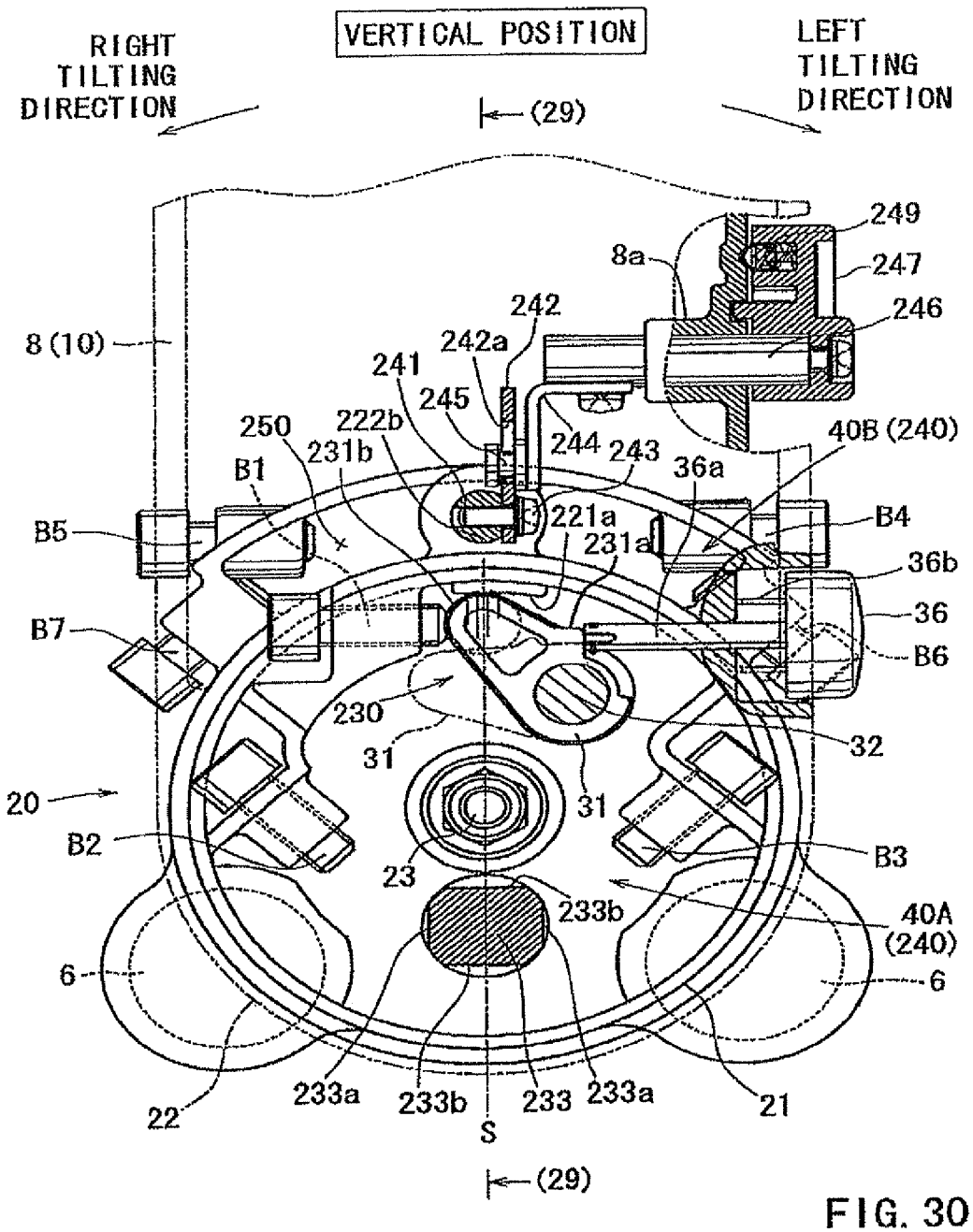
FIG. 30 is a view showing an internal structure of the support device as viewed from the rear side in a direction of arrow (30) in FIG. 29 and showing the operation for positioning a tool unit positioned at a vertical position.

When the positioning member 31 is in contact with the restricting portion 221a of the support member 22 and is prevented from pivoting in a clockwise direction as viewed in FIG. 30, a tip end 231b of the positioning member 31 can contacts the first stopper bolt B1, so that the tool unit 10 can be positioned at the 0° position or the vertical position.

In addition, the push button 36 is operable by the operator for moving the positioning lever 31 from the operative position to the inoperative position in order to enable the tool unit 10 to be tilted rightward as in the previous embodiments and includes the operation shaft 36a and a compression spring 36b that normally holds the operation shaft 36a at a position, where the tip end of the operation shaft 36a is spaced by a small distance from a projection 231a of the positioning member 31.

The positioning device 240 of this embodiment includes a first positioning device 40A and a second positioning device 40B. The first positioning device 40A includes the second and third stopper bolts B2 and B3 and a first switching member 233 and is designed to be able to position the tool unit 10 at right and left 45° positions and right and left 48° positions. The second stopper bolt B2 positioned on the left side as viewed in FIG. 30 can be used for positioning the tool unit 10 at the left 45° position and the left 48° position. The third stopper bolt B3 positioned on the right side as viewed in FIG. 30 can be used for positioning the tool unit 10 at the right 45° position and the right 48° position. The second and third stopper bolts B2 and 133 are inclined relative to the upper surface of the table 2 such that end portions of their shanks are oriented downward.

Figure 29:
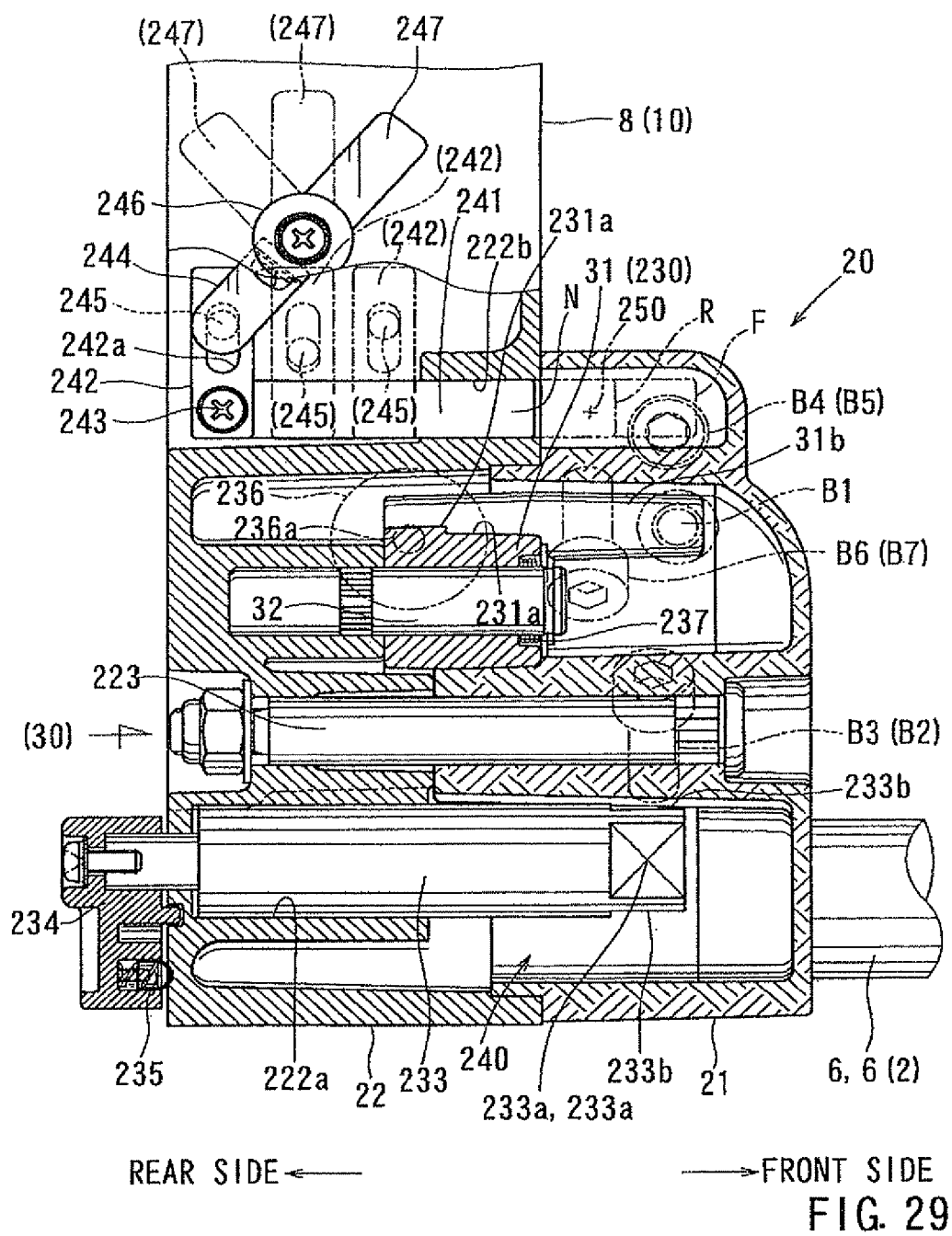
FIG. 29 is a vertical sectional view of a pivotal support device of the table cutting device of FIG. 28.

The first switching member 233 has a thick rod-like configuration and is disposed below the support shaft 23. The rear end of the first switching member 233 is rotatably inserted into a support hole 222a formed in the support member 22. Therefore, as the support member 22 rotates relative to the base member 21 to tilt the tool unit 10, the first switching member 233 moves around the support shaft 23 in unison with the support member 22 while maintaining the parallel relationship with the support shaft 23. In addition, the first switching member 233 is rotatable within the support hole 222a about an axis parallel to the support shaft 23. As shown in FIG. 29, the rear end of the first switching member 233 extends from the rear end of the support hole 222a. A switching lever 234 is attached to the rear end of the switching member 233, so that the operator can rotate the first switching member 233 about its axis, for example within an angular range of about 90°. A detent device 235 can hold the operational position of the switching lever 234. In other words, the operation of the switching lever 234 requires to be made against the holding force (biasing force) applied by the detent device 235.

The front end portion of the first switching member 233 enters into inside of the base member 21. Two parallel 45° positioning surfaces 233a and two parallel 48° positioning surfaces 233b are formed on the side surface of the front end portion of the first switching lever 233 and are configured as flat surfaces. The parallel 45° positioning surfaces 233a and the parallel 48° positioning surfaces 233b extend parallel to the rotational axis of the first switching member 233 and are arranged alternately at intervals of 90° in the circumferential direction.

The distance between the rotational axis of the first switching member 233 and the 45° positioning surfaces 233a is set to be larger than the distance between the rotational axis of the first switching member 233 and the parallel 48° positioning surfaces 233b. Therefore, the distance between the 45° positioning surfaces 233a is larger than the distance between the 48° positioning surfaces 233b. With this arrangement, as the switching lever 234 is pivoted to rotate the first positioning member 233 about its axis, the 45° positioning surfaces 233a or the 48° positioning surfaces 233b can be selectively positioned on a path of movement of the first positioning member 233, which movement may be caused by the laterally tilting movement of the tool unit 10.

Figure 31:
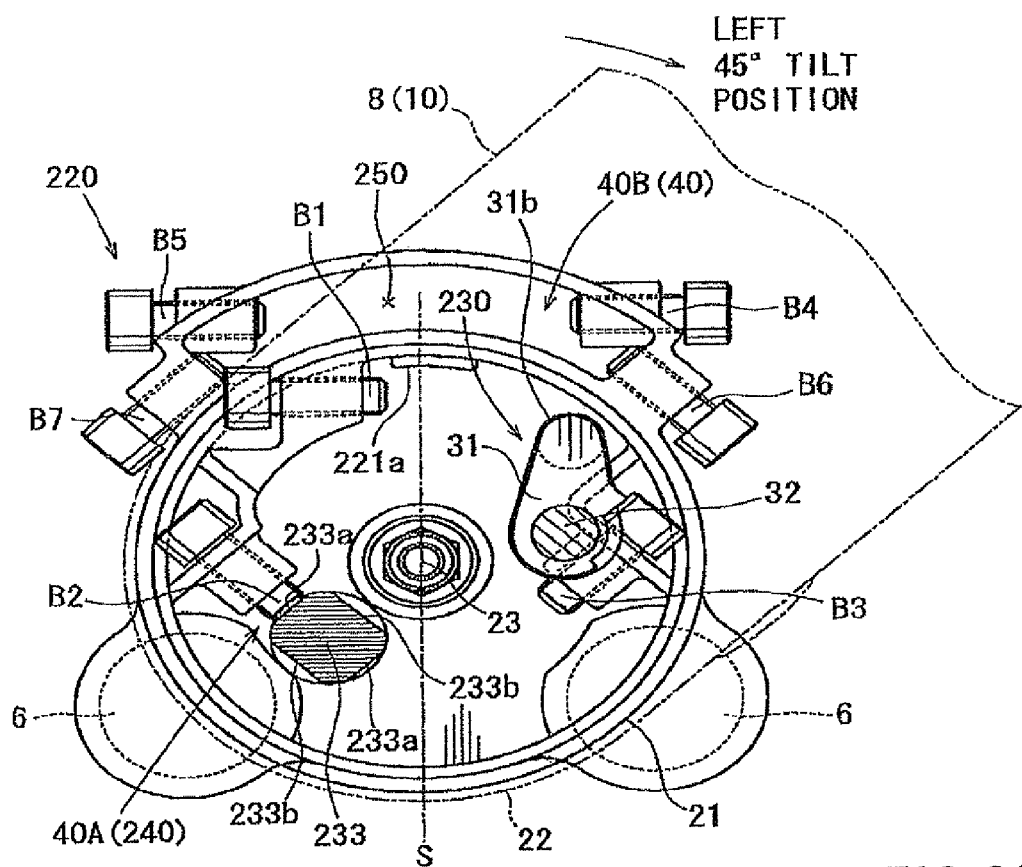
FIG. 31 is a view similar to FIG. 30 but showing the operation for positioning a tool unit at a vertical position.
Figure 32:
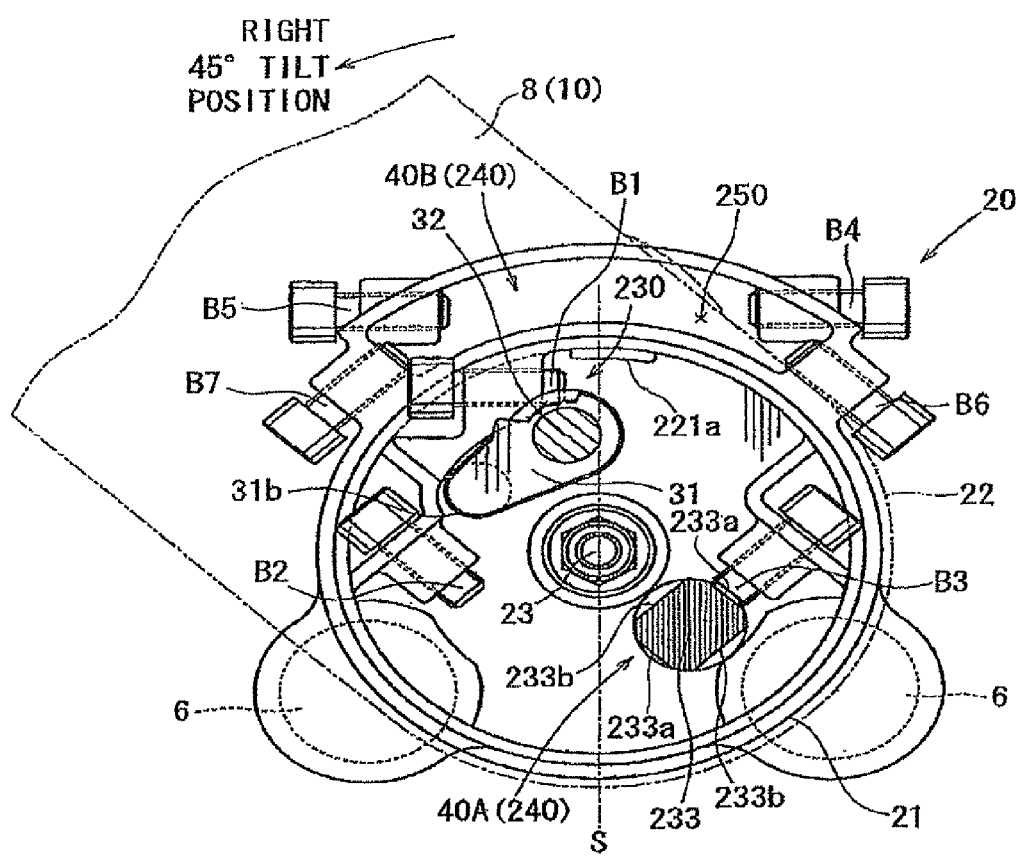
FIG. 32 is a view similar to FIG. 30 but showing the operation for positioning a tool unit at a right 45° tilt position.

In order to position the tool unit 10 to the left 45° position, the operator pivots the switching lever 234 to position the 45° positioning surfaces 233a on the path of movement of the first positioning member 233. This position of the switching lever 234 will be hereinafter called "45° setting position." Thereafter, the operator tilts the tool unit 10 leftward until the left side 45° positioning surface 233a contacts the second stopper bolt B2 as shown in FIG. 31, so that the tool unit 10 can be positioned at the left 45° position. On the other hand, in order to position the tool unit 10 to the right 45° position, with the switching lever 234 positioned at the 45° setting position, the operator tilts the tool unit 10 rightward until the right side 45° positioning surface 233a contacts the third stopper bolt 133 as shown in FIG. 32, so that the tool unit 10 can be positioned at the right 45° position.

Figure 33:
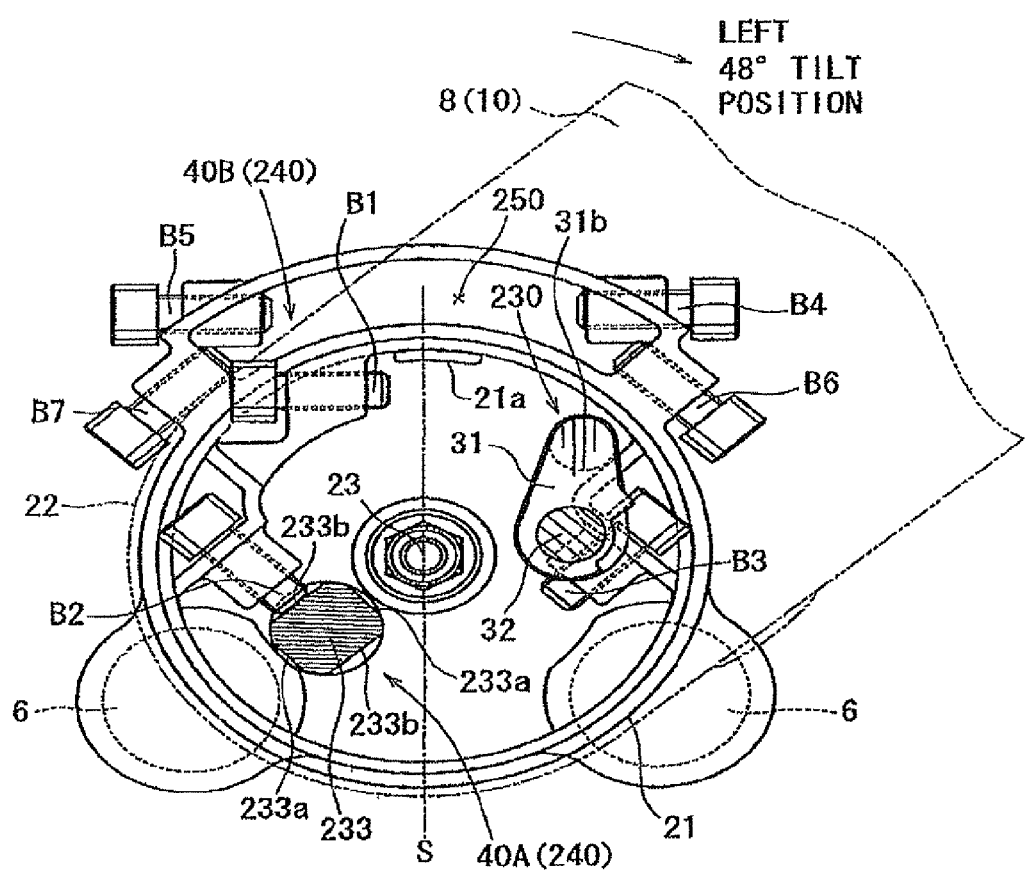
FIG. 33 is a view similar to FIG. 30 but showing the operation for positioning a tool unit at a left 48° tilt position.

In order to change position of the tool unit 10 from the left or right 45° position to the left 48° position, the operator pivots the switching lever 234 by an angle of 90° to position the 48° positioning surfaces 233b on the path of movement of the first positioning member 233. This position of the switching lever 234 will be hereinafter called "48° setting position." Thereafter, the operator tilts the tool unit 10 leftward until the left side 48° positioning surface 233b contacts the second stopper bolt B2 as shown in FIG. 33, so that the tool unit 10 can be positioned at the left 48° position. On the other hand, in order to position the tool unit 10 to the right 48° position, with the switching lever 234 positioned at the 48° setting position, the operator tilts the tool unit 10 rightward until the right side 48° positioning surface 233b contacts the third stopper bolt B3 as shown in FIG. 34, so that the tool unit 10 can be positioned at the right 48° position.

Figure 34:
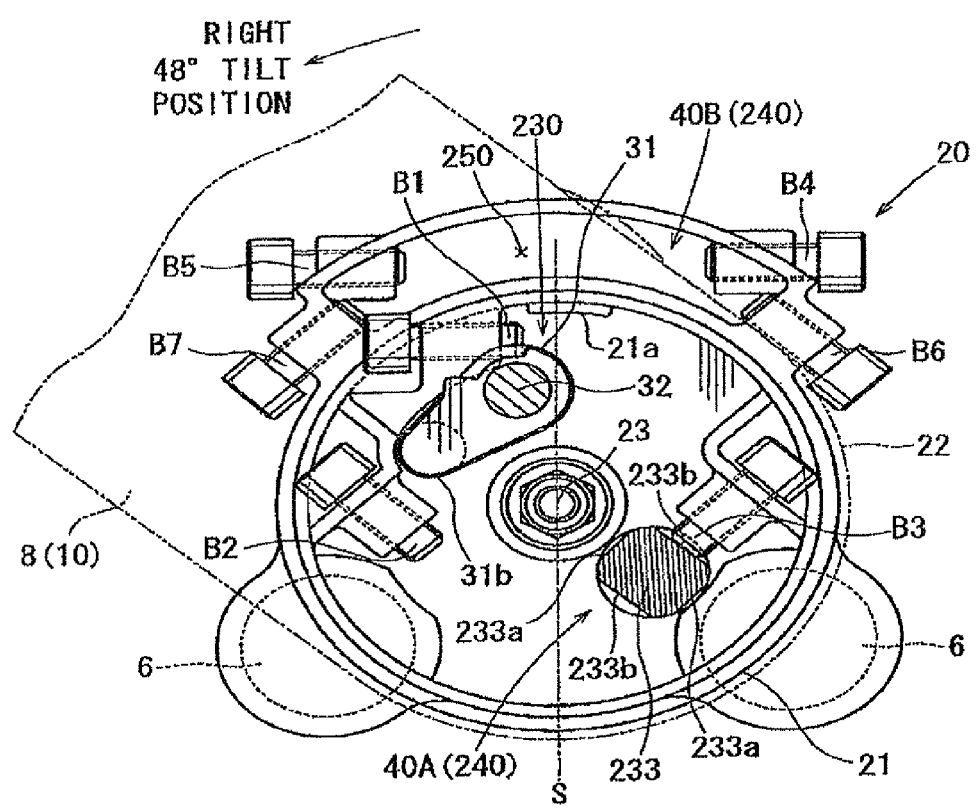
FIG. 34 is a view similar to FIG. 30 but showing the operation for positioning a tool unit at a right 48° tilt position.

In this way, by pivoting the switching lever 234 between the 45° setting position and the 48° setting position by an angle of 90°, the tool unit 10 can be positioned at the right or left 45° position (see FIGS. 31 and 32) or right or left 48° position (see FIGS. 33 and 34).

The left 45° position and the left 48° position can be finely adjusted by rotating the second stopper bolt 132 for changing the protruding distance of the stopper bolt 132 into the base member 21. Similarly, the right 45° position and the right 48° position can be finely adjusted by rotating the third stopper bolt B3 for changing the protruding distance of the stopper bolt 133 into the base member 21.

The second positioning device 40B will now be described. The second positioning device 40B is configured to be able to position the tool unit 10 at right and left 22.5° positions and right and left 33.9° positions.

In addition to the first to third stopper bolts B1 to B3, fourth to seventh stopper bolts B4 to B7 are threadably engaged with an upper extension protruding upward from the upper portion of the base member 21. The upper extension extends along the upper portion by a predetermined circumferential length and has opposite circumferential ends. The fourth and fifth stopper bolts B4 and B5 are used for positioning the tool unit 10 at right and left 22.5° positions and are positioned to be symmetrical with each other with respect to the reference plane S. The sixth and seventh stopper bolts B6 and B7 are used for positioning the tool unit 10 at right and left 33.9° positions and are positioned to be symmetrical with respect to the reference plane S.

In addition, the fourth and fifth stopper bolts B4 and B5 extend horizontally and perpendicular to the reference plane S, while end portions of their shanks being opposed to each other. The sixth and seventh stopper bolts B6 and B7 are inclined relative to the horizontal direction, while end portions of their shanks being oriented upward.

As shown in FIGS. 29 and 30, a second switching member 241 is axially slidably inserted into a support hole 222b fanned in the upper portion of the support member 22 at a position proximal to the base portion of the support arm 8. The second switching member 241 can be selectively positioned at any of three positions along the axial direction. The three positions are a front position for the right and left 22.5° positions, a rear position for the right and left 33.9° positions, and an inoperative position on the rear side of the rear position.

An actuation plate 242 is fixedly mounted to the rear portion of the second switching member 241 by means of a screw 243 and extends upward from the second switching member 241. A vertically elongated engaging slot 242a is formed in the actuation plate 242.

An engaging pin 245 is inserted into the engaging slot 242a of the actuation plate 242 and is mounted to a lower portion of an inverted L-shaped intermediate plate 244 that is mounted to a switching member 246. The switching member 246 is rotatably received within a boss portion 8a formed on the lateral side of the support arm 8, so that the switching member 246 can rotate about its axis. The switching member 246 extends from the inner space of the support arm 8 to the outside of the support arm 8 through the boss portion 8a. A switching lever 247 is attached to one end of the switching member 246, which is positioned on the outer side of the support arm 8. Therefore, the switching member 246 rotates about its axis as the operator pivots the switching lever 247. A detent device 249 is provided between the switching lever 247 and the outer surface of the support arm 8 opposing thereto, so that the switching lever 247 can be held in position at three positions in the pivoting direction.

As the switching member 246 rotates by the operation of the switching lever 247, the intermediate member 244 pivots in forward and rearward directions about the axis of the switching member 246, so that the engaging pin 245 moves along a circular path about the switching member 246. Therefore, the actuation member 242 moves forward and rearward due to engagement of the engaging pin 245 with the engaging slot 242a of the actuation plate 242. Thus, because the vertical component of the movement of the engaging pin 245 is absorbed by the engaging slot 242a, only the forward and rearward component of the movement of the engaging pin 245 is transmitted to the actuation plate 242. The second switching member 241 moves in forward and rearward directions together with the actuation plate 242. As described previously, the switching lever 247 can be held in position by the detent device 249 at three positions. These positions are set to correspond to the front position, the rear position and the inoperative position of the second switching member 241.

When the switching member 241 is positioned at the front position, the front end of the switching member 241 extends into an arc-shaped recess 250 formed in the upper extension on the upper portion of the base member 21 at a position opposing to the base portion of the support arm 8. As shown in FIG. 30, the recess 250 having the arc-shaped configuration extends in the circumferential direction of the base member 21. The fourth to seventh stopper bolts B4 to B7 are mounted to the opposite circumferential ends of the upper extension on the upper portion of the base member 21, while the end portions of their shanks extending into the recess 250.

As shown in FIG. 29, the recess 250 has a closed front side and an open rear side facing to the base portion of the support arm 8, so that the front portion of the second switching member 241 enters the recess 250 via the open rear side. In FIG. 29, F designates the position of the front portion of the second switching member 241 positioned at the front position, N designates the position of the front portion of the second switching member 241 at the rear position, and R designates the position of the front portion of the second switching member 241 positioned at the inoperative position. The position F of the front portion of the second switching member 241 is set to be proximal to the rear end of the recess 250, the position R is set on the rear side of the position F but within the recess 250, and the position N is set to be out of the recess 250.

The stopper bolts B4 and B5 for the right and left 22.5 positions are offset forwardly from the front side of the stopper bolts B6 and B7 for the right and left 33.9° positions, so that the stopper bolts B4 and B5 are positioned to correspond to the position F of the front end of the second switching member 241 and the stopper bolts B6 and B7 are positioned to correspond to the position R.

Figure 35:
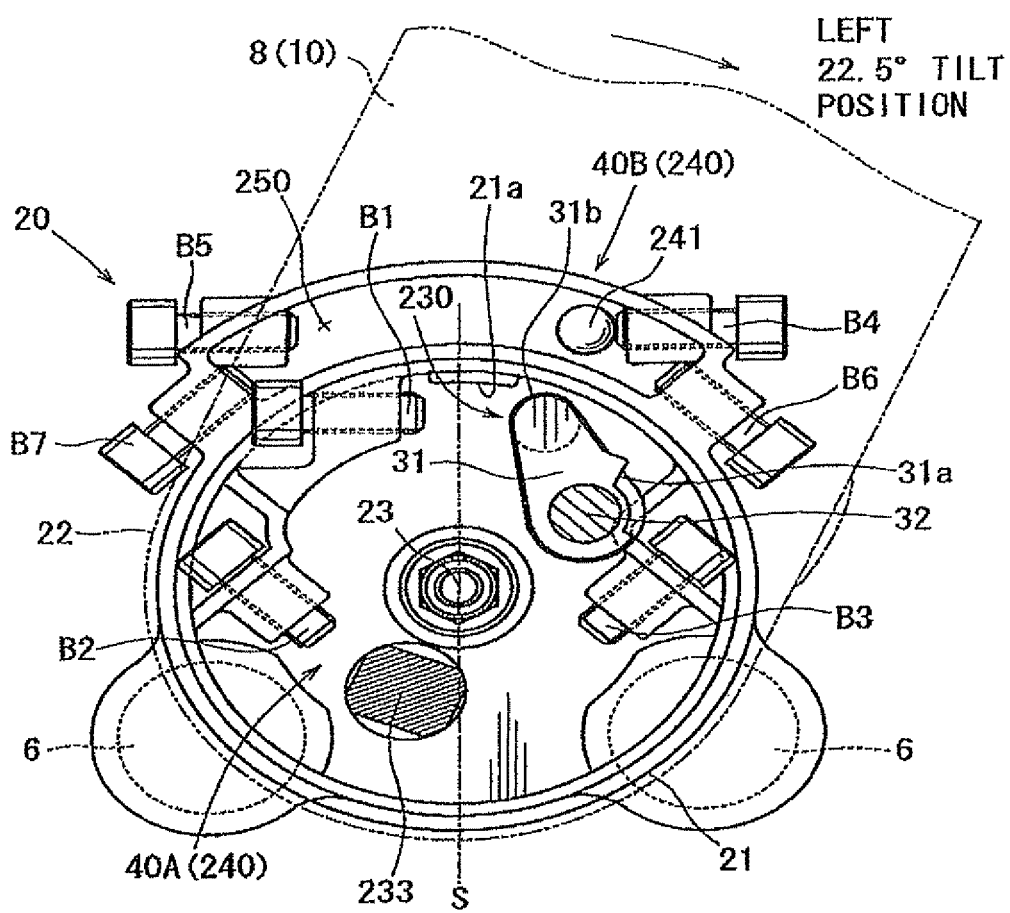
FIG. 35 is a view similar to FIG. 30 but showing the operation for positioning a tool unit at a left 22.5° tilt position.
Figure 36:
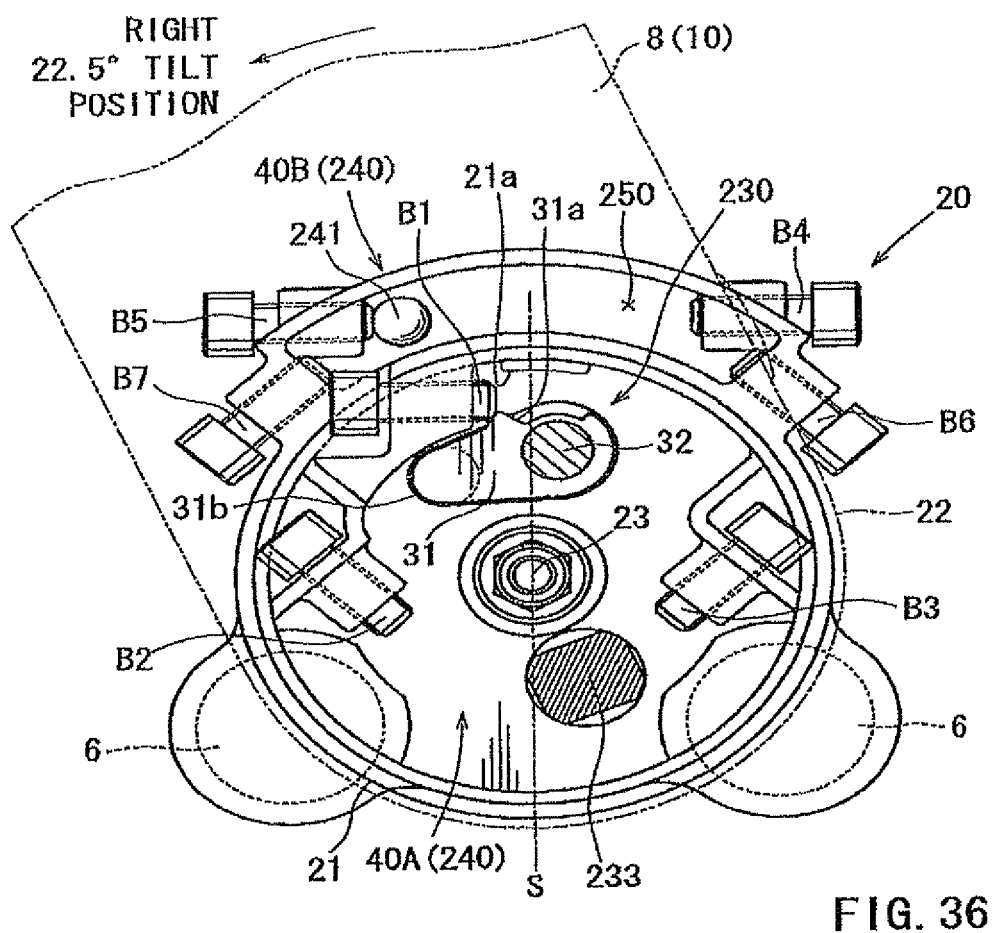
FIG. 36 is a view similar to FIG. 30 but showing the operation for positioning a tool unit at a right 22.5° tilt position.

Therefore, when the tool unit 10 is tilted leftward (toward the front side of the sheet of FIG. 29) with the second positioning member 241 positioned at the position F, the front end of the second switching member 241 contacts the fourth stopper bolt B4, so that the tool unit 10 can be positioned at the left 22.5° position (see FIG. 35). When the tool unit 10 is tilted rightward (toward the rear side of the sheet of FIG. 29) with the second positioning member 241 positioned at the position F, the front end of the second positioning member 241 contacts the fifth stopper bolt B5, so that the tool unit 10 can be positioned at the right 22.5° position (see FIG. 36).

Figure 37:
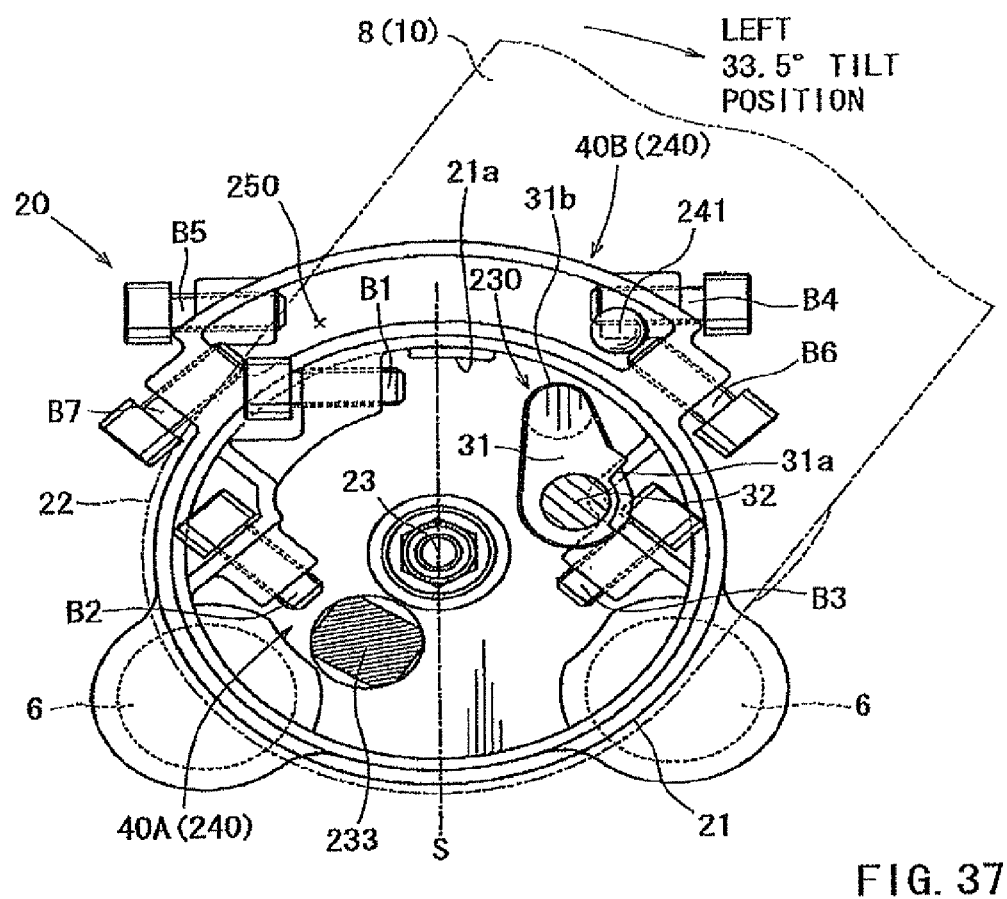
FIG. 37 is a view similar to FIG. 30 but showing the operation for positioning a tool unit at a left 33.9° tilt position.
Figure 38:
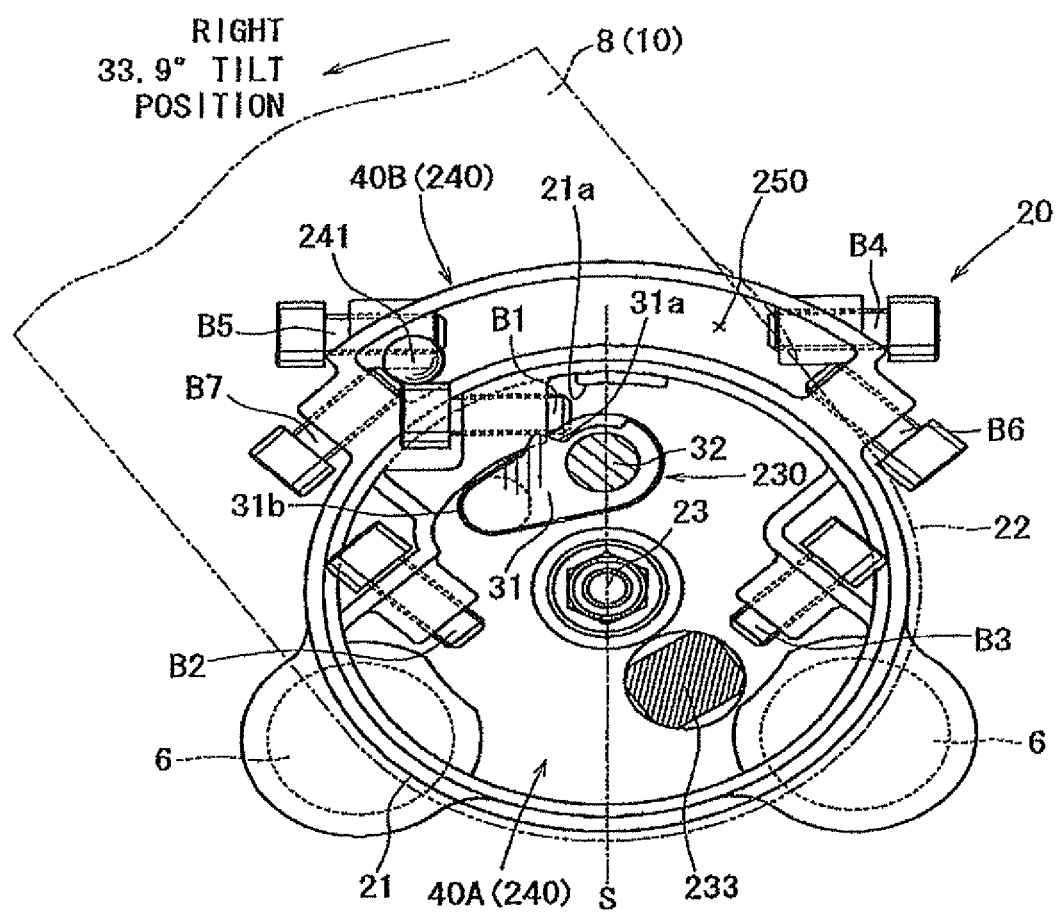
FIG. 38 is a view similar to FIG. 30 but showing the operation for positioning a tool unit at a right 33.9° tilt position.

When the tool unit 10 is tilted leftward (toward the front side of the sheet of FIG. 29) with the second positioning member 241 positioned at the position R, the front end of the second positioning member 241 contacts the sixth stopper bolt B6, so that the tool unit 10 can be positioned at the left 33.9° position (see FIG. 37). When the tool unit 10 is tilted rightward (toward the rear side of the sheet of FIG. 29) with the second positioning member 241 positioned at the position R, the front end of the second positioning member 241 contacts the seventh stopper bolt B7, so that the tool unit 10 can be positioned at the right 33.9° position (see FIG. 38).

As shown in FIG. 30, the distance between the reference plane S and the fourth and fifth stopper bolts B4 and B5 is set to be smaller than the distance between the reference plane S and the sixth and seventh stopper bolts B6 and B7. Therefore, when the second switching member 41 is positioned at the position F, the second switching member 241 may not interact with the sixth and seventh stopper bolts B6 and B7. In addition, when the second switching member 41 is positioned at the position R, the second switching member 241 may not interact with the fourth and fifth stopper bolts B4 and B5.

When the switching lever 247 is pivoted to a most forward position indicated by solid lines in FIG. 29, the second switching member 241 is positioned at the inoperative position N that is the rear most position, where the front end of the second switching member 241 does not protrude into the recess 250. When the switching lever 247 is pivoted to a central upright position as indicated by chain lines in FIG. 29, the second switching member 241 is positioned at the rear position R, where the front end of the second switching member 241 enters the rear portion of the recess 250. When the switching lever 247 is pivoted to a most rearward position, the second switching member 241 is positioned at the front position F.

When the second switching member 241 is positioned at the inoperative position N, the second switching member 241 may not contact any of the fourth to seventh stopper bolts B4 to B7, and therefore, the second switching member 241 does not serve to position the tool unit 10. The operation of the first switching member 233 for positioning the tool unit 10 at the right and left 45° positions and the right and left 48° positions is performed while the second switching member 241 is positioned at the inoperative position N. On the other hand, the operation of the second switching member 241 for positioning the tool unit at the right and left 22.5° positions and the right and left 33.9° positions is performed while the first switching member 233 does not serve to position the tool unit 10.

As described above, according to the fourth embodiment, by the incorporation of the first positioning device 230 and the second positioning device 240 including the first positioning device 40A and the second positioning device 40B, the tool unit 10 can be positioned at the 0° position, the right and left 22.5° positions, the right and left 33.9° positions, the right and left 45° positions and the right and left 48° positions. In particular, the right and left 22.5° positions, the right and left 33.9° positions, the right and left 45° positions and the right and left 48° positions can be set through contact of the first switching member 233 with the second stopper bolt B2 or the third stopper bolt B3 and through contact of the second switching member 241 with the fourth stopper bolt B4, the fifth stopper bolt B5, the sixth stopper bolt B6 and the seventh stopper bolt B7. Therefore, the positioning operation of the tool unit 10 can be rapidly accurately performed.

Because it is not necessary for the operator to read the angular scale during the tilting movement of the tool unit 10 for positioning the tool unit at the above tilted positions, the tilting operation of the tool unit 10 can be rapidly smoothly performed.

Further, because it is possible to position the tool unit 10 at a large number of tilt positions (the right and left 22.5° positions, the right and left 33.9° positions, the right and left 45° positions and the right and left 48° positions in this embodiment), the operator can chose his or her desired tilt angle from a large number of settable tilt angles. This may expand the range of choice of the tilt angles. Hence, it is possible to cope with various modes of cutting operations.

The above embodiment may be modified in various ways. For example, although the settable tilt angles are right and left 22.5°, right and left 33.9°, right and left 45° and right and left 48° in the above embodiment, it is possible to change the settable tilt angles from these angle values or to design for enabling setting of additional tilt angles other than these angles.

Further, although the tilt angles are settable for both of the left tilt positions and the right tilt positions, it is possible to design such that the tilt angles are settable for only the left tilt positions or the right tilt positions, in particular, in the case that the present invention is applied to a table cutting device having a tool unit that can tilt only on the left side or the right side.

Furthermore, also in this embodiment, it is possible to omit the horizontal slide mechanism.

A fifth embodiment will now be described with reference to FIGS. 39 to 42. This embodiment is a modification of the fourth embodiment. A pivotal support device 260 of the fifth embodiment is somewhat different from the pivotal support device 20 of the first to fourth embodiments, which rotatably support the support member 22 relative to the support base 21. In addition, a positioning device of the fifth embodiment is different from the positioning device including the first and second positioning devices 230 and 240 of the fourth embodiment. The other construction of the fifth embodiment is the same as the fourth embodiment. Therefore, FIGS. 39 to 42 show only the construction that is different from the fourth embodiment.

Figure 39:
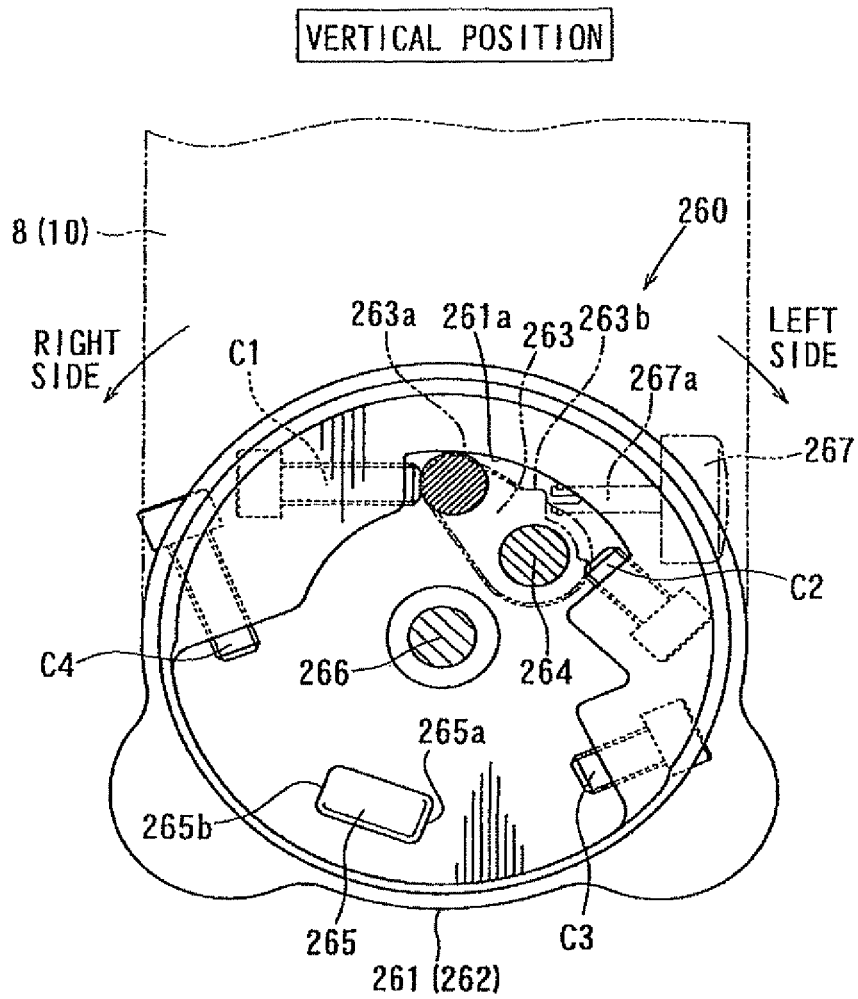
FIG. 39 is a rear view of a pivotal support device of a table cutting device according to a fifth embodiment of the present invention and showing the operation for positioning a tool unit at a vertical position.
Figure 40:
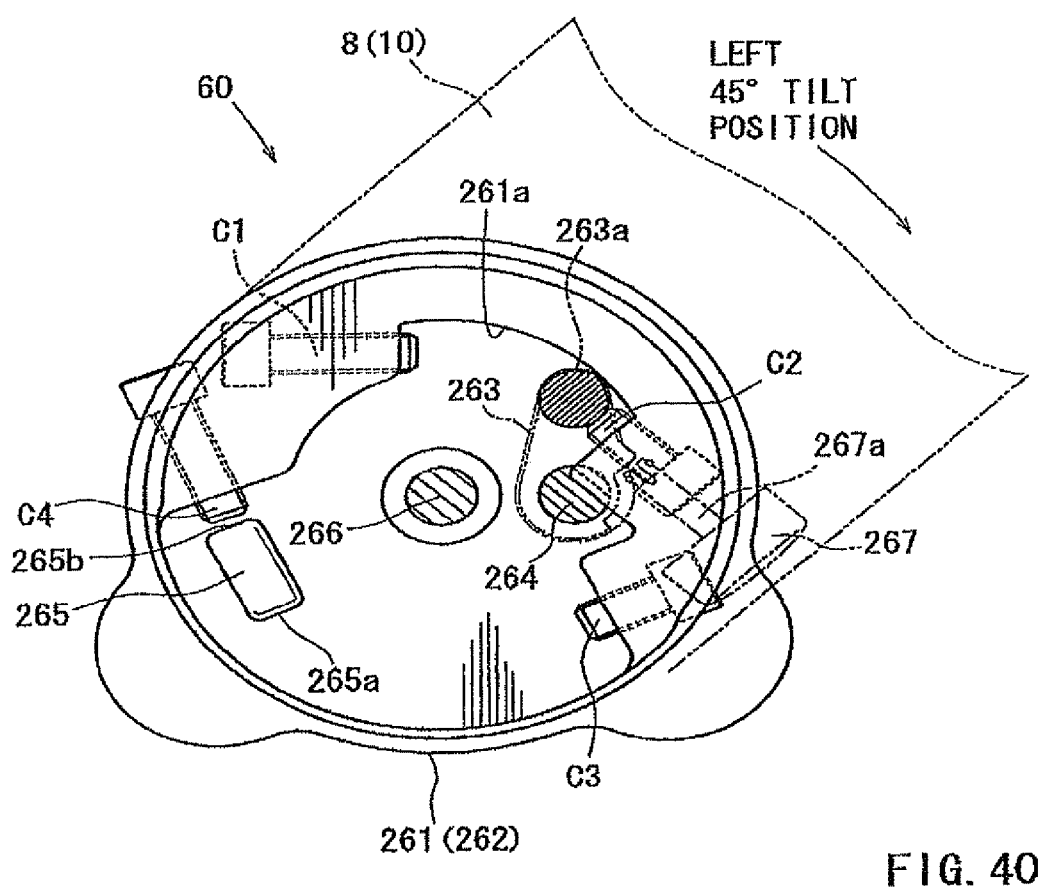
FIG. 40 is a rear view similar to FIG. 39 but showing the operation for positioning a tool unit at a left 45° tilt position.

Referring to FIGS. 39 to 42, a pivotal support device 260 corresponding to the pivotal support device 20 includes a base member 261 and a support member 262 that is rotatably coupled to the base member 261 via a support shaft 266. The tool unit 10 (not shown) is vertically tiltably supported on the support member 262 via the support arm 8. A positioning member 263 for positioning the tool unit 10 at the vertical position is mounted within the support member 262. The positioning member 263 is vertically pivotally supported by the support member 262 via a support shaft 264. The positioning member 263 is biased by a torsion spring (not shown) in such a direction that a tip end 263a of the positioning member 263 is pressed against an inner wall 261a of the base member 261. FIGS. 39 and 40 show the state where the tip end 263a is pressed against the inner wall 261a of the base member 261. This position is an operative position of the positioning member 263 for positioning the tool unit 10 at the vertical direction.

Figure 41:
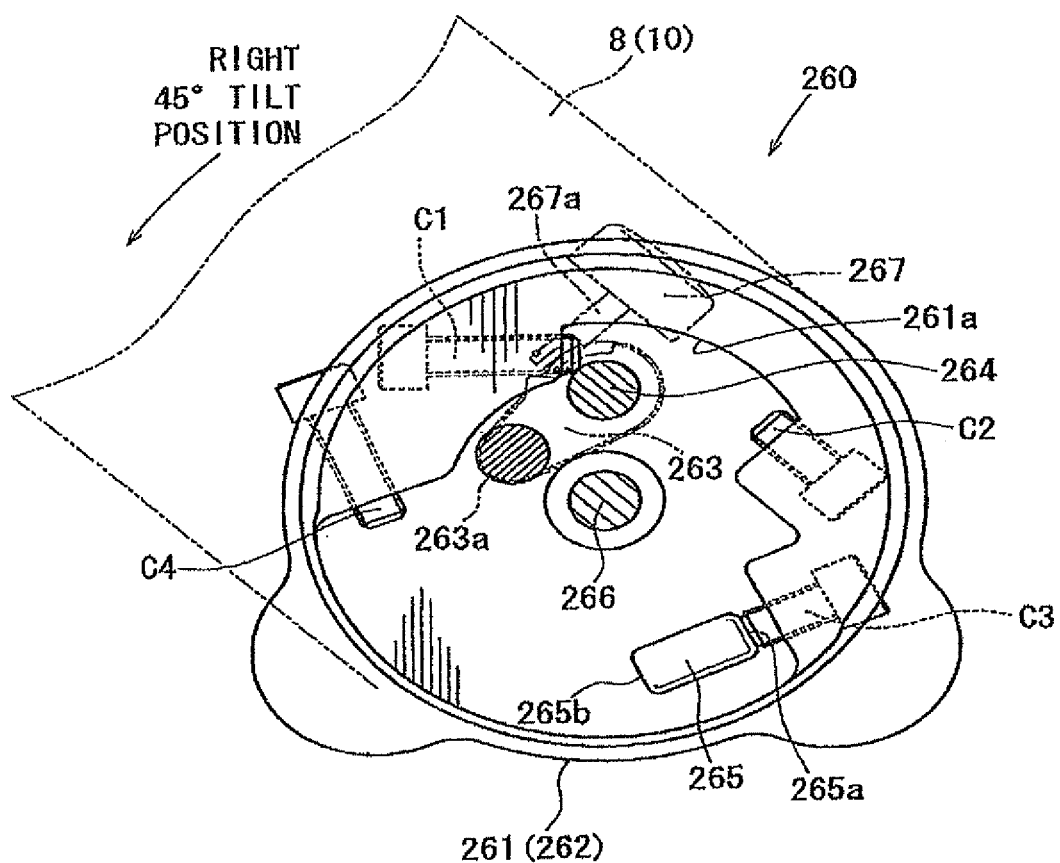
FIG. 41 is a rear view similar to FIG. 39 but showing the operation for positioning a tool unit at a right 45° tilt position.
Figure 42:
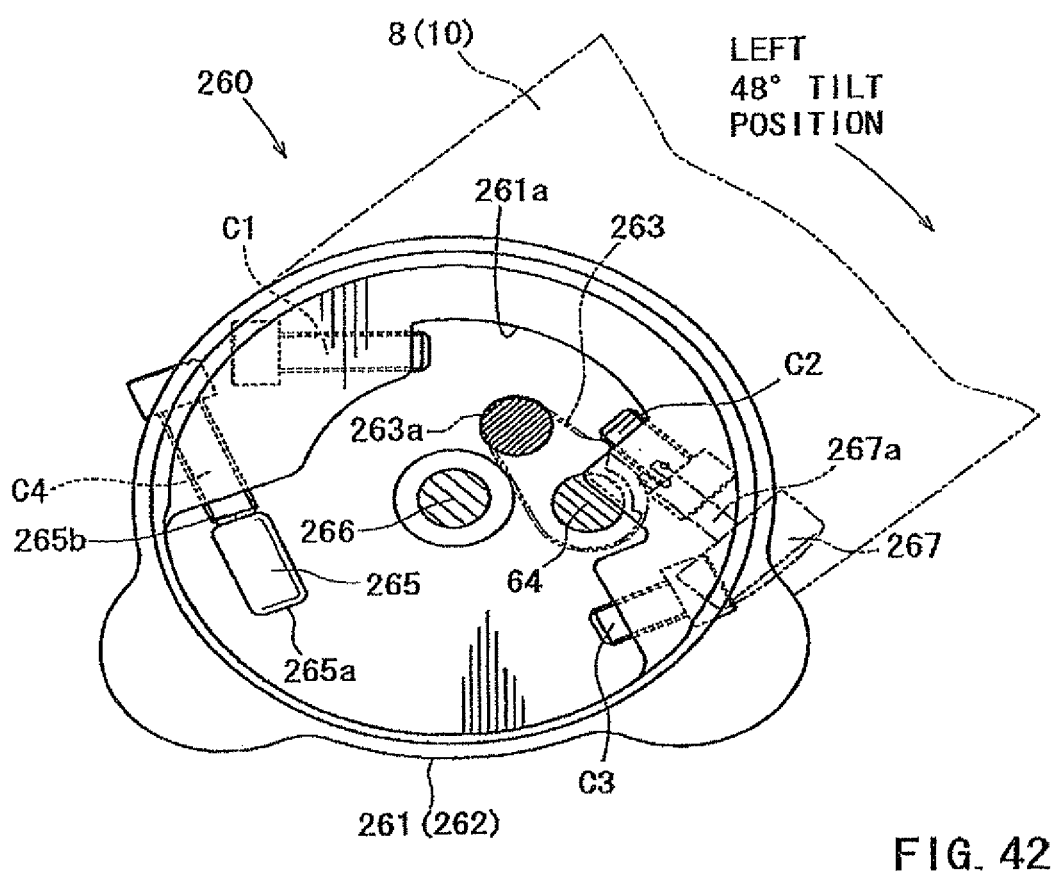
FIG. 42 is a rear view similar to FIG. 39 but showing the operation for positioning a tool unit at a left 48° tilt position.

A push button 267 corresponding to the push button 36 of the previous embodiments is disposed on the side portion of the support member 262. Thus, the push button 267 can be pushed by the operator for moving the positioning lever 263 from the operative position to an inoperative position. The push button 267 has an actuation shaft 267a that has a tip end opposing to a projection 263b formed on the lateral side of the positioning member 263. Therefore, as the operator pushes the push button 267 into the support member 262, the actuation shaft 267a contacts the projection 263b and forces the positioning member 263 to pivot in a counterclockwise direction as viewed in FIG. 39. FIGS. 41 and 42 show the state where the positioning member 263 has moved to an inoperative position where the tip end 263a of the base member 261 is positioned away from the inner wall 261a of the base member 261.

A positioning member 265 used for positioning the tool unit at a plurality of laterally tilted positions is formed integrally, with the lower portion of the support member 262. The positioning member 265 has a block-like configuration and has a 45° positioning surface 265a and a 48° positioning surface 265b on opposite sides in the circumferential direction about the axis of the support shaft 266.

First to fourth stopper bolts C1, C2, C3 and C4 are threadably engaged with the base member 261. The first stopper bolt C1 corresponds to the first stopper bolt B1 of the fourth embodiment and is used for positioning the tool unit 10 at the vertical position. The second stopper bolt C2 is used for positioning the tool unit at a left 45° position.

The cutting unit 10 can be positioned at the vertical position when the tip end 263a of the positioning member 263 contacts the stopper bolt C1 as shown in FIG. 39. The cutting unit 10 can be positioned at the at the left 45° position when the tip end 263a of the positioning member 263 contacts the second stopper bolt C2 as shown in FIG. 40.

The third stopper bolt C3 is used for positioning the tool unit 10 at a right 45° position, and the fourth stopper bolt C4 is used for positioning the tool unit 10 at a left 48° position. The tool unit 10 can be positioned at the right 45° position by the contact of the 45° positioning surface 265a of the positioning member 265 with the third stopper bolt C3. The tool unit 10 can be positioned at the left 48° position by the contact of the 48° positioning surface 265b of the positioning member 265 with the fourth stopper bolt C4.

When the push button 267 is not pushed by the operator (see the position shown in FIGS. 39 and 40), the positioning member 263 is held at the operative position where the tip end 263a contacts the inner surface 261a of the base member 261. When the positioning member 263 is in this operative position, the tool unit 10 can be positioned at the vertical position (see FIG. 39) and also can be positioned at the left 45° position (see FIG. 40). Therefore, the fifth embodiment is different from the fourth embodiment in that the positioning member 263 for positioning the tool unit 10 at the vertical position can be also used for positioning at the left 45° position.

The tool unit 10 can be positioned at the right 45° position and the left 48° position when the positioning member 263 is positioned at the inoperative position by the operation of the push button 263. More specifically, the tool unit 10 can be positioned at the right 45° position by the contact of the 45° positioning surface 265a with the stopper bolt C3 as shown in FIG. 41. The tool unit 10 can be positioned at the left 48° position by the contact of the 48° positioning surface 265b with the fourth stopper bolt C4 as shown in FIG. 42.

The vertical position, the left 45° position, the right 45° position and the left 48° position can be finely adjusted by rotating the first stopper bolt C1, the second stopper bolt C2, the third stopper bolt C3 and the fourth stopper bolt C4, respectively.

As described above, according to the fifth embodiment, the tool unit 10 can be positioned at the left 45° position, the right 45° position and the left 48° position in addition to the vertical position. Therefore, it is possible to rapidly accurately position the tool unit 10 at these laterally tilt positions. In addition, because the positioning member 263 can be used for positioning the tool unit 10 at both of the vertical position and the left 45° position, the table cutting device may have a simple construction, and it is possible to position the tool unit 10 at various tilt positions by the simple operation.

The fifth embodiment can also be modified in various ways. For example, the tilt angles settable by the stopper bolts C2, C3 and C4 can be changed to other angle values. In addition, although the positioning member 265 is formed integrally with the support member 261, the positioning member 265 may be mounted to the support member 261 such that the positioning member 265 can rotate about its axis or can move in the circumferential direction of the support member 261. With this modification, the surfaces of the positioning member 261, with which the third stopper bolt C3 and the fourth stopper bolt C4 contact, can be switched to enable setting of additional tilt angles.

What is claimed is:

1. A cutting device comprising:
   a table having a table surface for placing thereon a workpiece;
   a tool unit;
   a cutting tool mounted to the tool unit and having a rotational axis;
   a pivotal support device mounted on the table and supporting the tool unit, so that the tool unit can be laterally tilted to incline the rotational axis of the cutting tool relative to the table surface;
wherein the pivotal support device comprises a base member mounted to the table and a support member configured to support the tool unit and coupled to the base member, so that the support member can rotate relative to the base member about a rotational axis; and
a positioning device configured to be able to position the tool unit at any one of a plurality of laterally tilted positions;
wherein the positioning device comprises:
a first member mounted to the base member and rotatable about the rotational axis of the support member;
a second member mounted to the support member and movable in a radial direction with respect to the rotational axis of the support member; and
a third member mounted to the support member and positioned to be opposed to the first member in a circumferential direction about the rotational axis;
wherein the first member includes a plurality of recesses arranged in series in the radial direction;
wherein each of the recesses is open toward the radially outer side and has a circumferential end for contacting with the second member;
wherein the circumferential ends of the recesses are positioned at different angular positions about the rotational axis; and
wherein, as the support member rotates relative to the base member, the second member can contact the circumferential end of one of the recesses depending on the position of the second member in the radial direction and can move the first member toward the third member, so that the first member can be held between the second member and the third member.

2. The cutting device as in claim 1, further comprising a fixing device operable to fix the support member in position relative to the base member with respect to a rotational direction about the rotational axis.

3. The cutting device as in claim 1, wherein the third member comprises a pair of stopper members positioned on opposite sides of the first member in the circumferential direction, and each of the recesses has opposite circumferential ends for contacting with the second member.

4. The cutting device as in claim 3, wherein each of the recesses has a configuration symmetrical with respect to a central line extending in the radial direction.

5. The cutting devices as in claim 3, wherein the recesses have different circumferential lengths and depths.

6. The cutting device as in claim 1, further comprising a holding device resiliently holding the first member in a position where the second member opposes to one of the recesses positioned nearest to the rotational axis.

7. The cutting device as in claim 1, further comprising an operation lever operable by an operator for moving the second member in the radial direction.

8. The cutting device as in claim 1, wherein the second member comprises a pin having an axis extending in the radial direction.

9. A cutting device comprising:
a table having a table surface for placing thereon a workpiece;
a tool unit;
a cutting tool mounted to the tool unit and having a rotational axis;
a pivotal support device mounted on the table and supporting the tool unit, so that the tool unit can be laterally tilted to incline the rotational axis of the cutting tool relative to the table surface,
wherein the pivotal support device comprises a base member mounted to the table and a support member configured to support the tool unit and coupled to the base member, so that the support member can rotate relative to the base member about a rotational axis; and
first and second positioning devices each configured to be able to position the tool unit at any one of a plurality of laterally tilted positions;
wherein each of the first and second positioning devices includes a first member and at least one second member;
wherein the first member is movably mounted to one of the base member and the support member; and
wherein the at least one second member is mounted to the other of the base member and the support member, so that the first member can contact the at least one second member to position the tool unit at different laterally tilted positions depending on the position of the first member.

10. The cutting device as in claim 9, wherein the first positioning device and the second positioning device are operable independently of each other.

11. The cutting device as in claim 9, further comprising a third positioning device configured to be able to position the tool unit at a vertical position, where the rotational axis of the cutting tool is positioned substantially parallel to the table surface.

12. The cutting device as in claim 9, wherein the at least one second members comprise a plurality of bolts threadably engaged with the other of the base member and the support member.

13. The cutting device as in claim 9, wherein the laterally tilted positions that can be positioned by the first positioning device include a 45° tilted position and a 48° tilted position, and the laterally tilted positions that can be positioned by the second positioning device include a 22.5° tilted position and a 33.9° tilted position.

14. The cutting device as in claim 9, wherein:
the first member of the first positioning device is rotatably supported by one of the base member and the support member; and
the first member has a plurality of positioning surfaces spaced from a rotational axis of the first member by different distances from each other, so that any one of the positioning surfaces of the first member can contact the at least one second members depending on the position of the first member.

15. The cutting device as in claim 9, wherein;
the first member is axially movably supported by the one of the base member and the support member; and
a plurality of the second members are positioned at different positions with respect to a moving direction of the first member, so that the first member can contact any one of the second members depending on the position of the first member.

16. A cutting device comprising:
a table having a table surface for placing thereon a workpiece;
a tool unit;
a cutting tool mounted to the tool unit and having a rotational axis;
a pivotal support device mounted on the table and supporting the tool unit, so that the tool unit can be laterally tilted to incline the rotational axis of the cutting tool relative to the table surface, wherein the pivotal support device comprises a base member mounted to the table and a support member configured to support the tool unit and coupled to the base member, so that the support member can rotate relative to the base member about a rotational axis; and a first positioning device configured to be able to position the tool unit at a vertical position, where the rotational axis of the cutting tool extends substantially parallel to the table surface, and at least a first laterally tilted position; and a second positioning device configured to be able to position the tool unit at least a second laterally tilted position;

wherein the first positioning device comprises a first member and at least two second members;

wherein the first member is mounted to one of the base member and the support member, so that the first member can move between an operative position and an inoperative position;

wherein the second members are mounted to the other of the base member and the support member;

wherein the first member can contact with any one of the second members to position the tool unit at the vertical position or at least the first tilted position when the first member is positioned at the operative position; and wherein the second positioning device can position the tool unit at least the second laterally tilted position when the first member of the first positioning device is positioned at the inoperative position.

17. The cutting device as in claim 16, wherein:
the second positioning device can position the tool unit at the second laterally tilted position and a third laterally tilted position;
the second positioning device comprises a third member and two fourth members;
the third member is mounted to the one of the base member and the support member;
the fourth members are mounted to the other of the base member and the support member; and
the third member can contact with the fourth members to position the tool unit at the second laterally tilted position and the third laterally tilted position.

18. The cutting device as in claim 16, wherein the second members comprise a plurality of bolts threadably engaged with the one of the base member and the support member.

19. The cutting device as in claim 17, wherein the fourth members comprise bolts threadably engaged with the one of the base member and the support member.

* * * * *